US007475703B2

(12) United States Patent
Kempf et al.

(10) Patent No.: US 7,475,703 B2
(45) Date of Patent: *Jan. 13, 2009

(54) THERMOSTATICALLY CONTROLLED BYPASS VALVE

(75) Inventors: Dale Kempf, Clovis, CA (US); Ken Lum, Fresno, CA (US)

(73) Assignee: Grundfos Pumps Corporation, Olathe, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/702,744

(22) Filed: Feb. 5, 2007

(65) Prior Publication Data

US 2007/0137709 A1 Jun. 21, 2007

Related U.S. Application Data

(63) Continuation of application No. 10/832,492, filed on Apr. 27, 2004, now Pat. No. 7,198,059, and a continuation-in-part of application No. 10/394,795, filed on Mar. 21, 2003, now Pat. No. 7,073,528, which is a continuation-in-part of application No. 10/006,970, filed on Dec. 4, 2001, now Pat. No. 6,929,187, which is a continuation-in-part of application No. 09/697,520, filed on Oct. 25, 2000, now Pat. No. 6,536,464.

(60) Provisional application No. 60/465,854, filed on Apr. 28, 2003.

(51) Int. Cl.
*F16K 49/00* (2006.01)

(52) U.S. Cl. .................. 137/377; 137/359; 137/360; 137/269; 236/12.11

(58) Field of Classification Search ................. 137/377, 137/359, 360, 269; 236/12.11, 34.5
See application file for complete search history.

(56) References Cited

U.S. PATENT DOCUMENTS 2,507,954 A  5/1950  Binnall (Continued)

FOREIGN PATENT DOCUMENTS

DE  297 18 257 U 1  7/1998

(Continued)

OTHER PUBLICATIONS

IDS Submitted Dec. 13, 2002 in U.S. Appl. No. 09/697,520, 5 pg.
Remarks Section of Amendment Filed Jul. 18, 2002 in U.S. Appl. No. 09/697,520, 4 pg.

(Continued)

*Primary Examiner*—John Rivell
*Assistant Examiner*—Cloud K Lee
(74) *Attorney, Agent, or Firm*—Dean D Small; Jay J. Hoette; Small Patent Law Group

(57) ABSTRACT

A thermostatically controlled bypass valve includes a housing having a first inlet port and a first discharge port located proximate to one another, wherein the first inlet port is configured to receive hot water, and the first discharge port is configured to discharge the hot water. The housing has a second inlet port and a second discharge port located proximate to one another, wherein the second inlet port is configured to receive cold water, and the second discharge port is configured to discharge the cold water. The first and second inlet and discharge ports are formed integral with one another as part of the housing, and the housing includes a passage permitting recirculating flow between the first and second inlet ports. A thermally sensitive actuating member is disposed in a chamber in the housing, wherein the thermally sensitive actuating member extends when heated and contracts when cooled. A bias spring is disposed in the chamber in the housing, wherein the bias spring engages the thermally sensitive actuating member and urges the thermally sensitive actuating member to contract. The thermally sensitive actuating member extends to close the passage and contracts to open the passage based on a temperature of the thermally sensitive actuating member.

42 Claims, 32 Drawing Sheets

U.S. PATENT DOCUMENTS

| | | | |
|---|---|---|---|
| 2,716,424 A | 8/1955 | Watts |
| 2,823,695 A | 5/1958 | Kool |
| 2,842,155 A | 7/1958 | Peters |
| 3,232,336 A | 2/1966 | Leslie |
| 3,543,836 A | 12/1970 | Paulson |
| 3,741,195 A | 6/1973 | Ellis |
| 3,989,058 A | 11/1976 | Jackson |
| 4,068,800 A | 1/1978 | Doherty, Jr. |
| 4,142,515 A | 3/1979 | Skaats |
| 4,311,272 A | 1/1982 | Föller |
| 4,321,943 A | 3/1982 | Haws |
| 4,331,292 A | 5/1982 | Zimmer |
| 4,606,325 A | 8/1986 | Lujan, Jr. |
| 4,896,658 A | 1/1990 | Yonekubo |
| 4,917,294 A | 4/1990 | Bergmann et al. |
| 4,930,551 A | 6/1990 | Haws |
| 5,119,988 A | 6/1992 | Fiedrich |
| 5,135,021 A | 8/1992 | Pegg |
| 5,183,029 A | 2/1993 | Ranger |
| 5,205,318 A | 4/1993 | Massaro |
| 5,209,401 A | 5/1993 | Fiedrich |
| 5,261,443 A | 11/1993 | Walsh |
| 5,263,643 A | 11/1993 | Wells et al. |
| 5,287,570 A | 2/1994 | Peterson |
| 5,323,803 A | 6/1994 | Blumenauer |
| 5,503,183 A | 4/1996 | Fenn |
| 5,572,985 A | 11/1996 | Benham |
| 5,606,987 A | 3/1997 | Weber |
| 5,623,990 A | 4/1997 | Pirkle |
| 5,791,557 A | 8/1998 | Kunze |
| 5,819,785 A | 10/1998 | Bardini |
| 5,829,467 A | 11/1998 | Spicher |
| 5,873,518 A | 2/1999 | Richmond |
| 6,129,109 A * | 10/2000 | Humber ..................... 137/360 |
| 6,286,464 B1 | 9/2001 | Abraham |
| 6,772,958 B1 * | 8/2004 | Lamb et al. ................ 236/34.5 |
| 6,929,187 B2 | 8/2005 | Kempf |
| 7,104,461 B2 | 9/2006 | Restivo, Sr. et al. |

FOREIGN PATENT DOCUMENTS

| | | |
|---|---|---|
| DE | 197 12 051 | 9/1998 |
| EP | 1 018 063 B1 | 5/2004 |
| WO | WO 98/43143 | 10/1998 |

OTHER PUBLICATIONS

USPTO Office Action Dated Mar. 21, 2006, For U.S. Appl. No. 11/172,681, filed Jul. 1, 2005, 6 pg.

Metlund Systems, 1999, Total 1 pg. Advance Conservation Technology.

The Blumenauer Corporation Aqualink, Why Wait for HOT Water?; Apr. 19, 2001; 4 pages, 2004.

The Blumenauer Corporation Aqualink, How it Works; Apr. 19, 2001; 2 pages, 2004.

The Blumenauer Corporation, Aqua-Heat Hot Water recirculating System; 4 pages, 2004.

Laing Autocirc; Undersink Automatic Instant Hot Water Delivery System; Model ACT-303-BTW; 2 pages, 2004.

Laing Autocirc; Model No: ACT-303-BTW; Economic Study; 3 pages, 2004.

Laing; Instant Hot Water Delivery Systems; Autocirc; Questions and Answers; 3 pages, 2004.

Metlund (S-46, S01, and S02) PreFab Systems; S-Series HOT Water D'Mand Systems For Standard Piping(non-recirc) Installation and Operating Instructions; 7 pg, 2004.

Metlund D'Mand Systems; Got Hot Water? 2 pages, 2004.

Jim Dulley, Update Bulletin No. 991, 2001, 4 pages, 2004.

Metlund Systems, Advanced Conservation Tchnology, Inc. 16 pages, 2004.

Medlund Systems, Easy Installation Instructions, 10 pages, 2004.

Medlund Systems, Energy Technology Status Report-E.T.S.R., 11 pages, 2004.

Medlund Systems, Online Ordering, Purchasing Tips, 2 pages, 2004.

Grundfos Hot Water Recirulation Product and Application Guide, 10 pages, 2004.

NIBCO.com Just Right, Hot Water In Seconds!, 10 pages, 2004.

The Chilipepper Hot Water Appliance, How to Get FASTER Hot Water!!!, 22 pages, 2004.

Installation and Operating Instructions for the Chilipepper Appliance, 2 pages, 2004.

* cited by examiner

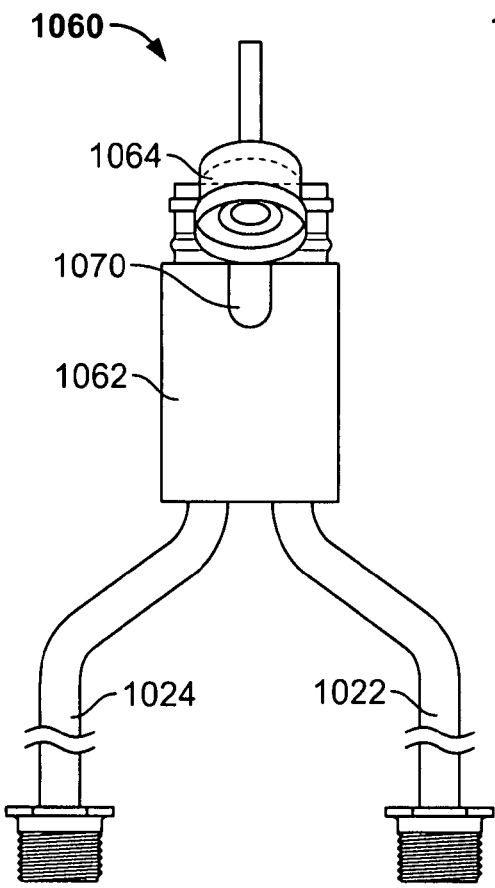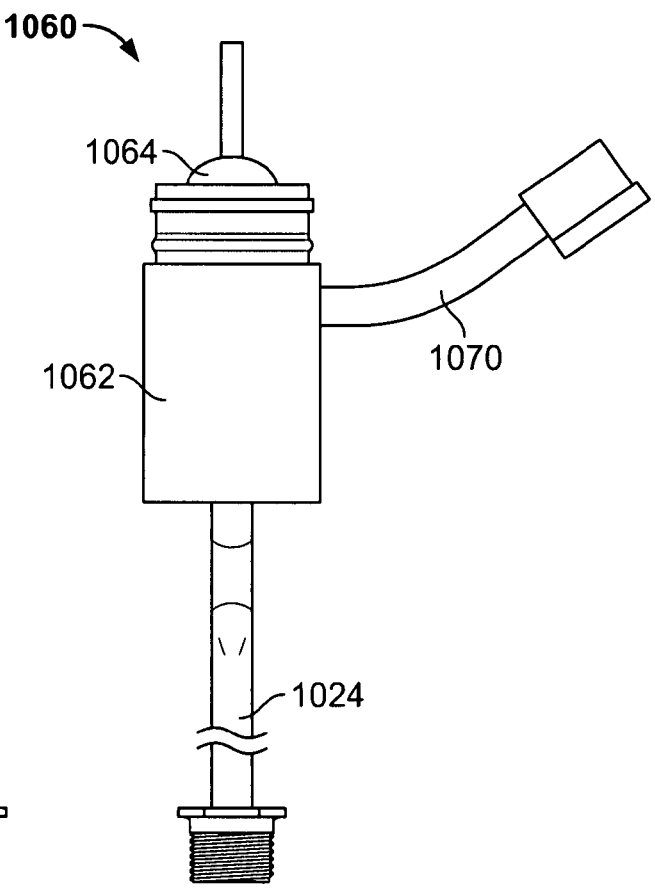
FIG. 33  FIG. 34
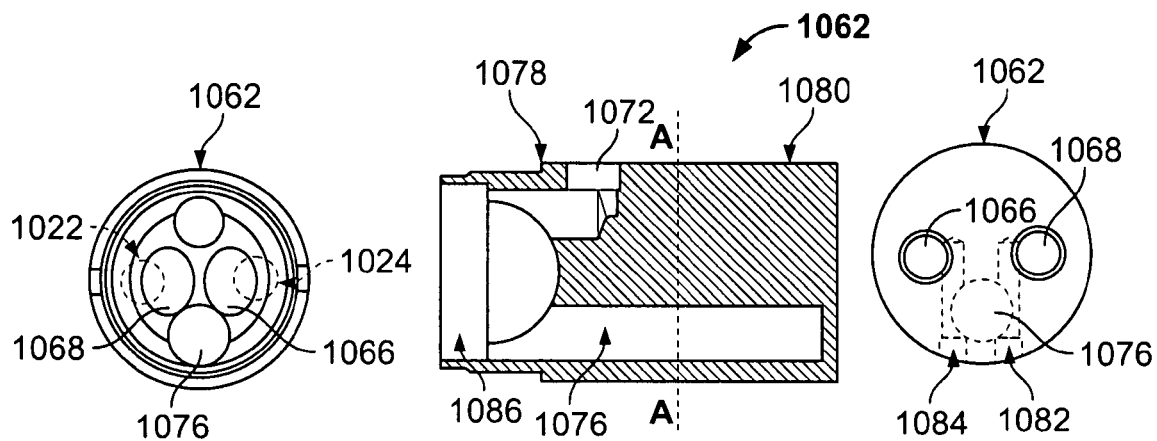
FIG. 35  FIG. 36  FIG. 37

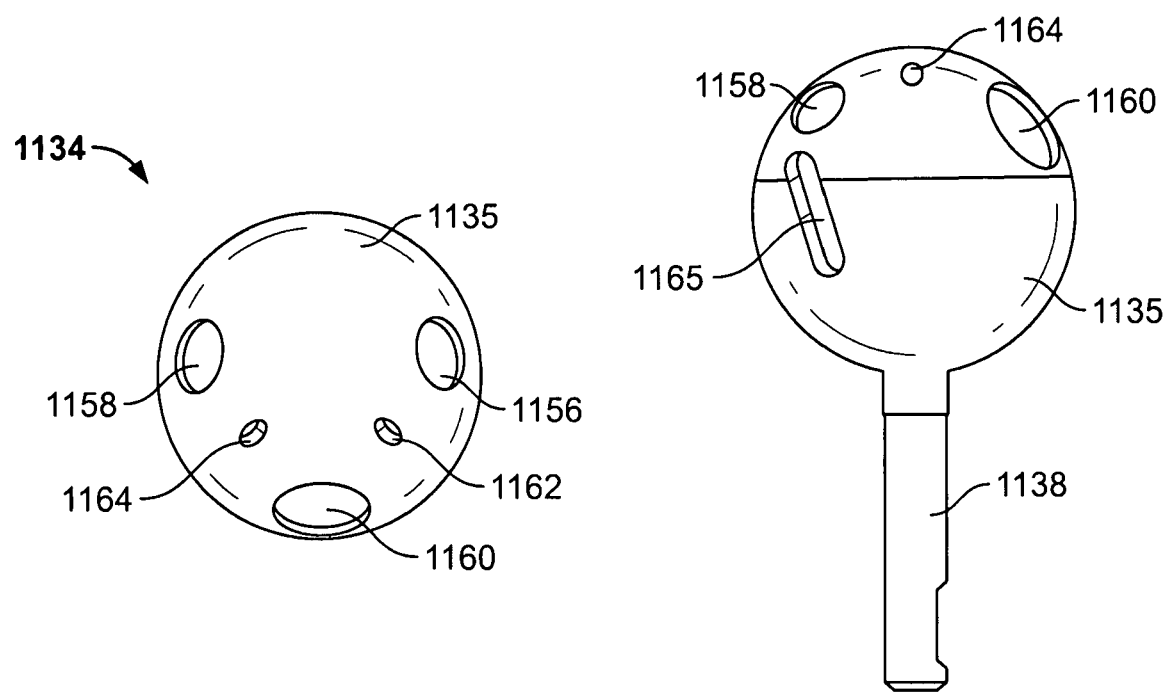
FIG. 43
FIG. 44
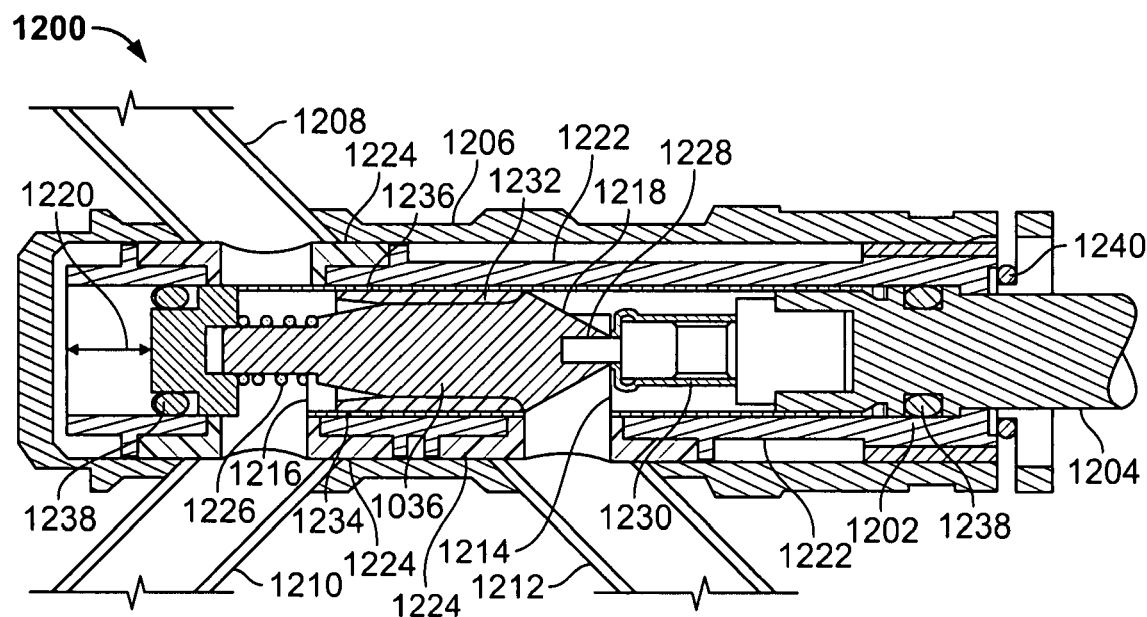
FIG. 45

THERMOSTATICALLY CONTROLLED BYPASS VALVE

CROSS-REFERENCE TO RELATED APPLICATIONS

This application is a continuation of U.S. application Ser. No. 10/832,492, filed Apr. 27, 2004 now U.S. Pat. No. 7,198,059, which claims the benefit of U.S. Provisional Application No. 60/465,854 filed Apr. 28, 2003, and which is a continuation-in-part of U.S. patent application Ser. No. 10/394,795 filed Mar. 21, 2003, now patented as U.S. Pat. No. 7,073,528, which is a continuation-in-part of 10/006,970 filed Dec. 4, 2001, now patented as U.S. Pat. No. 6,929,187, which is a continuation-in-part of U.S. patent application Ser. No. 09/697,520 filed Oct. 25, 2000, now patented as U.S. Pat. No. 6,536,464, which are each expressly incorporated herein by this reference.

BACKGROUND OF THE INVENTION

Certain embodiments relate generally to bypass valves for use in home or industrial water distribution systems that supply water to various fixtures at different temperatures through different pipes. More particularly, certain embodiments relate to such bypass valves that are thermostatically controlled so as to automatically bypass water that is not at the desired temperature for use at the fixture. Even more particular, certain embodiments relate to use of such a thermostatically controlled bypass valve in a water distribution system utilizing a single circulating pump at the water heater.

Certain embodiments relate generally to faucets and bypass valves for use in home or industrial water distribution systems that supply water to various fixtures at different temperatures through different pipes. More particularly, certain embodiments relate to faucets having bypass valves that are thermostatically controlled so as to automatically bypass water that is not at the desired temperature for use at the fixture. Even more particular, certain embodiments relate to faucets having an integral thermostatically controlled bypass valve.

Certain embodiments relate generally to water control valves for use in home or industrial water distribution systems that supply water to various fixtures at different temperatures through different pipe systems. More specifically, certain embodiments relate to such water control valves that are adaptable for use with a bypass valve so as to bypass cold or tepid water away from the associated fixture until it reaches the desired temperature. Certain embodiments are particularly useful for providing a water control valve having a bypass valve which is accessible through the support wall associated with the fixture and which can also be used with non-working or service valves.

Certain embodiments relate generally to apparatuses and systems for retrofitting water control valves used in home or industrial water distribution systems that supply water to various fixtures at different temperatures through different pipe systems. More specifically, certain embodiments relate to apparatuses and systems for retrofitting such water control valves to incorporate a bypass valve or other operating improvements, such as pressure balancing, without requiring removal or replacement of the valve housing that is mounted in the water distribution system. Even more specifically, certain embodiments relate to apparatuses and systems for retrofitting a tub/shower water control valve to incorporate a bypass valve so as to bypass cold or tepid water away from the associated fixture until it reaches the desired temperature.

Home and industrial water distribution systems distribute water to various fixtures, including sinks, bathtubs, showers, dishwashers and washing machines, that are located throughout the house or industrial building. The typical water distribution system brings water in from an external source, such as a city main water line or a private water well, to the internal water distribution piping system. The water from the external source is typically either at a cold or cool temperature. One segment of the piping system takes this incoming cold water and distributes it to the various cold water connections located at the fixtures where it will be used (i.e., the cold water side of a tub/shower valve). Another segment of the piping system delivers the incoming cold water to a water heater which heats the water to the desired temperature and distributes it to the various hot water connections where it will be used (i.e., the hot water side of the tub/shower valve). At the fixture, cold and hot water either flows through separate hot and cold water control valves that are independently operated to control the temperature of the water into the fixture by controlling the flow rate of water from the separate valves or, as is more typical for tub/shower installations, the water is mixed at a single valve that selectively controls the desired water temperature flowing from the fixture.

A well-known problem with most home and industrial water distribution systems is that hot water is not always readily available at the hot water side of the fixture when it is desired. This problem is particularly acute in water use fixtures that are located a distance from the hot water heater or in systems with poorly insulated pipes. When the hot water side of these fixtures is left closed for some time, such as overnight, the hot water in the hot water segment of the piping system sits in the pipes and cools. As a result, the temperature of the water between the hot water heater and the fixture lowers until it becomes cold or at least tepid. When opened again, it is not at all uncommon for the hot water side of such a fixture to supply cold water through the hot water valve when it is first opened and for some time thereafter. For instance, at the bathtub and/or shower fixture located some distance away from the water heater, the person desiring to use the tub/shower will either have to initially use cold or tepid water instead of hot water or wait for the distribution system to supply hot water through the open hot water valve. Most users have learned that to obtain the desired hot water, the hot water valve must be opened and left open for some time so that the cool water in the hot water side of the piping system will flow out ahead of the more recently heated hot water. For certain fixtures, such as virtually all dishwashers and washing machines, there typically is no easy method of "draining" away the cold or tepid water in the hot water pipes prior to utilizing the water in the fixture.

The inability to have hot water at the hot water side of the fixture when it is desired creates a number of problems. One problem, as described above, is having to utilize cold or tepid water when hot water is desired. Even in those fixtures where the person can allow the cold or tepid water to flow out of the fixture until the water reaches the desired warm or hot temperature, such as a bath or shower, there are certain problems associated with such a solution. One such problem is the waste of water that flows out of the fixture through the drain and, typically, to the sewage system. This good and clean water is wasted, resulting in unnecessary water treatment after flowing through the sewage system. This waste of water is compounded when the person is inattentive and hot water begins flowing down the drain and to the sewage system. Yet another problem associated with the inability to have hot water at the hot water valve when needed is the waste of time for the person who must wait for the water to reach the desired temperature before he or she can take a bath or shower at the desired temperature.

The use of bypass valves and/or water recirculation systems in home or industrial water distribution systems to overcome the problems described above have been known for some time. The general objective of the bypass valve or recirculation system is to avoid supplying cold or tepid water at the hot water side of the piping system when the user desires hot water. U.S. Pat. No. 2,842,155 to Peters describes a thermostatically controlled water bypass valve, shown as FIG. 2 therein, that connects at or near the fixture located away from the water heater. The inventor discusses the problems of cool "hot" water and describes a number of prior art attempts to solve the problem. The bypass valve in the Peters patent comprises a cylindrical housing having threaded ends that connect to the hot and cold water piping at the fixture so as to interconnect these piping segments. Inside the housing at the hot water side is a temperature responsive element having a valve ball at one end that can sealably abut a valve seat. The temperature responsive element is a metallic bellows that extends when it is heated to close the valve ball against the valve seat and contracts when cooled to allow water to flow from the hot side to the cold side of the piping system when both the hot and cold water valves are closed. Inside the housing at the cold water side is a dual action check valve that prevents cold water from flowing to the hot water side of the piping system when the hot water valve or the cold water valve is open. An alternative embodiment of the Peters' invention shows the use of a spiral temperature responsive element having a finger portion that moves left or right to close or open the valve between the hot and cold water piping segments. Although the invention described in the Peters' patent relies on gravity or convection flow, similar systems utilizing pumps to cause a positive circulation are increasingly known. These pumps are typically placed in the hot water line in close proximity to the fixture where "instant" hot water is desired.

U.S. Pat. No. 5,623,990 to Pirkle describes a temperature-controlled water delivery system for use with showers and eye-wash apparatuses that utilize a pair of temperature responsive valves, shown as FIGS. 2 and 5 therein. These valves utilize thermally responsive wax actuators that push valve elements against springs to open or close the valves to allow fluid of certain temperatures to pass. U.S. Pat. No. 5,209,401 to Fiedrich describes a diverting valve for hydronic heating systems, best shown in FIGS. 3 through 5, that is used in conjunction with a thermostatic control head having a sensor bulb to detect the temperature of the supply water, U.S. Pat. No. 5,119,988 also to Fiedrich describes a three-way modulating diverting valve, shown as FIG. 6. A non-electric, thermostatic, automatic controller provides the force for the modulation of the valve stem against the spring. U.S. Pat. No. 5,287,570 to Peterson et al. discloses the use of a bypass valve located below a sink to divert cold water from the hot water faucet to the sewer or a water reservoir. As discussed with regard to FIG. 5, the bypass valve is used in conjunction with a separate temperature sensor.

Recirculating systems for domestic and industrial hot water heating utilizing a bypass valve are disclosed in U.S. Pat. No. 5,572,985 to Benham and U.S. Pat. No. 5,323,803 to Blumenauer. The Benham system utilizes a circulating pump in the return line to the water heater and a temperature responsive or thermostatically actuated bypass valve disposed between the circulating pump and the hot water heater to maintain a return flow at a temperature level below that at the outlet from the water heater. The bypass valve, shown in FIG. 2, utilizes a thermostatic actuator that extends or retracts its stem portion, having a valve member at its end, to seat or unseat the valve. When the fluid temperature reaches the desired level, the valve is unseated so that fluid that normally circulates through the return line of the system is bypassed through the circulating pump. The Blumenauer system utilizes an instantaneous hot water device comprising a gate valve and ball valve in a bypass line interconnecting the hot and cold water input lines with a pump and timer placed in the hot water line near the hot water heater.

Despite the devices and systems set forth above, many people still have problems with obtaining hot water at the hot water side of fixtures, particularly bath and/or shower fixtures, located away from the hot water heater or other source of hot water. Boosted, thermally actuated valve systems having valves that are directly operated by a thermal actuator (such as a wax filled cartridge) tend not to have any toggle action. Instead, after a few on-off cycles, the valves tend to just throttle the flow until the water reaches an equilibrium temperature, at which time the valve stays slightly cracked open. While this meets the primary function of keeping the water at a remote fixture hot, leaving the valve in a slightly open condition does present two problems. First, the lack of toggle action can result in scale being more likely to build up on the actuator because it is constantly extended. Second, the open valve constantly bleeds a small amount of hot or almost hot water into the cold water piping, thereby keeping the faucet end of the cold water pipe substantially warm. If truly cold water is desired (i.e., for brushing teeth, drinking, or making cold beverages), then some water must be wasted from the cold water faucet to drain out the warm water. If the bypass valve is equipped with a spring-loaded check valve to prevent siphoning of cold water into the hot water side when only the hot water faucet is open, then the very small flow allowed through the throttled-down valve may cause chattering of the spring loaded check valve. The chattering can be avoided by using a free floating or non-spring loaded check valve. It is also detrimental to have any noticeable crossover flow (siphoning) from hot to cold or cold to hot with any combination of faucet positions, water temperatures, or pump operation.

Related U.S. Pat. No. 6,536,464 describes an under-the-sink thermostatically controlled bypass valve and water circulating system with the bypass valve placed at or near a fixture (i.e., under the sink) to automatically bypass cold or tepid water away from the hot water side of the fixture until the temperature of the water reaches the desired level. Related U.S. Pat. No. 6,929,187 describes a water control fixture having a thermostatically controlled bypass valve integral with the fixture, either in a separate chamber or in the operating valve, for bypassing cold or tepid water away from the hot side of the fixture. Related U.S. Pat. No. 7,073,528 describes a bath and/or shower water control valve that is adapted to either attach to or which includes a bypass valve. Related patent application Ser. No. 10/832,492 describes apparatuses and systems for retrofitting an existing water control valve mounted in a water distribution system. Preferably, the above-mentioned bypass valves utilize a thermal actuator element that is thermally responsive to the temperature of the water to automatically control the diversion of water from the fixture, so as to maintain hot water availability at the hot water side of the fixture. The above described related patents and patent application address some of the aforementioned problems, however problems remain with known hot water recirculation systems.

SUMMARY OF THE INVENTION

In one aspect, a thermostatically controlled bypass valve is provided including a housing having a first inlet port and a first discharge port located proximate to one another, wherein the first inlet port is configured to receive hot water, and the first discharge port is configured to discharge the hot water. The housing has a second inlet port and a second discharge port located proximate to one another, wherein the second inlet port is configured to receive cold water, and the second discharge port is configured to discharge the cold water. The first and second inlet and discharge ports are formed integral with one another as part of the housing, and the housing includes a passage permitting recirculating flow between the first and second inlet ports. A thermally sensitive actuating member is disposed in a chamber in the housing, wherein the thermally sensitive actuating member extends when heated and contracts when cooled. A bias spring is disposed in the chamber in the housing, wherein the bias spring engages the thermally sensitive actuating member and urges the thermally sensitive actuating member to contract. The thermally sensitive actuating member extends to close the passage and contracts to open the passage based on a temperature of the thermally sensitive actuating member.

In another aspect, a thermostatically controlled bypass valve configured to be located proximate a fixture in the water circulating system is provided, wherein the valve includes a housing having a hot water port and a cold water port formed integral with one another as part of the housing. The hot water port is configured to communicate with a hot water supply line, and the cold water port is configured to communicate with a cold water supply line. The housing has a passage permitting recirculating flow between the hot and cold water ports. A thermally sensitive actuating member is disposed within the housing. The thermally sensitive actuating member extends when heated and contracts when cooled. The thermally sensitive actuating member opens and closes the passage based on a temperature of the thermally sensitive actuating member.

In yet a further aspect, a water pump and bypass valve sub-system for use in a water circulating system is provided, wherein the sub-system includes a thermostatically controlled bypass valve configured to be located proximate a fixture in the water circulating system. The valve includes a housing having a hot water port and a cold water port formed integral with one another. The hot water port is configured to communicate with a hot water supply line, and the cold water port is configured to communicate with a cold water supply line. The housing has a passage permitting recirculating flow between the hot and cold water ports. A thermally sensitive actuating member is disposed within the housing, wherein the thermally sensitive actuating member extends when heated and contracts when cooled. The thermally sensitive actuating member opens and closes the passage based on a temperature of the thermally sensitive actuating member. The sub-system also includes a water pump configured to be located in the water circulation system remote from the fixture, wherein the pump is configured to pump water through the water circulating system to the bypass valve.

BRIEF DESCRIPTION OF THE DRAWINGS

FIG. 33 is a front view of a typical fixture body for a single handle faucet.

FIG. 34 is a side view of the single handle faucet in FIG. 33.

FIG. 35 is a top view of the faucet body housing for the faucet of FIG. 33.

FIG. 36 is a side cross-sectional view of the faucet body housing for the faucet of FIG. 33.

FIG. 37 is a bottom view of the faucet body housing of the faucet of FIG. 33.

FIG. 43 is a top view of the ball of FIG. 42.

FIG. 44 is a side view of the ball of FIG. 42.

FIG. 45 is a cross sectional view of an exemplary modified replaceable cylindrical valving cartridge used in some faucets.

DETAILED DESCRIPTION OF THE PREFERRED EMBODIMENTS

With reference to the figures where like elements have been given like numerical designations to facilitate the reader's understanding, preferred embodiments are set forth below. The enclosed figures and drawings are illustrative of the preferred embodiments and represent preferred operations and orientations. Although specific components, materials, configurations and uses are illustrated, it should be understood that a number of variations to the components and to the configuration of those components described herein and in the accompanying figures can be made without changing the scope and function of the invention set forth herein.

In the accompanying drawings of the various preferred embodiments of a water control valve, the tub/shower water control valve is shown as 10 (i.e., FIGS. 1 and 5) and a bypass valve is shown as 16 (i.e., FIG. 2) that is adaptable for use with the apparatus and system for retrofitting water control valve 10. However, other water control valves may be adaptable to the system for incorporating bypass valve 16, as described herein. Bypass valve 16 for use with water control valve 10 can be one of many different types of available bypass valves, including a thermostatically controlled bypass valve (as described in the patent and co-pending patent applications referenced above), an electric solenoid controlled bypass valve, a needle-type bypass valve as described in the above-referenced Blumenauer patent or a mechanical push button bypass valve such as sold by Laing and others. Pursuant to various embodiments of the apparatus and system, as described in detail below, water control valve 10 is adaptable for use with various types of bypass valves 16.

Figure 1:
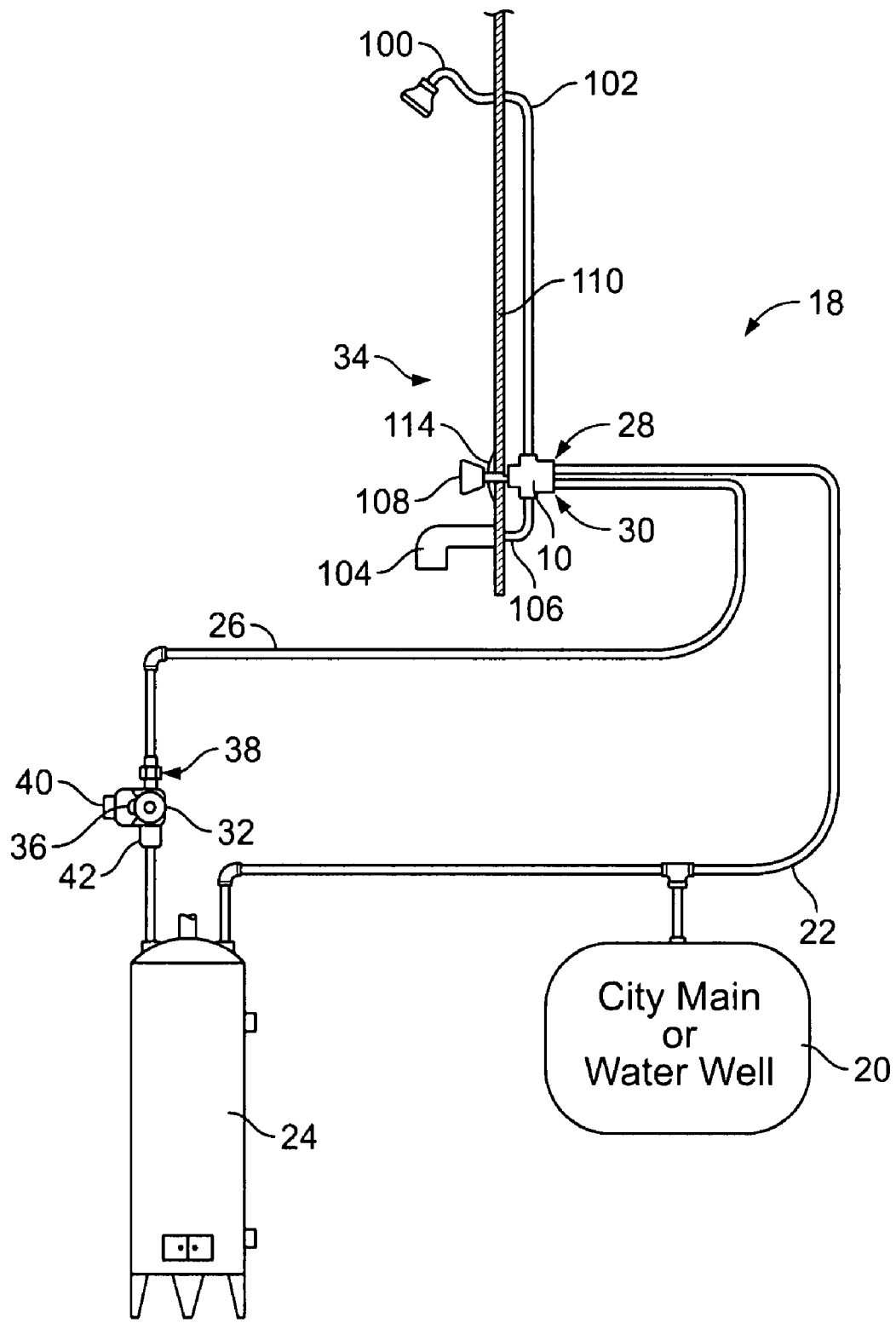
FIG. 1 shows a water distribution system having a pump added to the hot water line to distribute hot and cold water to a water control valve in a shower/tub assembly.

A typical water distribution system 18 utilizing tub/shower water control valve 10 is illustrated in FIG. 1. A standard water distribution system 18 typically comprises a supply of cold water 20, such as from a city main or water well, that supplies cold water directly to water control valve 10 through cold water line 22 and water to hot water heater 24 so that it may heat the water and supply hot water to water control valve 10 through hot water line 26. Cold water line 22 connects to water control valve 10 at cold water inlet 28 and hot water line 26 connects to water control valve 10 at hot water inlet 30, as explained in more detail below. The preferred water distribution system 18 utilizes a small circulating pump 32 of the type used in residential hot water space heating. A very low flow and low head pump 32 is desirable because a larger (i.e., higher head/higher flow) pump mounted at the typical domestic water heater 24 tends to be noisy. This annoying noise is often transmitted by the water pipes throughout the house, In addition, if the tub/shower system 34 (as an example) is already in use when pump 32 turns on, whether the first start or a later cyclic turn-on, the sudden pressure boost in the hot water line 26 from a larger pump can result in an uncomfortable and possibly near-scalding temperature rise in the water at the shower head or other fixture in use. The smaller boost of a "small" pump (i.e., one with a very steep flow-head curve) will result in only a very small and less noticeable increase in shower temperature.

In an embodiment, the single, small pump 32 needs to provide only a flow of approximately 0.3 gpm at 1.0 psi pressure. In accordance with pump affinity laws, such a "small" pump requires a very small impeller or low shaft speed. The inventors have found that use of a very small impeller or low shaft speed also precludes formation of an air bubble in the eye of the impeller, which bubble may be a major cause of noise. Such a small steep curve pump may, however, constitute a significant pressure drop in the hot water line 26 when several fixture taps are opened simultaneously (such as a bathtub and the kitchen sink). To avoid reduced flow in those installations having a relatively low volume pump, a check valve 36 can be plumbed in parallel with pump 32 or incorporated within the pump housing, to pass a flow rate exceeding the pump's capacity around pump 32. When pump 32 is powered and flow demand is low, check valve 36 prevents the boosted flow from re-circulating back to its own inlet. With check valve 36 plumbed around pump 32, it is advantageous to place an orifice 38 in the pump discharge to provide a simple manner to achieve the desired very steep flow-head curve from available stock pump designs. A single pump 32 located at or near water heater 24 in its discharge piping will boost the pressure in the hot water pipes somewhat above that in the cold water pipes (i.e., perhaps one to three feet of boost). With this arrangement only one pump 32 per plumbing system (i.e., per water heater 24) is required with any reasonable number, such as the typical number used in residences, of remote water control valves (i.e., tub/shower valve 10), equipped with bypass valve 16 by retrofitting according to embodiments of the apparatus and system. This is in contrast to those systems that require multiple pumps 32, such as a pump 32 at each fixture where bypassing is desired.

If desired, pump 32 can operate twenty-four hours a day, with most of the time in the no flow mode. However, this is unnecessary and wasteful of electricity. Alternatively, and preferably, pump 32 can have a timer 40 to turn pump 32 on daily at one or more times during the day just before those times when hot water is usually needed the most (for instance for morning showers, evening cooking, etc.) and be set to operate continuously for the period during which hot water is usually desired. This still could be unnecessary and wasteful of electricity. Another alternative is to have the timer 40 cycle pump 32 on and off regularly during the period when hot water is in most demand. The "on" cycles should be of sufficient duration to bring hot water to all remote fixtures that have water control valves (such as tub/shower valve 10) equipped with bypass valve 16, and the "off" period would be set to approximate the usual time it takes the water in the lines to cool-down to minimum acceptable temperature. Yet another alternative is to equip pump 32 with a normally closed flow switch 42 sized to detect significant flows only (i.e., those flows that are much larger than the bypass flows), such as water flow during use of shower system 34. For safety purposes, the use of such flow switch 42 is basically required if a cyclic timer 40 is used. The switch 42 can be wired in series with the motor in pump 32. If switch 42 indicates an existing flow at the moment timer 40 calls for pump 32 to be activated, open flow switch 42 will prevent the motor from starting, thereby avoiding a sudden increase in water temperature at tub/shower fixture 34 being utilized. The use of switch 42 accomplishes several useful objectives, including reducing electrical power usage and extending pump 32 life if hot water is already flowing and there is no need for pump 32 to operate, avoiding a sudden temperature rise and the likelihood of scalding that could result from the pump boost if water is being drawn from a "mixing" valve (such as tub/shower valve 10 shown in FIG. 1 or a single handle faucet) and allowing use of a "large" pump 32 (now that the danger of scalding is eliminated) with its desirable low pressure drop at high flows, thereby eliminating the need for the parallel check valve 36 required with a "small" pump 32.

By using a time-of-day control timer 40, pump 32 operates to maintain "instant hot water" only during periods of the day when it is commonly desired. During the off-cycle times, the plumbing system 18 operates just as if the fixture having bypass valve 16 and pump 32 were not in place. This saves electrical power usage from operation of pump 32 and, more importantly, avoids the periodic introduction of hot water into relatively uninsulated pipes during the off-hours, thereby saving the cost of repeatedly reheating this water. The time-of-day control also avoids considerable wear and tear on pump 32 and bypass valve 16. Considerable additional benefits are gained by using a cyclic timer 40, with or without the time-of-day control. In addition to saving more electricity, if a leaky bypass valve 16 (i.e., leaks hot water to cold water line 22) or one not having toggle action is used, there will be no circulating leakage white the pump 32 is cycled off, even if bypass valve 16 fails to shut off completely. Therefore, a simple (i.e., not necessarily leak tight) bypass valve 16 may suffice in less demanding applications. Reducing leakage to intermittent leakage results in reduced warming of the water in cold water line 22 and less reheating of "leaking" re-circulated water.

Figure 2:
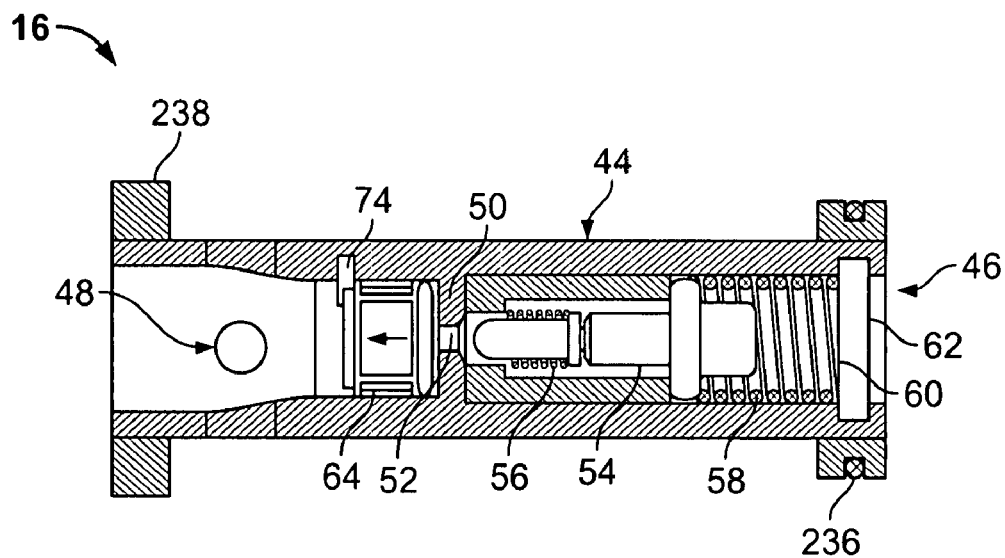
FIG. 2 is a cross-sectional side view of a bypass valve for use with the water control valves.

As described above, various types of bypass valves 16 may be utilized to accomplish the objective of bypassing cold or tepid water around the tub/shower fixture 34 associated with water control valve 10, which is adaptable for use with bypass valve 16. The preferred bypass valve 16 is the thermostatically controlled type, an example of which is shown in FIG. 2 and described in detail below, due to its ability to automatically sense and respond to the temperature of the water in hot water line 26 at water control valve 10. Unlike the electrical solenoid type of bypass valve or the manually operated type of bypass valve, a thermostatically controlled bypass valve 16 does not require any external operational input to activate in order to bypass cold or tepid water in hot water line 26 so as to maintain hot water at hot water inlet 30 of water control valve 10.

Figure 3:
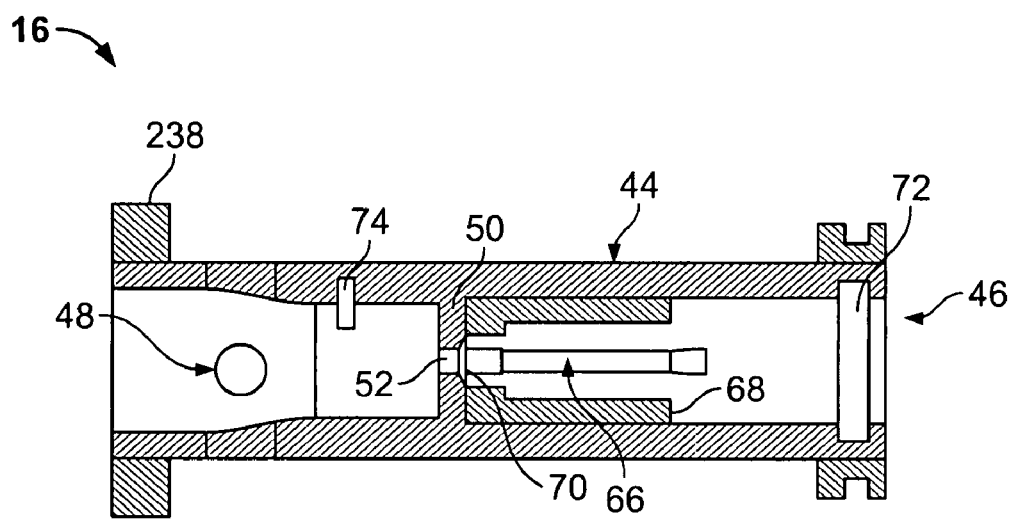
FIG. 3 is a cross-sectional side view of the valve body of the bypass valve shown in FIG. 2.
Figure 4:
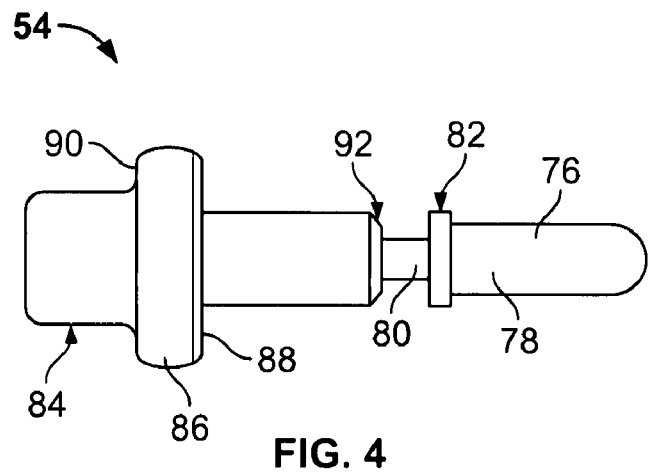
FIG. 4 is a side view of an exemplary thermally sensitive actuating element, shown in its unmodified condition, for use in an exemplary thermostatically controlled bypass valve.

As best shown in FIGS. 2 through 4, the preferred thermostatically controlled bypass valve 16, which can be configured for use with water control valve 10, comprises a generally tubular bypass valve body 44 having bypass valve inlet 46, bypass valve outlet 48 and a separating wall 50 disposed therebetween. As described in more detail below, bypass inlet 46 hydraulically connects to hot water inlet 30 and bypass outlet 48 hydraulically connects to cold water inlet 28 of water control valve 10. Bypass valve passageway 52 in separating wall 50 interconnects inlet 46 and outlet 48 to allow fluid to flow therethrough when bypass valve 16 is bypassing cold or tepid water. As best shown in FIG. 2 and discussed in more detail below, valve body 44 houses a thermally sensitive actuating element 54, bias spring 56, an over-travel spring 58, self-cleaning screen 60, retaining mechanism 62 (such as a retaining ring, clip, pin or other like device) and check valve 64. The direction of flow for check valve 64 is shown with the arrow in FIG. 2. Valve body 44 can most economically and effectively be manufactured out of a molded plastic material, such as Ryton®, a polyphenylene sulphide resin available from Phillips Chemical, or a variety of other composites. In general, molded plastic materials are preferred due to their relatively high strength and chemical/corrosion resistant characteristics while providing the ability to manufacture the valve body 44 utilizing injection molding processes with the design based on the configuration described herein without the need for expensive casting or machining. Alternatively, valve body 44 can be manufactured from various plastics, reinforced plastics or metals that are resistant to hot chlorinated water under pressure. As shown in FIG. 3, inlet 46 of valve body 44 can be molded with a set of axially oriented fin guides 66 having ends that form an internal shoulder 68 inside valve body 44 for fixedly receiving and positioning one end of thermal actuating element 54 and bias spring 56, and retainer interruption 72 for receiving retaining mechanism 62. Preferably, retaining mechanism 62 is a retaining ring and retainer interruption 72 is configured such that when retaining mechanism 62 is inserted into valve body 44 it will be engagedly received by retainer interruption 72. Bypass valve outlet 48 can be molded with retaining slot 74 for engagement with the snap-in check valve 64. In the preferred embodiment, valve body 44 is designed so the internal components can fit through inlet 46 and outlet 48, which will typically be, nominally, one-half inch diameter. In this manner, a one piece bypass valve 16 results with no intermediate or additional joints required for installation. In the preferred embodiment, the end having bypass valve inlet 46 is kept close to screen 60 so that the full flow of hot water (when water is flowing from the tub spout or shower head) will wash across the surface of screen 60, making it self-cleaning.

An example of a thermally sensitive actuating element 54 for use with the thermostatically controlled bypass valve 16 is shown in FIG. 4. Actuating element 54 is preferably of the wax filled cartridge type, also referred to as wax motors, having an integral poppet rod member 76 comprising poppet 78 attached to piston 80 with an intermediate flange 82 thereon. The end of poppet 76 is configured to seat directly against valve seat 70 or move a shuttle (i.e., spool or sleeve valves) so as to close passage 52. These thermostatic control actuating elements 54 are well known in the art and are commercially available from several suppliers, such as Caltherm of Bloomfield Hills, Mich. The body 84 of actuating element 54 has a section 86 of increased diameter, having a first side 88 and second side 90, to seat against shoulder 68 or like element in valve body 44. Piston 80 of rod member 76 interconnects poppet 78 with actuator body 84. Actuating element 54 operates in a conventional and well known manner. Briefly, actuating element 54 comprises a blend of waxes or a mixture of wax(es) and metal powder (such as copper powder) enclosed in actuator body 84 by means of a membrane made of elastomer or the like. Upon heating the wax or wax with copper powder mixture expands, thereby pushing piston 80 and poppet 78 of rod member 76 in an outward direction. Upon cooling, the wax or wax/copper powder mixture contracts and rod member 76 is pushed inward by bias spring 56 until flange 82 contacts actuator body 54 at actuator seat 92. Although other types of thermal actuators, such as bimetallic springs and memory alloys (i.e., Nitinol and the like) can be utilized, the wax filled cartridge type is preferred because the wax can be formulated to change from the solids to the liquid state at a particular desired temperature. The rate of expansion with respect to temperature at this change of state is many times higher, resulting in almost snap action of the wax actuating element 54. The temperature set point is equal to the preset value, such as 97 degrees Fahrenheit, desired for the hot water. This is a "sudden" large physical motion over a small temperature change. As stated above, this movement is reacted by bias spring 56 that returns rod member 76 as the temperature falls.

Because bypass valve 16 has little or no independent "toggle action," after a few consecutive cycles of opening and closing, bypass valve 16 tends to reach an equilibrium with the plumbing system, whereby bypass valve 16 stays slightly cracked open, passing just enough hot water to maintain the temperature constantly at its setting. In particular plumbing systems and at certain ambient conditions, this flow is just under that required to maintain a spring loaded check valve cracked continuously open (i.e., check valve 36). In such a situation, check valve 36 chatters with an annoying buzzing sound. To avoid this occurrence, the spring may be removed from check valve 36, leaving the check valve poppet free floating. In the event that the hot water is turned full on at a time when bypass valve 16 is open, thereby lowering the pressure in hot water line 26 and inducing flow from cold water line 22 through the open bypass valve 16 to the hot side, the free floating poppet will quickly close. There is no necessity for a spring to keep check valve 36 closed prior to the reversal in pressures.

Although not entirely demonstrated in early tests, it is believed that beneficial "toggle" action can be achieved with an altered version of the thermostatically controlled bypass valve 16 discussed above. If the motion of actuating element 54 is made to lag behind the temperature change of the water surrounding it by placing suitable insulation around actuating element 54 or by partially isolating it from the "hot" water, then instead of slowly closing only to reach equilibrium at a low flow without reaching shutoff, the water temperature will rise above the extending temperature of the insulated actuating element 54 as bypass valve 16 approaches shutoff, and piston 80 will then continue to extend as the internal temperature of actuating element 54 catches up to its higher surrounding temperature, closing bypass valve 16 completely. It is also believed that an insulated actuating element 54 will be slow opening, its motion lagging behind the temperature of the surrounding cooling-off water from which it is insulated. When actuating element 54 finally allows bias spring 56 to open bypass valve 16 and allow flow, the resulting rising temperature of the surrounding water will again, due to the insulation, not immediately affect it, allowing bypass valve 16 to stay open longer for a complete cycle of temperature rise. Such an "insulated" effect may also be accomplished by use of a wax mix that is inherently slower, such as one with less powdered copper or other thermally conductive filler. An actuating element 54 so altered can be manufactured with a somewhat lower set point temperature to make up for the lag, achieving whatever bypass valve 16 closing temperature desired.

An additional benefit of utilizing pump 32 in a cyclic mode in system 18 is that shut-off of a toggle action valve upon attainment of the desired temperature is enhanced by the differential pressure an operating pump 32 provides. If pump 32 continues to run as the water at water control valve 10 cools down, the pump-produced differential pressure works against re-opening a poppet type bypass valve 16. If pump 32 operates cyclically, powered only a little longer than necessary to get hot water to water control valve 10, it will be "of? before the water at bypass valve 16 cools down. When the minimum temperature is reached, actuating element 54 will retract, allowing bias spring 56 to open bypass valve 16 without having to fight a pump-produced differential pressure. Bypass flow will begin with the next pump "on" cycle. An additional benefit to the use of either a time-of-day or cyclic timer 40 or the above mentioned insulated actuating element 54 is that it improves the operating life of actuating element 54. Because use of either cyclic timer 40 or insulated element 54 causes cyclic temperature changes in bypass valve 16 (as opposed to maintaining an equilibrium setting wherein temperature is constant and actuating element 54 barely moves), there is frequent, substantial motion of the piston 80 in actuating element 54. This exercising of actuating element 54 tends to prevent the build-up of hard water deposits and corrosion on the cylindrical surface of actuator piston 80 and end face of poppet 78, which deposits could render bypass valve 16 inoperable.

Also inside bypass valve 16 can be an over-travel spring 58 disposed between the second side 90 of the actuator body 84 and a stop, such as retaining mechanism 62 shown in FIG. 2, located inside bypass valve 16 to prevent damage to a fully restrained actuating element 54 if it were heated above the maximum operating temperature of bypass valve 16 and to hold actuating element 54 in place during operation without concern for normal tolerance. Use of over-travel spring 58, which is not necessary for spool-type valves, allows movement of actuator body 84 away from the seated poppet 78 in the event that temperature rises substantially after poppet 78 contacts valve seat 70. Without this relief, the expanding wax could distort its copper can, destroying the calibrated set point. Over-travel spring 58 also holds bias spring 56, rod member 76 and actuator body 84 in place without the need to adjust for the stack-up of axial tolerances. Alternatively, actuating element 54 can be fixedly placed inside bypass valve 16 by various mechanisms known in the art, including adhesives and the like. Over-travel spring 58, if used, can be held in place by various internal configurations commonly known in the art, such as a molded seat (not shown).

Although there are a great many manufacturers and configurations of water control valves 10, it is believed that there are several generic forms of such valves that can be used. The water control valves 10 adaptable for use with bypass valve 16, including but not limited to thermostatically controlled bypass valves, include various types of combination shower/tub valve 10. As such, these generic forms of water control valve 10 are utilized below to illustrate several different types of designs that are adaptable for the use of bypass valve 16 therewith according to the apparatus and system for retrofitting water control valve 10. The opportunity afforded by water control valve 10 is the access to the hot, cold and discharge ports when the existing valve cartridge is removed and replaced with an adapter plug, as discussed in detail below. The following examples are only representative of the types of water control valves 10 with which bypass valve 16 can be used. As is well known in the art, the individual manufacturers have various models of water control valves to incorporate desired features and preferences. The examples are for illustrative purposes only and are not intended to restrict the bypass valve 16 to particular uses, sizes or materials used in the examples.

As is well known, many homes have a combination shower and tub assembly whereby the same water control valve 10 is used to control the flow and temperature to the shower and the tub. A selector valve (not shown) is typically used to select the flow between the shower and the tub. An example shower/tub system is shown as 34 in FIG. 1. A similar water control valve to that shown as 10, is used for systems comprising only a shower or a tub, with the exception that such valve only has one discharge port (connected to either the shower or the tub). In the shower/tub system 34, water control valve 10, distributes water to shower head assembly 100 through shower line 102 and to tub spout 104 through tub line 106, as exemplified in the system of FIG. 1. A flow control handle 108 is used to control the flow and temperature of water to the shower head assembly 100 or tub spout 104. Although a single flow control handle 108 is shown in FIG. 1, it is understood that some shower, tub and shower/tub flow control valves utilize separate handles for the hot and cold water control. One of the primary distinguishing characteristics of virtually all existing shower/tub water control valves 10 is that they are positioned at least partially behind support wall 110 that forms part of the shower and/or tub enclosure and which is used to support shower head assembly 100 and tub spout 104. Because access to water control valve 10 is important for maintenance or repair of water control valve 10, even if positioned entirely behind support wall 110, water control valve 10 is generally placed behind an opening 112 in support wall 110 specifically configured for accessing water control valve 10. Typically a removable plate 114, commonly referred to as an escutcheon plate, is used to cover opening 112. To access water control valve 10, plate 114 is removed and valve 10 is maintained or repaired through opening 112 in support wall 110 and then plate 114 is reinstalled.

Figure 5:
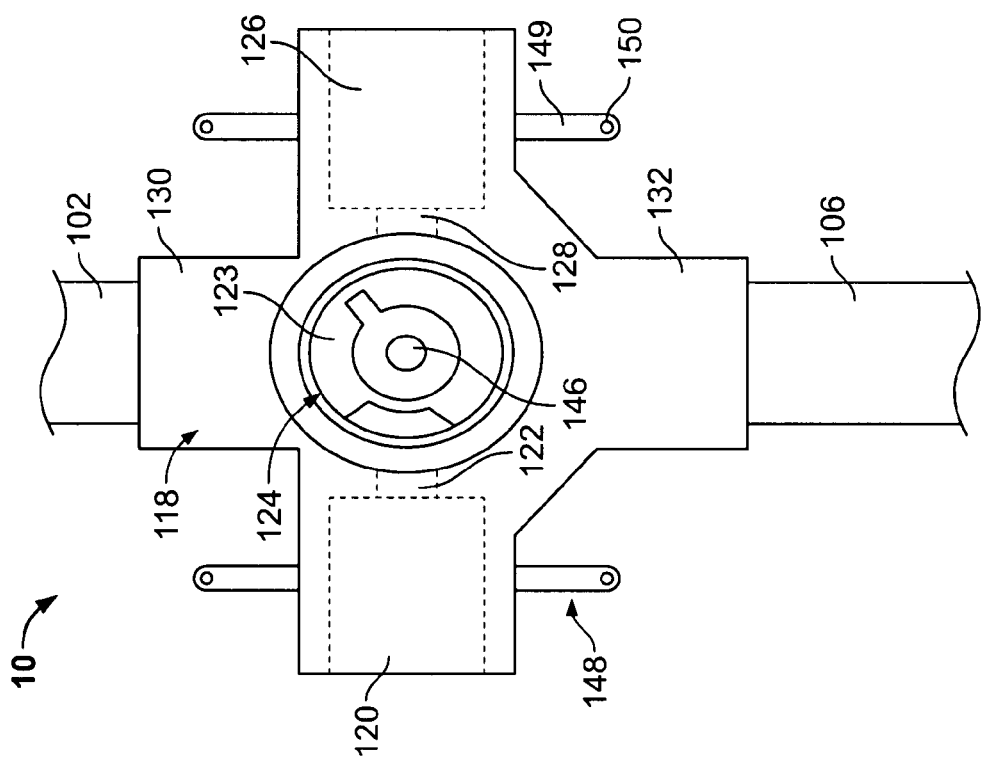
FIG. 5 is a front view of a prior art shower/tub water control valve showing a valve cartridge disposed in the valve manifold of the water control valve.

A typical tub/shower water control valve 10, such as the Peerless® valve shown in more detail in FIG. 5, is used to illustrate various configurations that are adaptable for retrofit use with bypass valve 16. The typical water control valve 10 comprises a valve manifold (body/housing) 118 having a hot water inlet 120 that connects to hot water line 26 to allow hot water to flow through control valve hot passageway 122 to the inner valve workings, which generally comprise a removable valve cartridge 123 disposed inside cartridge receptor 124 of valve manifold 118, and a cold water inlet 126 that connects to cold water line 22 to allow cold water to flow through control valve cold passageway 128 to valve cartridge 123 inside cartridge receptor 124. Typically, cartridge receptor 124 is configured as a cylindrical or spherical cavity that is sized to receive valve cartridge 123 therein. Alternatively, cartridge receptor 124 may be configured as a generally flat surface on which valve cartridge 123 is mounted or attached (such as utilized in the American Standard model 6211 water control valve). In either configuration, as well as others, cartridge receptor 124 has three ports, one each for the inflow of hot and cold water from hot water line 26 and cold water line 22, respectively, and one for the discharge of mixed water to shower line 102 and/or tub line 106. When joined to cartridge mounting surface, valve cartridge 123 controls The' mix of hot and cold water to shower head assembly 100 or tub spout 104 through shower discharge 130 to shower line 102 or through tub discharge 132 to tub line 106, respectively. Tub/shower water control valves 10 intended for installation behind support wall 110 adjacent to shower system 34 have been and are commonly permanently or at least somewhat permanently plumbed into the water distribution system 16 such that valve manifold 118 is not replaceable without tearing out a wall and physically removing the valve manifold 118 (i.e., by sawing) from water distribution system 18. The dynamic seals and mating surfaces on the valving members that are subject to wear are generally internal to replaceable valve cartridge 123. For the dual handle designs, having separate handles for the hot and cold water valves, the faucet washer on a rising stem could be replaced, as could the valve stem, bonnet packing and valve seat. On the more modern water control valves, such as that shown as 10 in FIG. 5, the entire valve cartridge 123 is replaceable. Because all dynamic valving action is done internally in these modern cartridges, with only static seals on the exterior of valve cartridge 123, replacement of valve cartridge 123 replaces all of the seals and mating valving surfaces that are subject to wear. Modern two handle fixtures also utilize separate, replaceable hot and cold water cartridges. Many modern tub/shower valve cartridges 123, particularly the single handle designs, contain a balance piston device to sense and compensate for changes in the relative pressure levels of the hot and cold supply water, such as can occur when a toilet is flushed or a faucet is opened wide.

Figure 19:
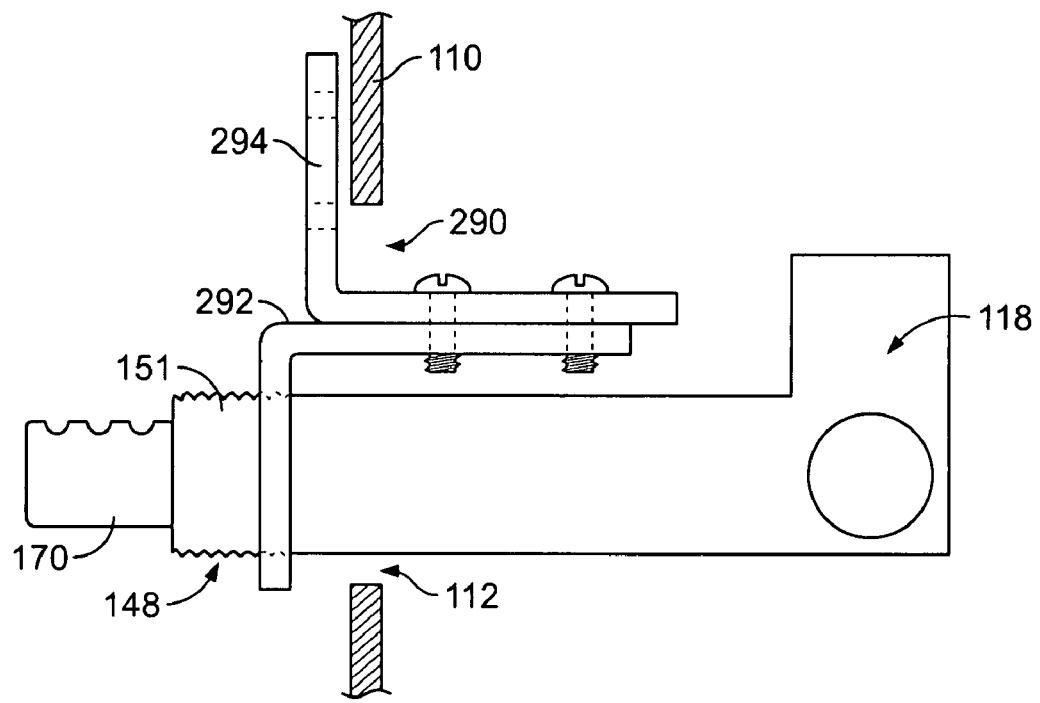
FIG. 19 is a side view of a second configuration of a bracket shown attached to the valve manifold of a water control valve.

The replaceable valve cartridge 123 in modern control valves, an example of which is shown as 10 in FIG. 5, communicates with hot inlet port 134, cold inlet port 136 and discharge port 138 (shown in FIG. 6 with valve cartridge 123 removed) inside cartridge receptor 124 of valve manifold 118 through one or more fixed static seals, such as O-rings (not shown), on the exterior of valve cartridge 123. Ports 134, 136 and 138 form valve cartridge interface 140 inside cartridge receptor 124 that cooperates with valve cartridge 123 to transfer fluid from inlets 120 (hot) and 126 (cold) to discharges 130 (shower) and 132 (tub). In the example shown in FIG. 6, ports 134, 136 and 138 are positioned inside separate port cavities 142 that are configured to communicate with the end of valve cartridge 123 that is inserted inside cartridge receptor 124. Valve cartridge 123 is appropriately and cooperatively ported to flow water from hot water line 26 and/or cold water line 22 to shower discharge 130 and tub discharge 132. The opposite end of valve cartridge 123, which extends generally outwardly from cartridge receptor 124, as shown in FIG. 5, generally includes one or more mechanisms that cooperate with flow control handle 108 for selecting the relative amount of hot and cold water and for controlling the on/off and volume of flow to shower head 100 and/or tub spout 104, such as on/off/flow stem 146 which operatively connects to flow control handle 108 to allow the user to control the temperature and flow volume of water. For the control valve 10 shown in FIG. 5, as an example, on/off/flow stem 146 rotates for temperature control to turn the flow of water on and off. For many older configurations, stem 146 reciprocates to control the on/off and flow rate functions and rotates to control the water temperature. Attached to, connected to or part of the typical control valve 10, shown in FIG. 5, are one or more escutcheon mounting mechanisms 148 that are configured to removably mount escutcheon plate 114 so as to cover wall opening 112 with escutcheon plate 114. As shown in FIG. 5, escutcheon mounting mechanisms 148 can comprise tab members 149 having a threaded mounting hole 150 configured to removably receive a bolt, screw or other connecting device for holding escutcheon plate 114 over wall opening 112. Alternatively, mounting mechanism 148 can be configured with the outer end 151 of valve manifold 118 being threaded, as shown in FIG. 19, to receive escutcheon plate 114 having a large mating hole. Typically, a large single nut then clamps escutcheon plate 114 in place. The typical valve cartridge 123 also has one or more external sealing members, such as O-rings (not shown), that cooperate with wall 152 of cartridge receptor 124.

As known to those skilled in the art, water control valves 10 are available in many different configurations incorporating various design and operational preferences depending on the company, model, and/or desired features. Although such water control valves 10 may differ somewhat, such as various configurations for radially or axially disposed inlets and discharges, replaceable valve cartridge 123 generally has a first end (the insert end) that cooperates with valve cartridge interface 140, having hot 134, cold 136 and discharge 138 ports, a sealing mechanism (not shown) that cooperates with wall 152 of cartridge receptor 124 (those formed as a cavity), and a second end (the extending end) that cooperates with flow control handle 108. The way in which these components cooperate may be somewhat different depending on the manufacturer and/or model. For instance, the positioning of hot 134, cold 136 and discharge ports 138 at valve cartridge interface 140 generally varies by manufacturer and/or model of water control valve 10. In some brands/models of water control valve 10, valve cartridge interface 140 may have one or more, or all, of these ports positioned on wall 152 of the cavity that forms cartridge receptor 124 instead of on the bottom of the cavity shown in FIG. 6. As known to those skilled in the art, however ports 134, 136 and 138 are configured relative to cartridge receptor 124, valve cartridge 123 is appropriately ported so as to cooperate with ports 134, 136 and 138 of valve cartridge interface 140 so as to transfer water from hot water line 26 and/or cold water line 22 to shower line 102 and tub line 106 so as to deliver water to shower head 100 or tub spout 104, as selected by the user through operation of flow control handle 108, and appropriately configured to cooperate with flow control handle 108. Valve cartridge 123 may have internal channels or external channels, which cooperate with valve receptor 124 to provide the flow path, to move the water between inlet ports 134 (hot) and 136 (cold) to discharge port 138. Escutcheon mounting mechanisms 148 may be mounted, attached or otherwise cooperatively engaged with valve manifold 118 to secure escutcheon plate 114 over wall opening 112. The various improvement features, such as pressure balancing, are likewise incorporated differently in water control valve 10 by the different manufacturers and/or on different models by the same manufacturer.

Complete replacement of existing water control valves 10 installed behind support wall 110 is generally impractical, as it usually requires tearing out a large section of the shower support wall 110 (including any tile or fiberglass surfaces) and physically sawing through the existing plumbing to free the old valve manifold 118. At least a portion of the existing plumbing must then be replaced, including new union fittings added where threaded pipe is utilized. Additionally, at least a portion of support wall 110, with tile or other water-resistant covering, must then be reinstalled. The scope of this replacement work is beyond the capability or ambition of most homeowners and the cost to hire a contractor/plumber to do the work is generally so high as to be prohibitive to the typical homeowner. As such once a particular manufacturer's water control valve 10 is installed, it is very difficult to replace that valve 10 with one by a different manufacturer or even by a different model made by the same manufacturer. One purpose is to allow retrofitting of existing water control valves 10 in tub/shower fixtures 34 with the newer features of instant hot water (i.e., through use of bypass valve 16 or others), pressure balance temperature regulation, anti-scalding and/or temperature sensitive mixing, as well as other possible features, without the need for replacing the installed/mounted component (i.e., the valve manifold 118) of the existing water control valve 10.

Figure 6:
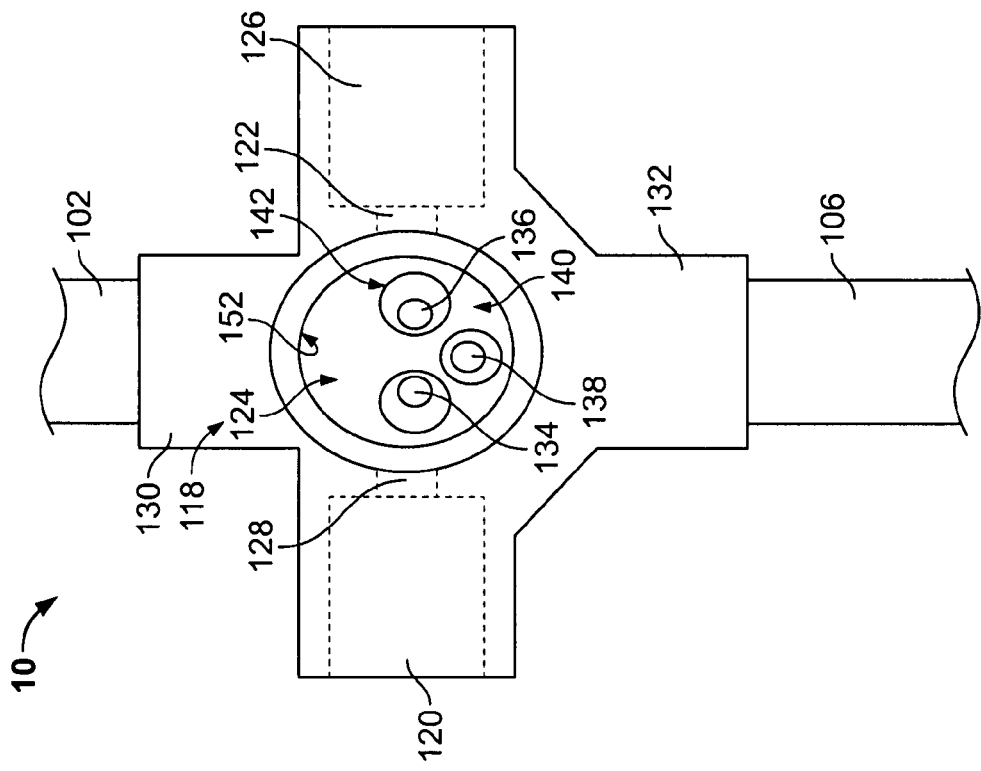
FIG. 6 is a front view of the prior art shower/tub water control valve of FIG. 5 showing the valve cartridge removed from the valve manifold to expose the valve cartridge interface of the water control valve.
Figure 7:
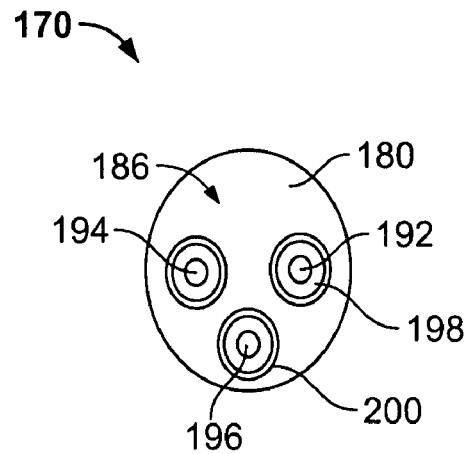
FIG. 7 is a front view of the first end of an adapter plug configured according to one embodiment showing a configuration for the first plug interface.
Figure 8:
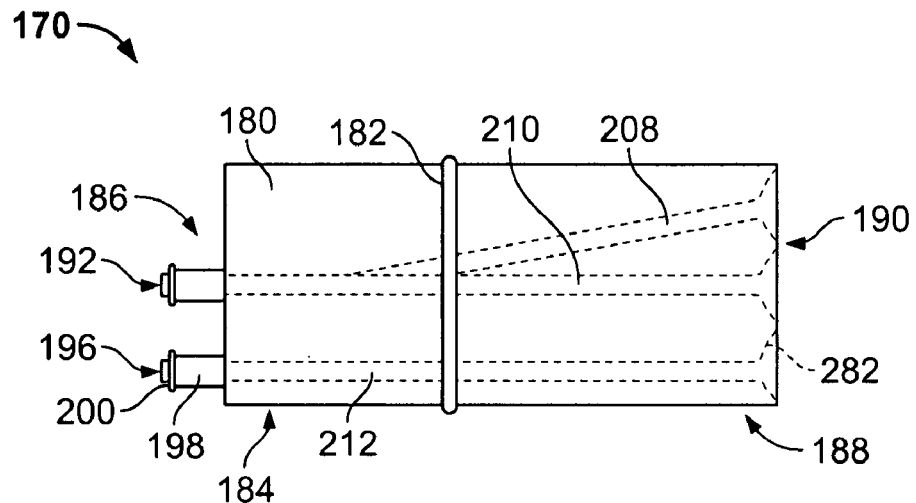
FIG. 8 is a side view of the adapter plug shown in FIG. 7.
Figure 9:
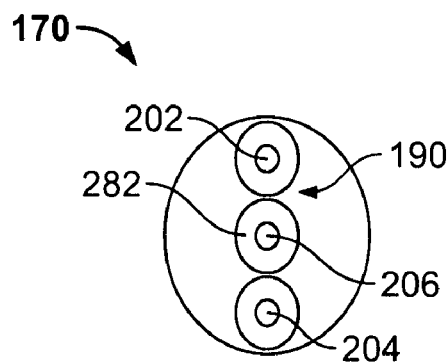
FIG. 9 is a front view of the second end of the adapter plug shown in FIG. 7 showing a configuration for the second plug interface.

The flow control handle 108, escutcheon plate 114 and valve cartridge 123 of the existing water control valve 10 are removed and discarded. Once these components are removed, thereby exposing valve cartridge interface 140 on or inside valve receptor 124 of valve manifold 118, an adapter plug 170, an example of which is shown in FIGS. 7 through 9, can be inserted inside or against valve receptor 124. The adapter plug 170 shown in these figures, is a simplified example of an adapter plug 170 that is configured to be utilized with a relatively larger size cavity for cartridge receptor 124, as shown in FIG. 6, so as to more easily illustrate and discuss the various features. As set forth in more detail below, configurations of certain valve cartridge 123 and cartridge interface 140 will require a more compact design in order to accomplish these same objectives. The intent is to provide a retrofitting system, shown as 172 in FIG. 10, that includes an adapter plug 170 which is specifically configured for a particular make and model of existing water control valve 10, thereby providing for its particular cartridge interface 140 and cartridge receptor 124, so the user can then utilize a new, and typically improved, retrofit water control valve 174 to provide the desired flow control characteristics. In this manner, the user can relatively simply and quickly retrofit his or her shower/tub system 34 to include the various features that are currently available, such as the instant hot water and pressure balancing features discussed herein, without having to replace the valve manifold 118 that is fixedly installed in their water distribution system 18. Even if the water control valve 10 of the user's existing shower/tub system 34 has these features already, the use of the retrofit system 172 allows the user the vastly improved flexibility to change from one manufacturer and/or model to another.

Figure 10:
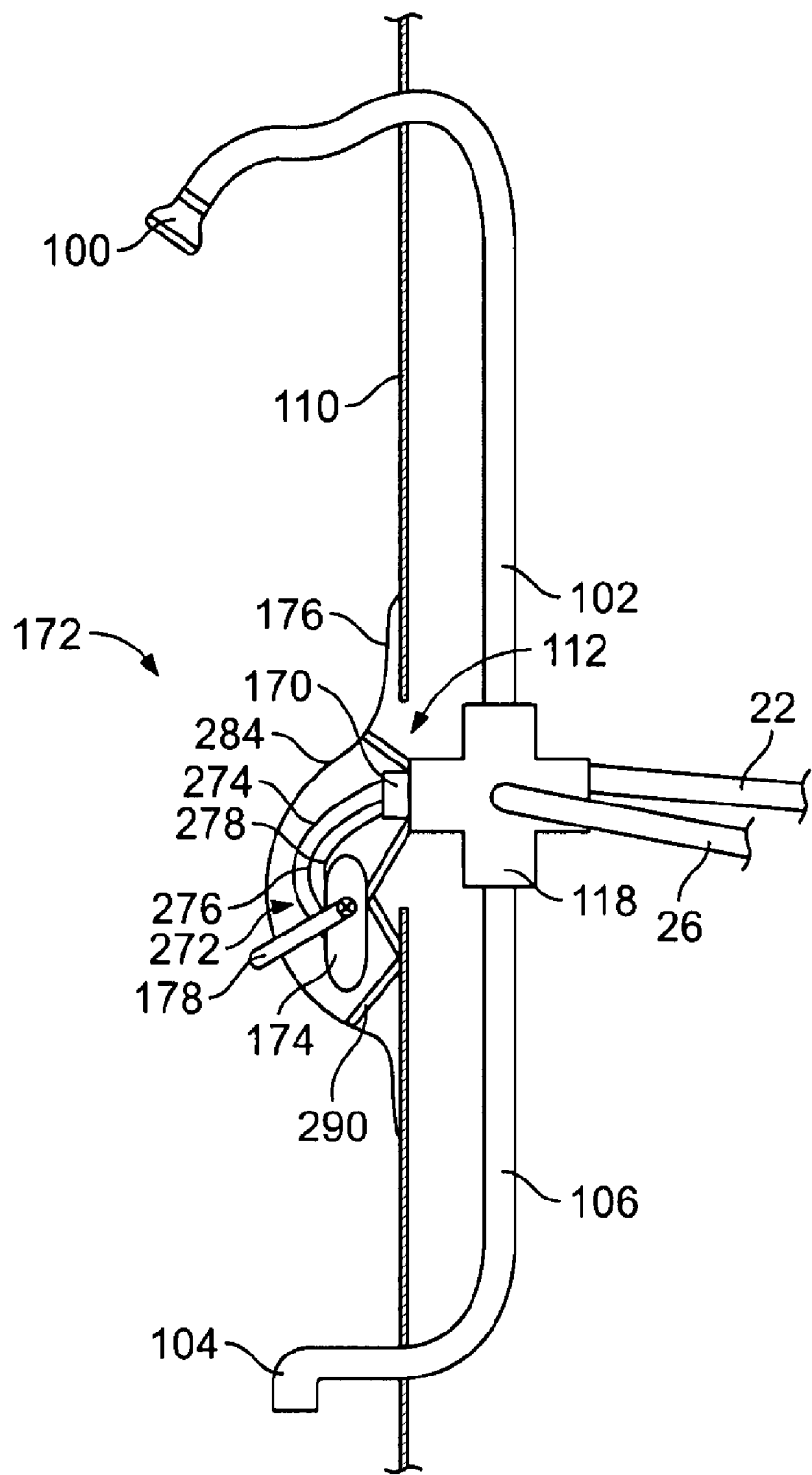
FIG. 10 is cross-sectional side view of a retrofit system with an escutcheon plate having a blister portion covering the exposed end of the adapter plug and the retrofit valve.

As shown in FIG. 10, adapter plug 170 of retrofit system 172 hydraulically connects to retrofit valve 174, which can be done at the time of installation unless they have been previously connected or they are configured integrally, and a modified escutcheon plate 176 and a new flow control handle 178 are utilized, as best shown in the retrofit system 172 of FIG. 10. In one preferred embodiment, adapter plug 170 comprises a plug body 180 that is sized and configured to be received in the cavity forming valve receptor 124 with generally, but not necessarily always, one or more plug sealing members, such as the O-ring shown as 182 in FIG. 8, disposed around the outer surface of plug body 180 to sealably interact with wall 152 of the cavity. In some configurations, no sealing members 182 will be required around plug body 180. At the first end 184 of plug body 180, the end which is inserted inside valve receptor 124 and placed against valve cartridge interface 140, is first plug interface 186 that is configured to connect to and cooperate with valve cartridge interface 140 so as to transfer fluid from valve manifold 118 to retrofit valve 174. At the second end 186 of plug body, the end which extends generally outwardly from valve receptor 124, is second plug interface 190. As explained in more detail below, second plug interface 190 is configured to hydraulically transfer fluid from adapter plug 170 to retrofit valve 174. As known to those skilled in the art, plug body 180 can be made out of a variety of different materials, including various plastics, metals and composites.

For the valve manifold 118 shown in FIGS. 5 and 6, with valve cartridge interface 140 shown in FIG. 6, first plug interface 186 can be configured as shown in FIGS. 7 and 8. In this configuration, first plug interface 186 comprises a first plug port 192, second plug port 194 and third plug port 196, each of which are disposed in a shaped spigot member 198 having a sealing member 200 (such as an o-ring) thereon for being sealably received in their respective port cavities 142 inside or on cartridge receptor 124. As known to those skilled in the art, other configurations of valve cartridge interface 140 will not require use of spigot members 198. When first plug interface 186 is engaged against valve cartridge interface 140, hot inlet port 134 is hydraulically connected to first plug port 192, cold inlet port 136 is hydraulically connected to second plug port 194 and discharge port 138 is hydraulically connected to third plug port 196 to transfer fluid between valve manifold 118 and adapter plug 170. Second plug interface 190 includes fourth plug port 202, fifth plug port 204 and sixth plug port 206, as best shown in FIG. 9, which are adapted to hydraulically connect, directly or indirectly, to retrofit valve 174. Interconnecting the ports on first plug interface 186 to the ports on second plug interface 190 are passageways, shown as first passageway 208, second passageway 210 and third passageway 212 in FIG. 8. First passageway 208 interconnects first plug port 192 with fourth plug port 202 to transfer hot water to retrofit valve 174, second passageway 210 interconnects second plug port 194 with sixth plug port 206 to transfer cold water to retrofit valve 174, and third passageway 212 interconnects third plug port 196 with fifth plug port 204 to transfer fluid from retrofit valve 174 to discharge port 138 on valve manifold 118, where it is transferred to shower line 102 and/or tub line 106 and then to shower head 100 and/or tub spout 104, respectively. As set forth below, some other configurations of adapter plug 170 will not have sufficient space for three round, parallel, straight (molded or drilled) internal passageways of sufficient size to transfer the desired fluids. For these adapter plugs 170, first 208, second 210 and third 212 passageways must be configured differently.

Figure 11:
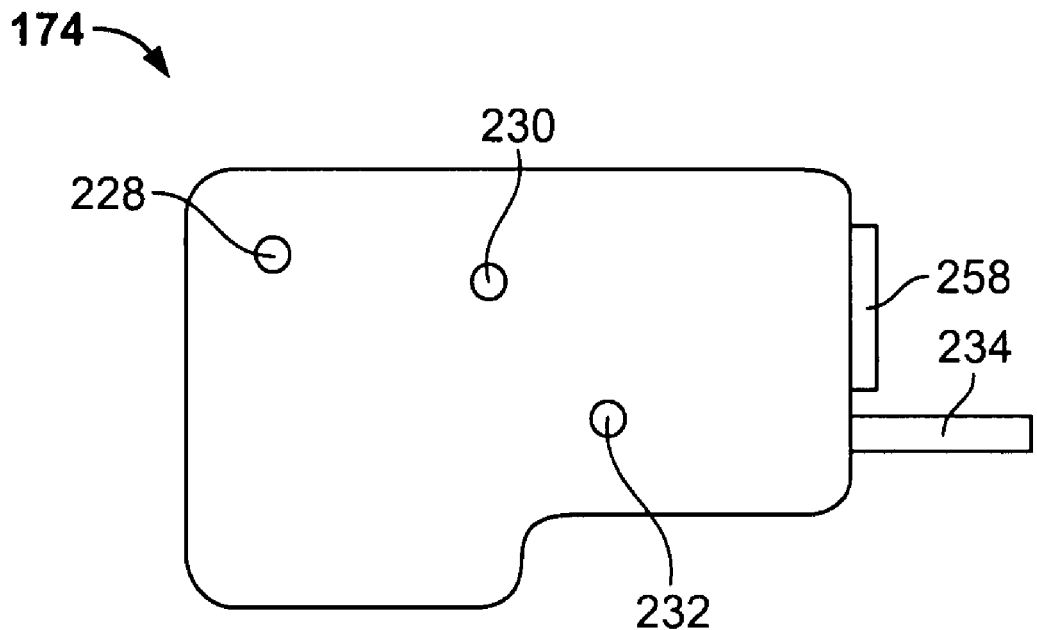
FIG. 11 is a side view of a retrofit valve configured according to one embodiment showing the valve ports and stem of the retrofit valve.
Figure 12:
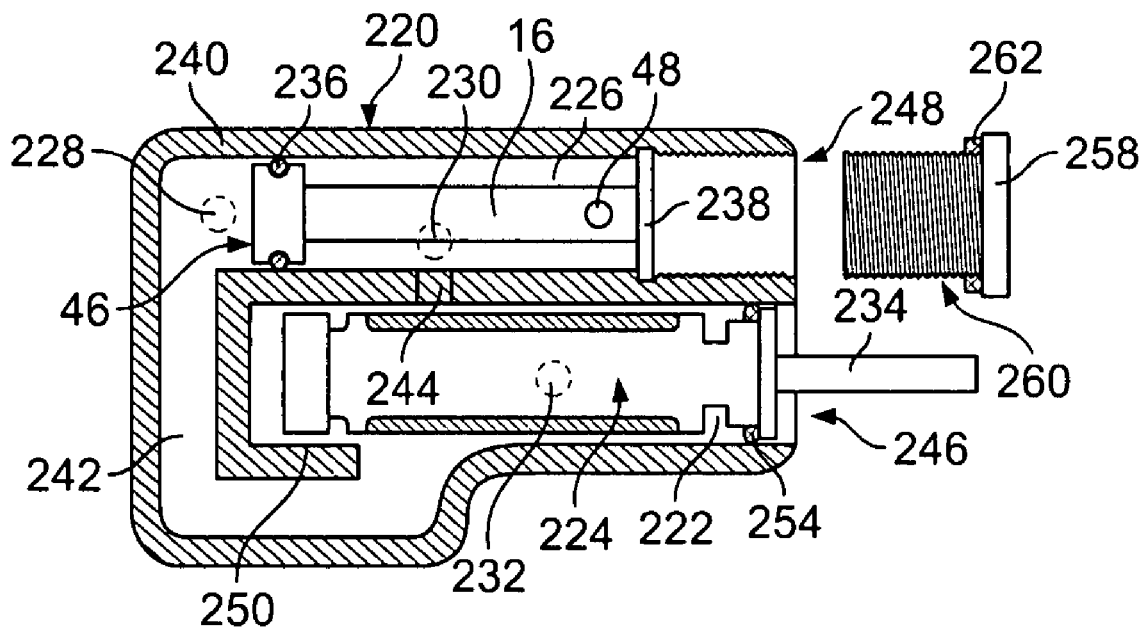
FIG. 12 is a cross-sectional side view of the retrofit valve shown in FIG. 11 showing the use of both a water control cartridge having a pressure balance function and a bypass valve.

Retrofit valve 174, best shown in FIGS. 11 and 12, has a valve body 220 that encloses a first fluid chamber 222, best shown in the cross-sectional view of FIG. 12, for receiving water control cartridge 224, which is configured to be operated by flow control handle 178 to mix hot and cold water for use in retrofit system 172. In a preferred embodiment, valve body 220 also encloses second fluid chamber 226 that is configured to receive bypass valve 16 and be in hydraulic connection with first fluid chamber 222, as explained below. As known to those skilled in the art, water control cartridge 224 can be a specially configured water control device that is configured to provide the desired operational features or water control cartridge 224 can be an "off-the-shelf" water control device that already includes the desired features, such as pressure balancing, anti-scalding and/or temperature sensitive mixing. Various manufacturers provide water control devices, presently in the form of valve cartridges 224, that include the pressure balancing in addition to the standard temperature mixing and on/off/flow control. One such device is Moen's Posi-Temp® cartridge. As known to those skilled in the art, pressure balancing is an important feature that maintains constant temperature even when the hot or cold water pressure varies (i.e., when the toilet is flushed, a sink valve is opened wide or other actions are taken that cause hot/cold water pressure variation), The retrofit system 172 allows the user to select a different manufacturer for the upgrade to a new valving system with the desired features, such as pressure balancing.

As best shown in FIG. 11, retrofit valve 174 has a first valve port 228 that functions as a hot water inlet, a second valve port 230 that functions as a cold water inlet and a third valve port 232 that functions as the discharge port for discharging water to the shower head 100 and/or tub spout 104. Generally, but not necessarily always, first 228, second 230 and third 232 valve ports will be positioned for external access on valve body 220 of retrofit valve 174. Generally, as with current control valves 10, retrofit valve 174 will be sealed with an on/off/flow stem 234 of water control cartridge 224 extending therefrom to be operatively engaged by flow control handle 178. Although retrofit valve 174 having only a first fluid chamber 222 with the new water control cartridge 224 provides advantages for the typical shower/tub system 34, significant additional advantage can be obtained by including second fluid chamber 226 with bypass valve 16 therein for instant hot water availability. As discussed in more detail above, use of second fluid chamber 226 with bypass valve 16 therein, as shown in FIG. 12, provides hot water in the retrofit system 172 as soon as the user desires hot water, as selected by flow control handle 178.

In the embodiment shown in FIG. 12, bypass valve 16 includes sealing member 236 at or near bypass valve inlet 46 and support member 238 at or near bypass valve outlet 48. Sealing member 236 sealably interacts with valve wall 240 to close off flow from bypass channel 242, except through bypass valve 16, that interconnects first valve port 228 through which hot water is received in second fluid chamber 226. Sealing member 236 can be an O-ring mounted externally to bypass valve 16 or other like devices that are sufficient for preventing flow around bypass valve 16. Support member 238 should be sized and configured to support and center bypass valve 16 inside second fluid chamber 226. Second valve port 230, which connects to cold water line 22, can be positioned directly over cold water channel 244 or second fluid chamber 226. Under normal operating conditions (i.e., non-bypassing), hot or cooled off water enters retrofit valve 174 at first valve port 228 and cold water enters retrofit valve 174 at second valve port 230. The hot and cold fluids are mixed by water control cartridge 224, as selected by the user through operation of flow control handle 178, and then directed to third valve port 232 for discharge to, ultimately, shower head 100 and tub spout 104. Under the normal, non-bypassing condition hot water will wash across the face of screen 60 to clean it of any debris that collects thereon during bypass operations, making screen 60 self-cleaning. During bypass conditions, which occurs when the water in hot water line 26 (as determined at bypass valve inlet 46 in bypass channel 242) is cold or tepid, bypass valve 16 allows the cold or tepid water to flow through bypass valve 16, exit bypass valve outlet 48 and flow out retrofit valve 174 at second valve port 230 into, ultimately, cold water line 22. This "reverse" water flow through the cold water line 22 is accomplished by the pressure deferential supplied by pump 32, or other pressurizing means, in water distribution system 18. As soon as the water in bypass channel 242 reaches the desired hot temperature, bypass valve 16 closes, thereby preventing the hot water from flowing through bypass valve 16, returning retrofit system 172 to the normal operating condition (non-bypassing).

Figure 13:
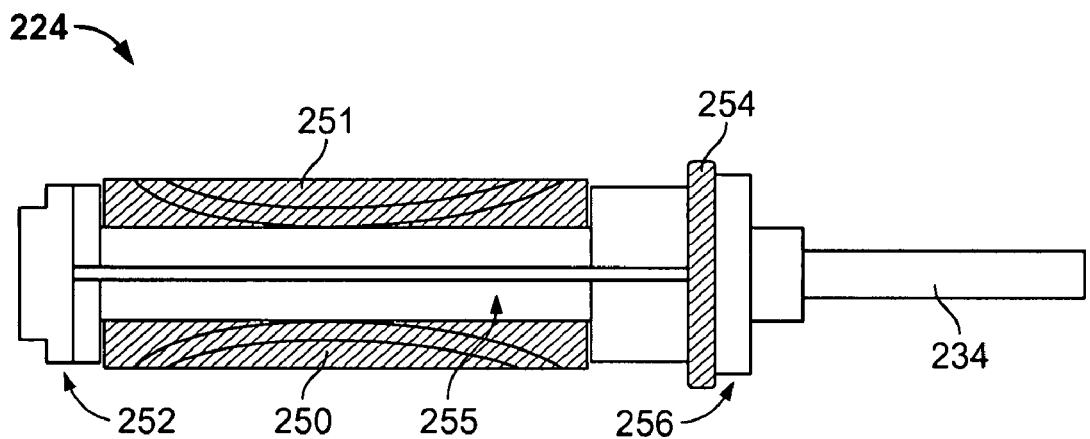
FIG. 13 is a side view of a prior art water control cartridge having a pressure balance function.
Figure 14:
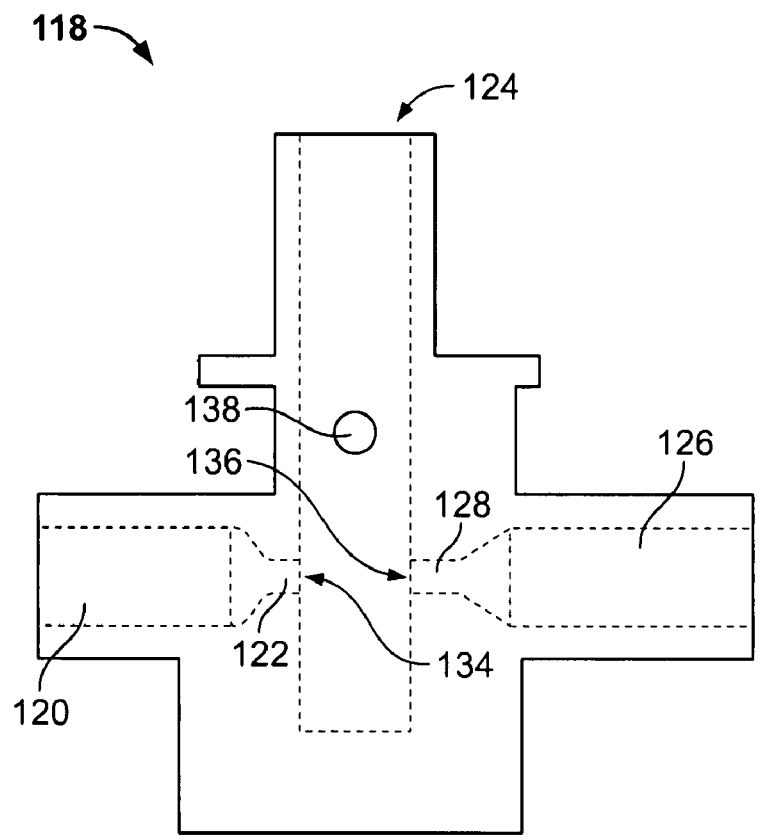
FIG. 14 is a side view of a prior art valve manifold.

In a preferred embodiment, shown in FIG. 12, retrofit valve 174 is configured such that both water control cartridge 224 and bypass valve 16 can be replaced without having to replace or remove retrofit valve 174 from retrofit system 172. As shown, this can be accomplished by providing retrofit valve 174 with a first opening 246 and a second opening 248 that open into first fluid chamber 222 and second fluid chamber 226, respectively. As best shown in FIG. 13 (which is Moen's model 1222 Posi-Temp® cartridge), water control cartridge 224, having a first end 252 and a second end 256, is provided with a first sealing member 254 at second end 256 so that water control cartridge 224 can be sealably placed inside first fluid chamber 222 (with first end 252 inserted first). The hot port on water control cartridge 224 is sealed to bypass channel 242 with cylindrically curved face seal 250. The cold port on water control cartridge 224 is sealed to cold water channel 244 with cylindrically curved face seal 251. This effectively isolates these ports from first fluid chamber 222. The discharge zone 255 between sealing member 254 and the two face seals 250 and 251 is the tub/shower discharge. Sealing member 254 can be an O-ring or other type of sealing mechanisms known to those skilled in the art. As known in the art, such as with many currently available valve cartridges 123 and water control cartridges 224, sealing member 254 should be configured to close off first fluid chamber 222 and prevent the flow of water out first opening 246. In the embodiment shown in FIG. 12, bypass valve 16 is inserted into second fluid chamber 226 through second opening 248 and a cap member 258 is utilized to close off second opening 248 into second fluid chamber 226. In one embodiment, cap member 258 comprises a threaded end 260 that is threadably received in second opening 248 and a cap sealing member 262, such as an O-ring, that provides a static seal to prevent fluid from flowing out retrofit valve 174 through second opening 248. As known to those skilled in the art, various other sealing mechanisms and closure mechanisms can be utilized to close bypass valve 16 and water control cartridge 224 inside retrofit valve 174. Alternatively, once these components are placed inside their respective fluid chambers, first 246 and second 248 openings can be fixedly closed. In another alternative, it may be possible and advantageous to manufacture retrofit valve 174 with all or a majority of the components of bypass valve 16 and/or water control cartridge 224 made integral with valve body 220.

As set forth above, various existing water control cartridges 224 made by various manufacturers could be suitable for use with retrofit valve 174. One such water control cartridge is shown in retrofit valve 174 in FIG. 12 and alone in FIG. 13. As known to those skilled in the art, this water control cartridge 224 includes a pressure balance feature that maintains the relative pressure between the hot and cold water flow when a the water distribution system 18 is subject to a sudden change in water pressure in the hot or cold water lines (i.e., as when a toilet is flushed or a water faucet is open wide). Water control cartridges having pressure balancing features have been known for many years. For instance, U.S. Pat. No. 2,308,127 to Symmons, U.S. Pat. No. 4,033,370 to Egli, U.S. Pat. No. 4,469,121 to Moen and U.S. Pat. No. 6,361,051 to Babin show various pressure balance configurations.

As also know to those skilled in the art, an anti-scalding device can be incorporated to provide instant water shut-off if the temperature of the water exceeds a pre-set level. Although various manufacturers make such devices (typically they are utilized in shower head 100), they generally include a reset button to allow the user to manually resume water flow after the device is automatically activated. Such a device can be included in retrofit valve 174, in addition to or instead of the pressure balancing feature discussed above, to block the flow of mixed water from retrofit valve 174 if the water temperature is too high (above the preset level). The reset button can be configured to protrude through retrofit valve 174 to be accessible to the user to resume fluid flow. Another possible improvement, which can be utilized in addition to or instead of water control cartridge 224 with the pressure balancing feature, is an anti-scalding, proportional thermostatic water mixing and diverting valve (such as the Aquamix® available from Sparco, Inc. of Warwick, R.I.) that is a temperature sensitive mixing valve, as opposed to pressure sensitive, to maintain the water at or near a desired temperature under varied operating conditions (i.e., toilet flushing, sink valve opened, etc.). As such, the device provides both anti-scalding and anti-chilling through simultaneous control of the hot and cold water. The components of such a valve can be configured to fit inside of retrofit valve 174 to provide this feature to an existing water control valve 10 having valve manifold 118.

Figure 15:
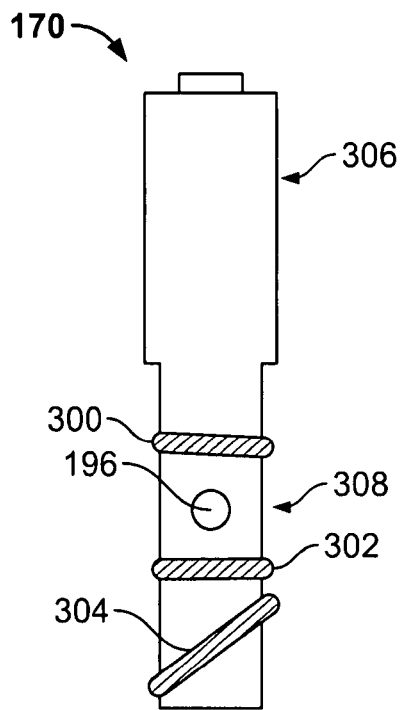
FIG. 15 is a side view of an adapter plug configured according to one embodiment for the prior art valve manifold shown in FIG. 14.
Figure 16:
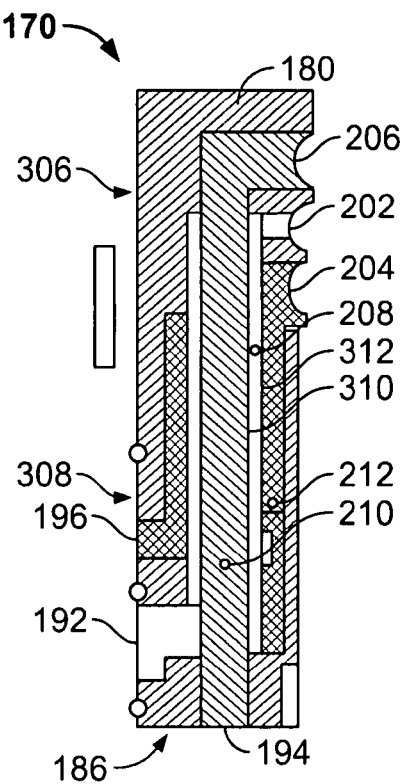
FIG. 16 is a cross-sectional side view of the adapter plug of FIG. 15.
Figure 17:
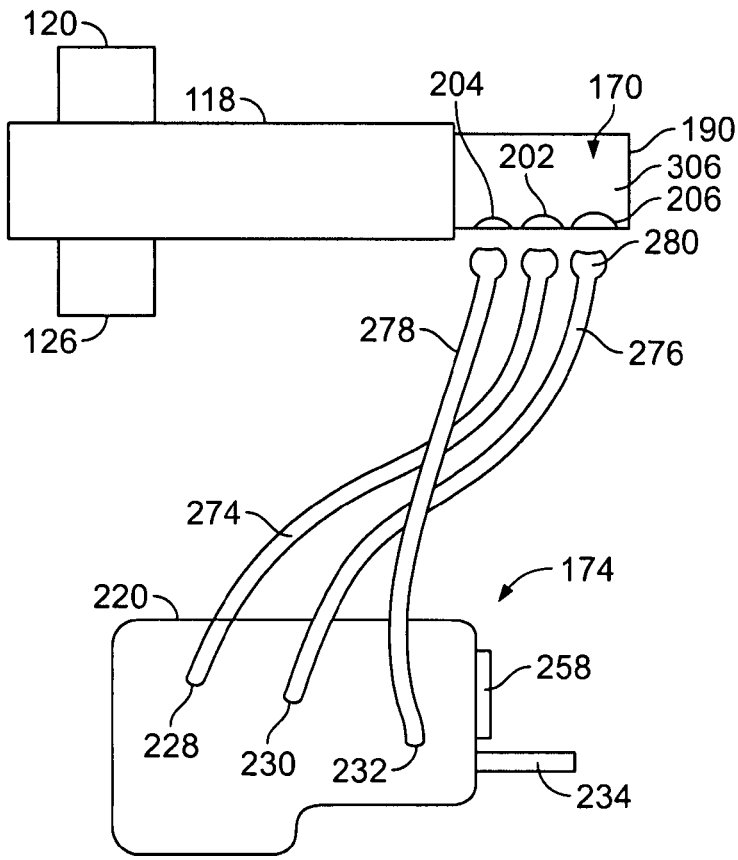
FIG. 17 is a side view one embodiment of a retrofit valve and fluid connectors shown with the adapter plug of FIG. 15 installed in the prior art manifold of FIG. 14.

Use of the valve with a different model of control valve 10 is illustrated in FIGS. 14 through 17. One type of older design for valve manifold 118, shown in FIG. 14, has a longer, narrower cartridge receptor 124 than that illustrated in FIGS. 5 and 6, that is configured to cooperatively receive a longer, narrower valve cartridge 123. FIGS. 15 and 16 show an adapter plug 170 suitable for use with the valve manifold 118 shown in FIG. 14. As with current valve cartridges 123, adapter plug 170 includes one or more static seals, such as first static seal 300, second static seal 302 and third static seal 304 to isolate portions of adapter plug 170 to facilitate flow from/to hot inlet port 134, cold inlet port 136 and discharge port 138. As shown in FIGS. 16 and 17, an upper section 306 generally towards second end 188 of adapter plug 170 includes fourth plug port 202, fifth plug port 204 and sixth plug port 206 and is configured to generally extend outwardly from cartridge receptor 124, Lower section 308, generally towards first end 186 of adapter plug 170, is configured to be inserted into cartridge receptor 124 with first static seal 300 preventing fluid from flowing out cartridge receptor 124. Second static seal 302 isolates third plug port 196, which is in hydraulic communication with discharge port 138. Third static seal 304 separates first plug port 192 and second plug port 194, which are in hydraulic communication with hot inlet port 134 and cold inlet port 136, respectively. As shown in FIG. 16, internally adapter plug 170 comprises an inner, first tube 310 and a second tube 312 around first tube 310 to form first passageway 208 for the flow of hot water (or cooled/tepid water as the case may be), second passageway 210 for the flow of cold water and third passageway 212 for the flow of discharge water to, ultimately, shower head 100 and tub spout 104. In one embodiment plug body 180 comprises a two-piece stationary cylindrical sleeve.

Connecting adapter plug 170 inside valve manifold 118 with retrofit valve 174 are one or more fluid connectors 272 comprising a first conduit 274, second conduit 276 and third conduit 278, as shown in FIGS. 10 and 17. FIG. 17 shows adapter plug 170 as configured for an alternative design of tub/shower valve 10, shown in FIGS. 14, 15 and 16 and discussed above. First conduit 274 interconnects fourth plug port 202 to first valve port 228 to deliver the hot water (which may be cold or tepid) to retrofit valve 174. Second conduit 276 interconnects sixth plug port 206 to second valve port 230 to deliver cold water to retrofit valve 174 and to transfer the bypassed cold or tepid water away from retrofit valve. Third conduit 278 interconnects fifth plug port 204 to third valve port 232 to transfer water from retrofit valve 174 to, ultimately, shower head 100 and/or tub spout 104. In a preferred embodiment, three separate fluid connectors 272 are utilized, each one a rigid or conformable (i.e., flexible) tubular member. Alternatively, the valve can utilize a single fluid connector 272 that has first 274, second 276 and third 278 conduits incorporated therein. As discussed in more detail below, fluid connectors 272 facilitate the placement of retrofit valve 174 behind escutcheon plate 176 by allowing for axial variation of its positioning, which may often be controlled by the other shower/tub components. Whether rigid or conformable, fluid connectors 272 can be made out of plastic, copper or various other metallic or non-metallic materials. For rigid fluid connectors 272, the ends thereof, which connect to second plug interface 190 of adapter plug 170 and to first 228, second 230 and third 232 valve ports on retrofit valve 174, can be configured to be removably attached to their respective ports. As an example, both ends of fluid connectors 272 can be configured to have an angularly adjustable, sealable end, such as can be achieved by utilizing spherical ends (shown as 280 for one end only in FIG. 17) fitted into hemispherical sockets, which are shown as 282 on FIGS. 8 and 9 for second plug interface, that are clamped and sealed with gland plates (not shown). This type of arrangement would allow the positioning of retrofit valve 174 to "float" with respect to accessible second plug interface 190 of adapter plug 170 during installation until the fasteners holding the gland plates are tightened, thereby clamping and sealing the adjustable joints at both ends of fluid connectors 272. Alternatively, one end of fluid connectors 272 can be fixedly attached to either adapter plug 170 or retrofit valve 174, as shown in FIG. 17 for the end attached to retrofit valve 174.

Although it is possible to configure the retrofit system 172 such that both ends of fluid connectors 272 are fixedly attached to adapter plug 170 and retrofit valve 174, particularly with the use of flexible fluid connectors 272 to allow positioning of retrofit valve 174 during installation, this will generally not be the preferred configuration due to the loss of interchangeability with regard to different makes and models of water control valves 10. If it is desired to provide a retrofit system 172 that is configured for only a particular make/model of water control valve 10, then the system could be provided with a single adapter plug 170 and retrofit valve 174 for that make/model of control valve 10. In fact, if system flexibility is not necessary or desired, retrofit valve 174 can be configured to abut or otherwise directly connect first 228, second 230 and third 232 valve ports to fourth 202, sixth 206 and fifth 204 plug ports, respectively, with very short fluid connectors 272. In such cases, adapter plug 170 and retrofit valve 174 may be made as one integral component. Otherwise, it will generally be preferred to maintain interchangeability of retrofit system 272 by allowing use of a variety of differently configured adapter plugs 170 for differently configured water control valves' 10, which can best be achieved by having at least one end of fluid connectors 272, preferably the end that attaches to adapter plug 170, releasably connect to the other component (i.e., as shown in FIG. 17). As known to those skilled in the art, the releasable connection can be achieved by various mechanisms, including threaded ends and the like.

As shown in FIG. 10 and discussed above, adapter plug 170 is configured to be received inside or on valve manifold 118 and retrofit valve 174 is positioned relatively near adapter plug 170, both of which are located behind escutcheon plate 176. To accommodate the increased axial displacement, relative to cartridge receptor 124, escutcheon plate 176 has an outwardly extending blister portion 284, as shown in FIG. 10. As known in the art, the axial placement of the existing installed shower valve manifold 118 with respect to the plane of the shower/support wall 110 varies from one old installation to another, generally depending on plumbing tolerances and the whim of the installing plumber. Later renovations, such as the addition of tile or shower stall panels, will also cause major variation with regard to the axial location of cartridge receptor 124 relative to support wall 110. These variations will cause the axial location, from the plane of support wall 110, of the accessible end of adapter plug 170 (i.e., second plug interface 190), to likewise vary. Preferably, retrofit valve 174 should be at some fixed location with respect to the plane of support wall, which would preferably be against or very near support wall 110 to allow the use of escutcheon plate 176 having the shallowest possible depth for blister 284 so that it will not intrude as far into the shower/tub space. Because most modern water control cartridges 224 are longer than wide, it is likely to be preferred that retrofit valve 174 be positioned such that the axial direction of water control cartridge 224 is generally parallel to the plane of surface wall 110 and thus perpendicular to adapter plug 170. In this configuration, retrofit valve 170, as well as escutcheon plate 176, can be attached to and physically supported by support wall 110. This will provide a rigid and sturdy support for flow control handle 178, which is attached to stem 234, which the user will actuate to control the temperature and flow of water from shower head 100 and tub spout 104. Connecting retrofit valve 174 and/or escutcheon plate 176 directly to valve manifold 118 and/or adapter plug 170 (with their varying axial protrusions) presents many difficulties, particularly with regard to the need to install escutcheon plate 176 substantially flush against support wall 110.

Figure 18:
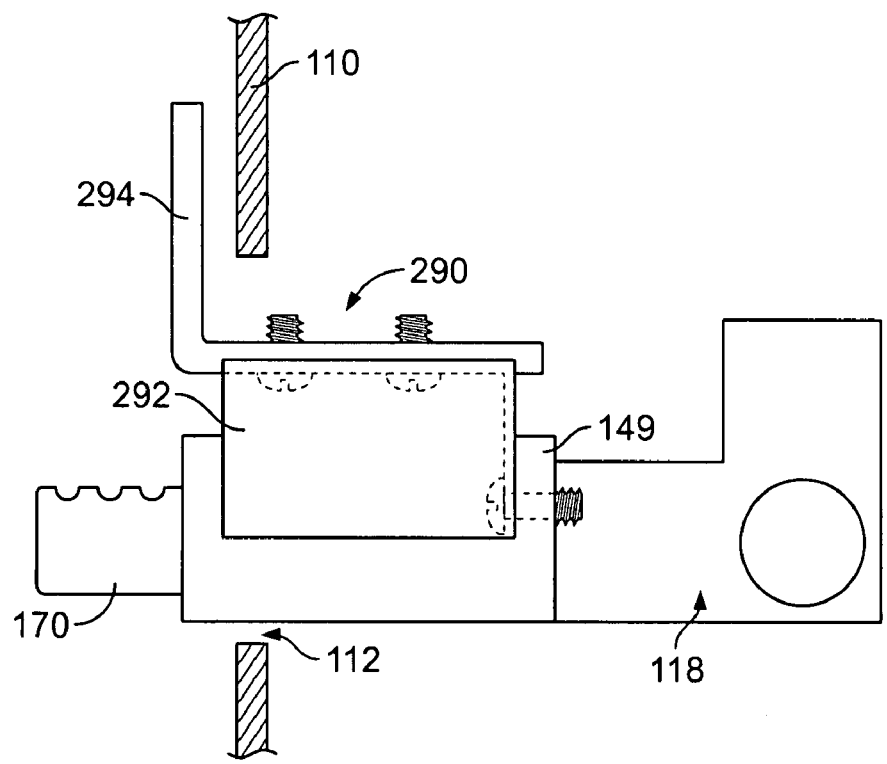
FIG. 18 is a side view of one configuration of a bracket shown attached to the valve manifold of a water control valve.
Figure 20:
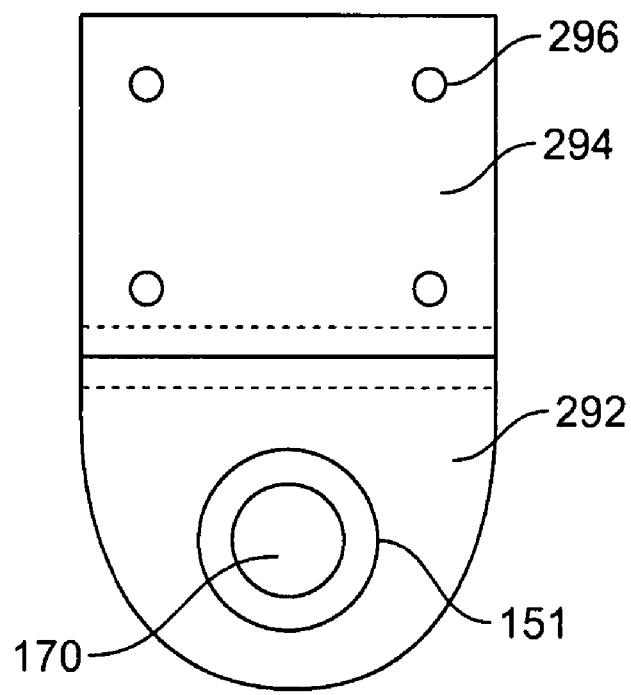
FIG. 20 is a front view of the bracket shown in FIG. 19.
Figure 21:
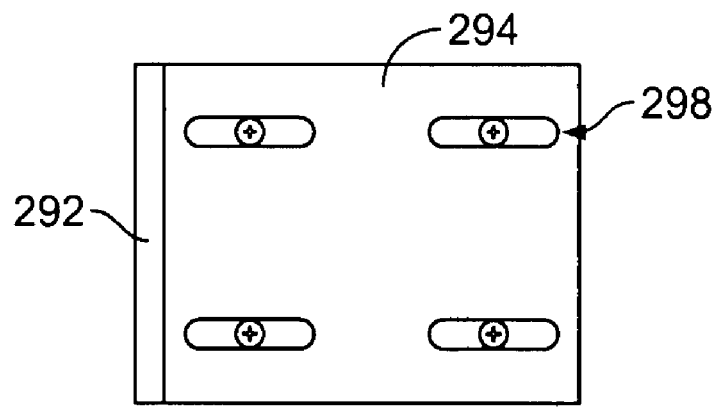
FIG. 21 is a top view of the second bracket member of the bracket shown in FIG. 20.

In a preferred embodiment, retrofit system 172 will utilize bracket 290 for securely mounting and positioning retrofit valve 174 and escutcheon plate 176 relative to adapter plug 170, as shown in FIGS. 18 through 21. Additional physical support may be gained by utilizing an adhesive or other attachment mechanism to attach to wall 110. In one configuration, best shown in FIGS. 18 and 19, bracket 290 is configured with one or more first bracket members 292 that attach to escutcheon mounting mechanisms 148 associated with valve manifold 118 of the existing water control valve 10. As stated above, mounting mechanisms 148 are generally attached to, part of, connected to or cooperating with valve manifold 118, as shown in FIGS. 18 and 19. Bracket 290 can also be configured with one or more second bracket members 294 that are configured to provide a support for securely attaching retrofit valve 174 and/or escutcheon plate 176. As shown in FIG. 20, second bracket member 294 can be configured with one or more mounting holes 296 to receive an attachment mechanism, such as a screw or bolt, to hold retrofit valve 174 and escutcheon plate 176 in place. In one configuration, retrofit valve 174 attaches to second bracket member 294 and escutcheon plate 176 attaches to one or more lugs (not shown) on retrofit valve 174. The preferred embodiment of bracket 290 also includes an adjustment mechanism 298 that is configured to allow the user to adjust the axial displacement (i.e., distance from wall) for retrofit valve 174 and escutcheon plate 176. In one well known configuration, adjustment mechanism can comprise a plurality of elongated holes and screws in second bracket member 294 that cooperate with a like number of holes, not elongated, in first bracket member 292 to allow the installer to slide second bracket member 294 forwards and backwards to obtain the position he or she desires. Although bracket 290 can be manufactured out of a variety of different materials, including metals, plastic, composites and the like, a sturdy metal bracket 290 is likely preferred to provide the support necessary for the user to utilize flow control handle 178 without flexing or breaking bracket 290.

Escutcheon plate 176, like the existing escutcheon plate 114, is configured to cover the opening 112 in support wall. In addition, as stated above, escutcheon plate 176 includes blister 284 to provide an enclosure for the accessible portion of adapter plug 170 (i.e., the second plug interface 190), retrofit valve 174, fluid connectors 272 and bracket 290. Retrofit system 172 can include a single, uniform escutcheon plate 176 that is suitable for most, if not all, retrofit systems 172, thereby adding to the uniformity of retrofit system 172. A hole (not shown) should be provided in escutcheon plate 176, for instance in the blister 284, for on/off/flow stem 234 to extend through so that it may connect to flow control handle 178. Shower systems 34 having two handle valves will require a different configuration for escutcheon plate 176. Escutcheon plate 176 can be made out of a variety of materials, such as brass, plated steel, stainless steel and/or zinc, as desired for the consumer's shower system 34.

Flow control handle 178 is configured to actuate retrofit valve 174 so as to allow the user to control the temperature) volume and on/off of water through shower head 100 and/or tub spout 104. As stated above, stem 234 will protrude through escutcheon plate 176 (i.e., blister 284). A short lever-like flow control handle 178, as shown in FIG. 10, attached to stem 234 will allow approximately 180 degrees of rotation to accomplish the on/off and temperature adjustment of retrofit valve 174. In one embodiment, the plane of motion for the flow control handle 178 will be perpendicular to support wall 110 and in either a vertical or horizontal plane, depending on whether a vertical or horizontal orientation of retrofit valve 174 is deemed to provide the most aesthetically pleasing appearance for blister 284 and the most natural manual motion to actuate retrofit valve 174. Preferably, the length of flow control handle 178 is kept relatively short to limit encroachment in the shower/tub space, such as that common with existing shower control valves 10.

To retrofit an existing shower/tub fixture 34 to obtain the features of the retrofit system 172, the person installing the system 172 turns off the water supply to the house or other facility and removes the existing flow control handle 108 and escutcheon plate 114 to expose valve manifold 118 mounted in the water distribution system 18. Unlike prior art replacement of water control valve 10, there is no need for the user to remove or replace the existing valve manifold 118. The user removes valve cartridge 123 from valve receptor 124, which is typically a cavity as shown, of valve manifold 118 to expose valve cartridge interface 140. Flow control handle 108, escutcheon plate 114 and valve cartridge 123 can be discarded. Adapter plug 170, configured for the particular type of valve manifold 118 and valve cartridge interface 140 installed in water distribution system 18, is inserted into or against cartridge receptor 124 such that first plug interface 186 hydraulically connects to valve cartridge interface 140. If necessary, adapter plug 170 is secured in place with a screw, I bonnet ring or other fasteners. The user then mounts bracket 290 to at least one of the one or more mounting mechanisms 148 associated with valve manifold 118. In some configurations, bracket 290 may be installed with adapter plug 170 or it may have its own fastening method and hardware. In other configurations, adhesives or other attachment mechanisms may be utilized, The user then connects the one or more fluid connectors 272, which has a first conduit 274, second conduit 276 and third conduit 278 and may be compliant or rigid, between second plug interface on adapter plug 170 and first, 228, second 230 and third 232 valve ports on retrofit valve 174 to hydraulically interconnect adapter plug 170 and retrofit valve 174. In some configurations, one or both ends of the elongated fluid connectors 272 may be fixedly attached to either or both of adapter plug 170 and/or retrofit valve 174. If universality is not desired, such that it is configured to replace a particular make and model of water control valve 10, then both ends of fluid connectors 272 can be fixed (i.e., one end to adapter plug 170 and the other end to retrofit valve 174). If retrofit valve 174 is provided separate from bracket 290, then the user secures retrofit valve 174 to bracket 290, preferably adjusting the installation so the axial centerline of retrofit valve 174 is substantially parallel to support wall 110 and placed against or spaced apart from support wall 110 per instructions for the particular configuration. Bracket 290 or retrofit valve 174 may be adhesively or otherwise attached to wall 110. If necessary, the installer then secures all compliant or adjustable ends of fluid connectors 272 (i.e., those having gland devices or other fasteners) to seal the ends of fluid connectors to the respective adapter plug 170 and/or retrofit valve 174. The new escutcheon plate 176 is then mounted to bracket 290 such that the blister portion 284, if any, covers the exposed end of adapter plug 170 and retrofit valve 174 and stem 234 of water control cartridge 224 in retrofit valve 174 extends generally outwardly through escutcheon plate 176. The user then attaches, typically using a setscrew or other type of fastener, the new flow control handle 178 to stem 234 to provide operational control to retrofit valve 174. The user then should be able to operate his or her retrofit system 172 with the enhanced features of the new retrofit valve, such as instant hot water provided by bypass valve 16 and/or pressure balancing. All of which is accomplished without removing or replacing the existing valve manifold that is fixedly mounted in the water distribution system.

Figure 22:
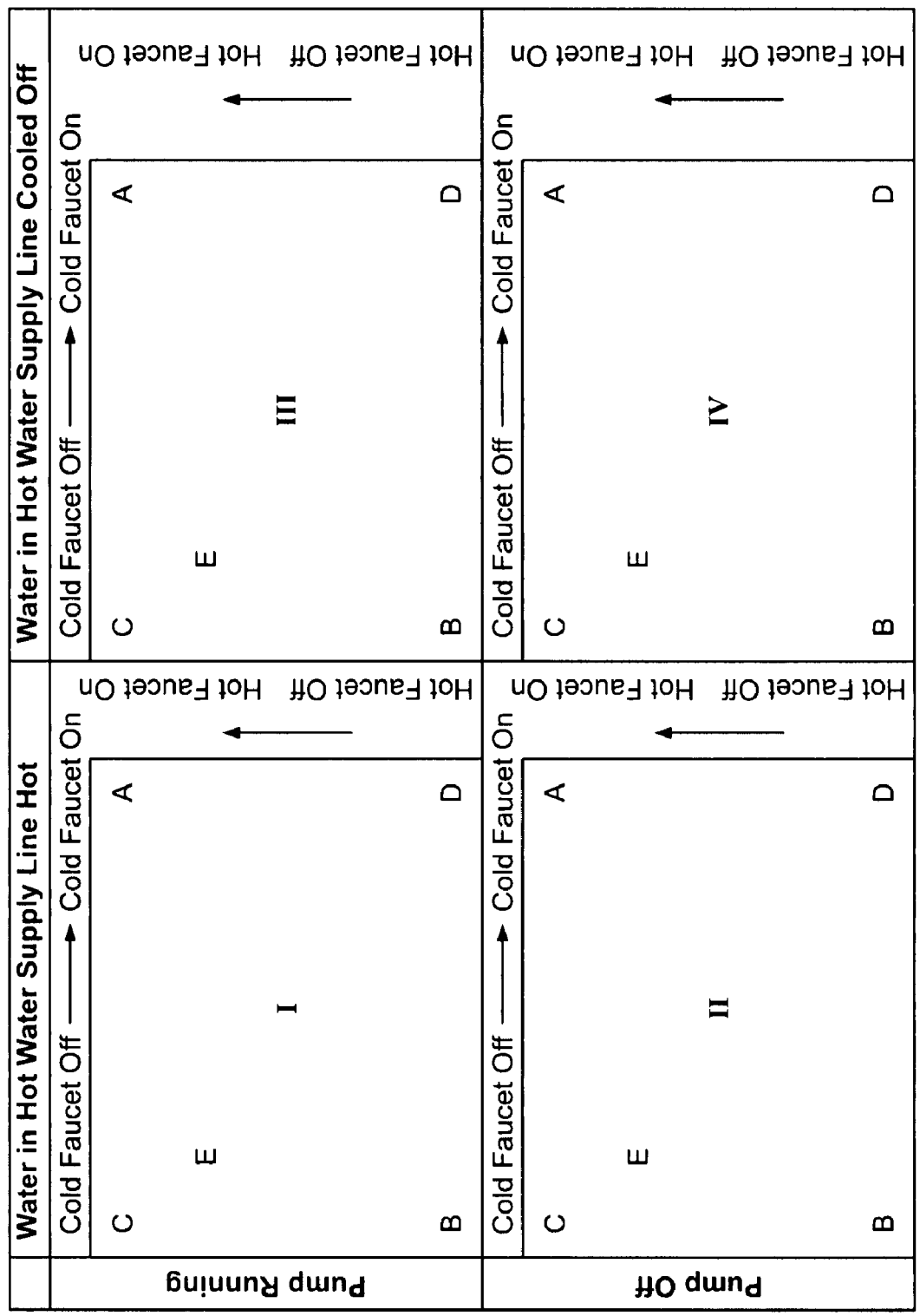
FIG. 22 is a chart showing the operational characteristics of the thermostatically controlled bypass valve when in use with a water distribution system.

With regard to the use of a thermostatically controlled bypass valve 16 having the components shown in FIGS. 2 through 4 and described in the accompanying text, the operation of the bypass valve 16 is summarized on the chart shown as FIG. 22. The chart of FIG. 22 summarizes the results of the twenty combinations of conditions (pump on/pump off; hot water line hot/hot water line cooled off; hot water valve fully open, closed or between; cold water valve fully open, closed or between) that are applicable to the operation of bypass valve 16. The operating modes IVB, IVC, IVD, IIIB, & IIID are summarized detailed in the immediately following text. The operation of the remaining fifteen modes are relatively more obvious, and may be understood from the abbreviated indications in the outline summarizing FIG. 22.

Starting with the set "off hours (normal sleeping time, and daytime when no one is usually at home) pump 32 will not be powered. Everything will be just as if there were no pump 32 and no bypass valve 16 in use with retrofit valve 174 (i.e., both the cold and hot water lines will be at the same city water pressure). The water in hot water line 26 and at bypass valve 16 will have cooled off during the long interim since the last use of hot water. The reduced water temperature at bypass valve 16 results in "retraction" of rod member 76 of the thermally sensitive actuating element 54. The force of bias spring 56 pushing against flange 82 on rod member 76 will push it back away from valve seat 68, opening bypass valve 16 for recirculation. Although the thermal actuating element 54 is open, with pump 32 not running, no circulation flow results, as the hot 26 and cold 22 water lines are at the same pressure. This is the mode indicated as IVB in the outline on FIG. 22. If the cold water valve at retrofit valve 174 is opened, with thermal actuating element 54 open as in mode IVB above, pressure in cold water line 22 to the cold water side of retrofit valve 174 will drop below the pressure in hot water line 26. This differential pressure will siphon tepid water away from the hot side to the cold side, which is the mode indicated as IVD in the outline on FIG. 22. The recirculation of the "hot" water will end when the tepid water is exhausted from the hot water line 26 and the rising temperature of the incoming "hot" water causes actuating element 54 to close.

If the hot water side of retrofit valve 174 is turned on with actuating element 54 open as in mode IVB above, pressure in hot water line 26 will drop below the pressure in cold water line 22. This differential pressure, higher on the cold side, will load check valve 64 in the "closed" direction allowing no cross flow. This is mode IVC in the outline on FIG. 22. In this mode, with hot water line 26 cooled and pump 32 off, a good deal of cooled-off water will have to be run Gust as if bypass valve 16 were not installed), to get hot water, at which time actuating element 54 will close without effect, and without notice by the user. With actuating element 54 open and hot water line 26 cooled-off as in mode IVB above, at the preset time of day (or when the cyclic timer trips the next "on" cycle) pump 32 turns on, pressurizing the water in hot water line 26. Pump pressure on the hot side of retrofit valve 174 results in flow through the open actuating element 54, thereby pressurizing and deflecting check valve 64 poppet away from its seat to an open position. Cooled-off water at the boosted pressure will thus circulate from the hot line 26 through actuating element 54 and check valve 64 to the lower pressure cold water line 22 and back to water heater 24. This is the primary "working mode" of the bypass valve 16 and is the mode indicated as IIIB in the outline on FIG. 22. If the cold water valve is turned on during the conditions indicated in mode IIIB above (i.e., pump 32 operating, hot water line 26 cooled off, and the hot water valve at retrofit valve 174 turned off) and while the desired recirculation is occurring, mode IIID will occur. A pressure drop in the cold water line 22 due to cold water flow creates a pressure differential across valve 16 in addition to the differential created by pump 32. This allows tepid water to more rapidly bypass to cold water line 22. When the tepid water is exhausted from hot water line 26, actuating element 54 will close, ending recirculation.

Explanation of FIG. 22 Table

Mode I: Water In Hot Water Supply Line Hot, Pump On.

A. Hot and cold water valves fully open. Pressure drops from hot and cold flow about equal. Actuating element 54 stays closed. No leak or recirculation in either direction.

B. Hot and cold water valves fully closed. Actuating element 54 keeps bypass valve 16 closed. No recirculation.

C. Hot water valve fully open, cold water valve closed. Actuating element 54 closed. Check valve 64 closed. No recirculation. No leak.

D. Hot water valve closed, cold water valve fully open Actuating element 54 closed. No recirculation. No leak.

E. Hot and cold water valves both partially open in any combination Actuating element 54 closed. No recirculation. No leak.

Mode II: Water in Hot Water Supply Line Hot, Pump Off.

A. Hot and cold water valves full on. Pressure drops from hot and cold flow about equal. Actuating element 54 stays closed.

B. Hot and cold water valves fully closed. Actuating element 54 keeps bypass valve 16 closed. No recirculation.

C. Hot water valve fully open, cold water valve closed. Actuating element 54 closed. Check valve 64 closed. No recirculation. No leak.

D. Hot water valve closed, cold water valve fully open Actuating element 54 closed. No recirculation. No leak.

E. Hot and cold water valves both partially open in any combination. Actuating element 54 closed. No recirculation. No leak.

Mode III: Water in Hot Water Line Cooled Off, Pump On.

A. Hot and cold water valves full open. Flow-induced pressure drops about equal, bypass valve 16 stays open and allows recirculation hot to cold until tepid water is exhausted and hotter water closes actuating element 54. If both sides of water control valve are discharging to the same outlet they are mixing hot and cold anyway. If the valves being manipulated are at remote fixture on the same plumbing branch, this short time tepid-to-cold leak will probably not be noticeable. If valves being manipulated are on remote branches of plumbing, the mixing would have no effect.

B. Hot and cold water valves fully closed. Actuating element 54 open, get desired tepid-to-cold recirculation until hot water line 26 heats up.

C. Hot water valve fully open, cold water valve closed. Actuating element 54 open but pressure drop in hot water line 26–negate pump pressure, stopping recirculation. Check valve 64 stops cold to hot leak.

D. Hot water valve closed, cold water valve fully open. Actuating element 54 open, get tepid to cold recirculation until hot line heats up.

E. Hot and cold water control valves both partially open in any combination. Could get tepid to cold leak. If valves are at same fixture don't care as mixing hot and cold anyway. If at remote fixture probably not noticeable. Tepid to cold leak would be short term.

Mode IV: Water In Hot Water Supply Line Cooled Off, Pump Off.

A. Hot and cold water valves full open. Flow-induced pressure drops about equal, bypass valve 16 stays open and may allow recirculation (leak) hot to cold until tepid water is exhausted and hotter water closes actuating element 54. Don't care, if both valves are at same fixture as are mixing hot and cold anyway. If water control valves being manipulated are at remote fixtures on the same plumbing branch, this short time tepid-to-cold leak would probably not be noticeable. If water control valves being manipulated are on remote branches of plumbing, mixing would not be noticeable.

B. Hot and cold water valves fully closed. Actuating element 54 open, no recirculation.

C. Hot water valve fully open, cold water valve fully closed Actuating element 54 open. Check valve 64 closed. No leak D. Hot water valve closed. Cold water valve fully open. Bypass valve 16 open, tepid to cold recirculation until actuating element 54 heats up and closes.

E. Hot and cold water valves both partially open, in any combination.

Could get tepid to cold leak. If water control valves at same fixture, don't care as mixing hot and cold anyway. If at remote fixture probably not noticeable. Tepid to cold leak would be short term.

Figure 23:
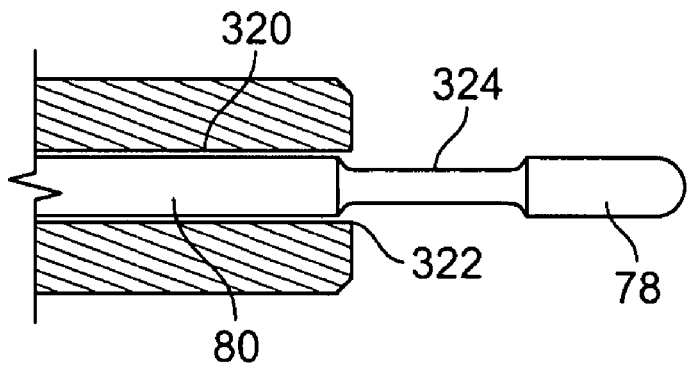
FIG. 23 is a side cross-sectional view of a modified thermal actuator showing modifications to reduce potential problems with lime buildup.

Several further enhancements have been developed for the thermal valve actuating element 54, which are applicable to the above-described bypass valve 16 are shown in FIG. 23. It has been noted that "lime" or "calcium" buildups on piston 80 can cause sticking of piston 80 in actuating element 54. Manufacturers of these actuating elements 54 recommend use of an elastomer boot or a nickle-teflon coating on piston 80, or use of a plastic piston 80. A preferred material may be use of a plastic piston 80, to which the buildup could not get a tenacious hold, and the removal of the internal chamfer at the open end of guide bore 320 and replacement with a sharp corner 322, as shown in FIG. 23. Removal of the chamfer and replacement with corner 322 would provide a sharper scraping edge to clean piston 80, and would eliminate a place where the detritus could become wedged. In addition to the chamfer removal, another simple geometry change to' piston 80 might be very effective. As shown in FIG. 23, a long shallow groove 324 in or a reduced diameter of piston 80 that would extend from just inside guide bore 320 (at full extension) to just outside guide bore 320 at full retraction would provide a recess to contain buildup for a long period. Once this recessed area filled up with lime, edge 322 of guide bore 320 could scrape off the incrementally radially extending soft build up relatively easily, as compared to scraping off the surface layer that bonds more tenaciously to the metal.

The most direct method to overcome sticking due to mineral buildup is to optimize actuator force in both directions. Buildup of precipitated minerals on the exposed outside diameter of the extended piston 80 tends to prevent retraction, requiring a strong bias spring 56. This high bias spring force subtracts from the available extending force however, thereby limiting the force available to both extend piston 80 against the mineral sticking resistance and to effect an axial seal between poppet 78 and seat 70. When water temperature is high, piston 80 is extended so that its surface is exposed. Deposition also occurs primarily at high temperatures, so that buildup occurs on piston 80 outside diameter, resulting in sticking in the extended position when the growth on the piston outside diameter exceeds guide 320 interior diameter. Significantly more than half of the available actuator force thus can most effectively be used to compress bias spring 56, resulting in a maximum return force.

Figure 24:
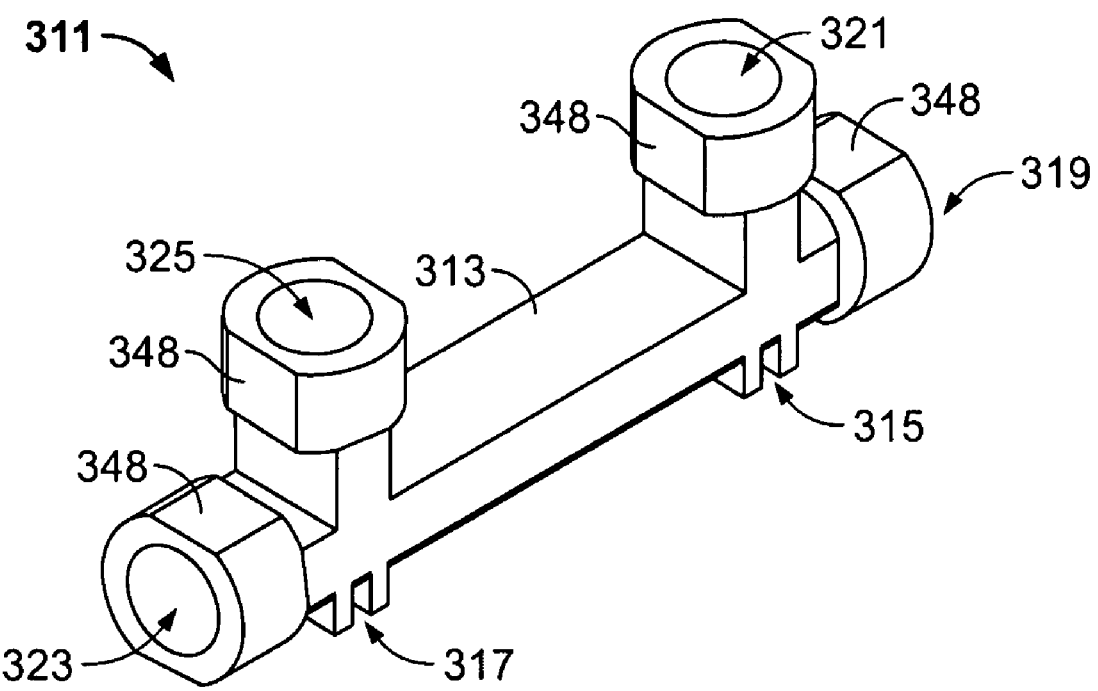
FIG. 24 is a perspective view of an assembled thermostatically controlled bypass valve formed in accordance with an embodiment.
Figure 25:
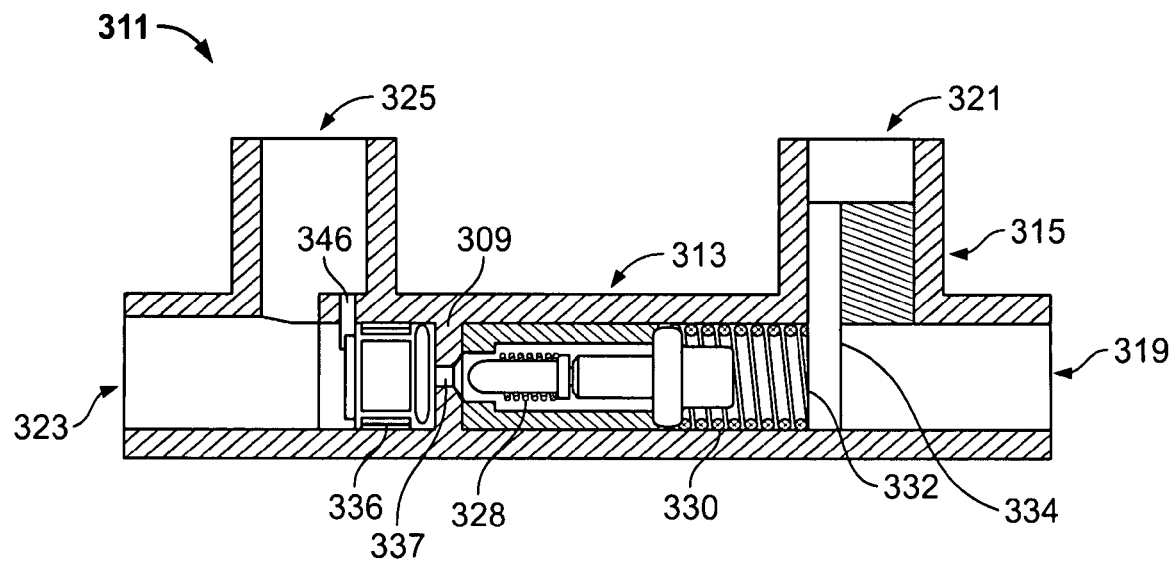
FIG. 25 is a cross-sectional side view of the bypass valve in FIG. 24.
Figure 26:
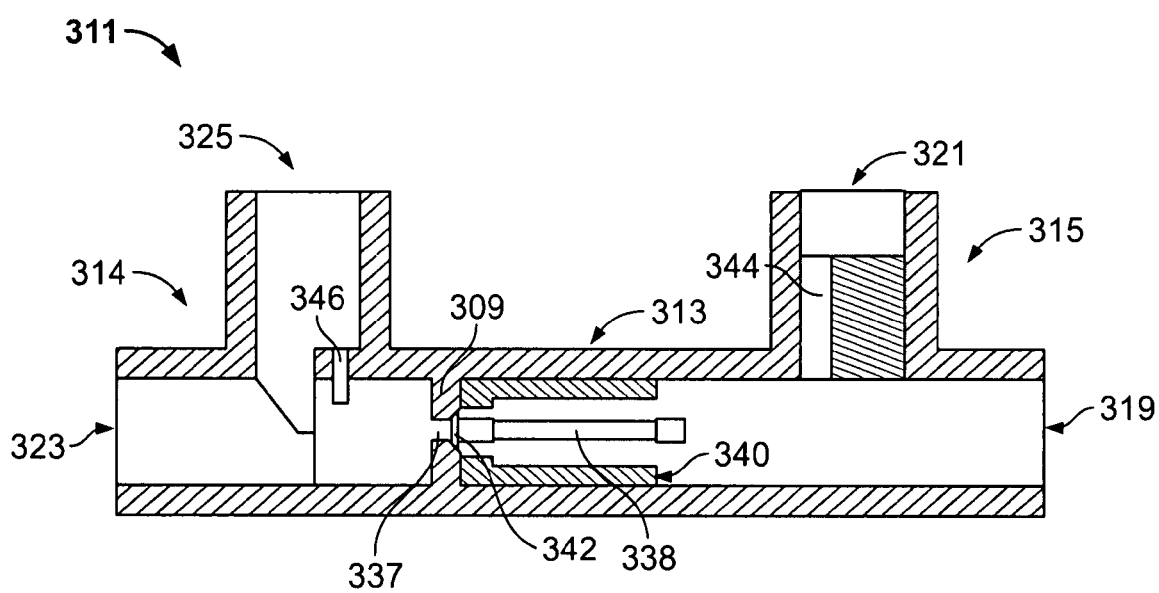
FIG. 26 is a cross-sectional side view of the valve body of the bypass valve of FIG. 24.

FIGS. 24 through 30 illustrate an alternative embodiment of a bypass valve that is designated generally as 311. As best shown in FIGS. 24 through 26, bypass valve 311 comprises a valve body 313 having a first end 315, a second end 309 and a separating wall 309 disposed between first end 315 and second end 309. First end 315 is designated to receive and discharge hot water and second end 309 is designated to receive and discharge cold water from a source of cold water, such as a city water supply system or a local water well. Valve body 313 has four threaded ports, an axial and radial port at the first end 315 and an axial and radial port at the second end 309. For purposes of discussion herein, the axial ports are designated as inlet ports and the radial ports are designated as discharge ports, however, it will be understood from the discussion set forth below that the valve is not so limited.

At the first end 315 (the hot water side) is first inlet port 319 and first discharge port 321 and at the second end 309 (the cold water side) is second inlet port 323 and second discharge port 325. Conversely, the radial ports can be the inlet ports and the axial ports can be the discharge ports. As discussed in detail below, the first 319 and second 323 inlet ports connect to the hot and cold water distribution system and first 321 and second 325 discharge ports connect to the hot and cold water valves on the fixture (i.e., sink, shower, bathtub or etc.) with which the bypass valve 311 is utilized. The use of both an inlet 319 and discharge 321 ports on the hot side distinguish the bypass valve 311 from other known bypass valves, which utilize a single port, and provide significant benefits for bypass valve 311. The bypass valve 311 reduces the number of plumbing fittings (at least one tee) and plumber time for installation by allowing it to be connected simply with swivel nut hoses. Because the "tee" function is internal to valve body 313, hot water flowing to the open fixture valve flows through valve body 313, around the thermal actuator body, allowing immediate response to rising temperature. Conversely, if the tee is an external pipe fitting remote from the thermal bypass valve, response will be slowed. This use of an integral tee shortens time in which water can be siphoned from cold to hot, eliminating the need for an internal check valve. Hot water flowing through valve body 313 to an open fixture also allows placement of a screen inside the valve body 313 such that it is swept clean. The use of the second port on the hot side also allows placement of a retaining pin without the need for an extra seal. The use of two ports on the cold side (i.e., inlet port 323 and discharge port 325) also eliminates the use of an external tee and further simplifies and reduces the cost of installing the bypass valve 311. In addition, two ports on the cold side also facilitate the use of a retaining slot for holding a check valve, if one is used.

As best shown in FIG. 25 and discussed in more detail below, valve body 313 houses a thermally sensitive actuating element 326, bias spring 328, an over-travel spring 330, screen 332, retaining pin 334 and check valve 336. Valve body 313 can most economically and effectively be manufactured out of a molded plastic material, such as Ryton®, a polyphenylene sulphide resin available from Phillips Chemical, or a variety of composites. Molded plastic materials are preferred due to their relatively high strength and chemical/corrosion resistant characteristics while providing the ability to manufacture the valve body 313 utilizing injection molding processes with the design based on the configuration described herein without the need for expensive casting or machining. Alternatively, valve body 313 can be manufactured from various plastics, reinforced plastics or metals that are suitable for "soft" plumbing loads and resistant to hot chlorinated water under pressure. As shown in FIGS. 25 and 26, first end 315 of valve body 313 is molded with wall 309 having a passage 337 therein interconnecting first end 315 and second end 309 to allow fluid to flow therethrough, a set of axially oriented fin guides 338 having ends that form an internal shoulder 340 inside valve body 313 for fixedly receiving and positioning one end of thermal actuating element 326 and the bias spring 328, and a retaining pin hole 344 for receiving retaining pin 334. Second end 309 is molded with retaining slot 346 for engagement with the snap-in check valve 336. The valve body 313 is designed so the components can fit through either of the inlet and/or discharge ports, which will typically be one-half inch diameter. In this manner, a one piece bypass valve 311 results with no intermediate or additional joints required for installation.

Figure 27:
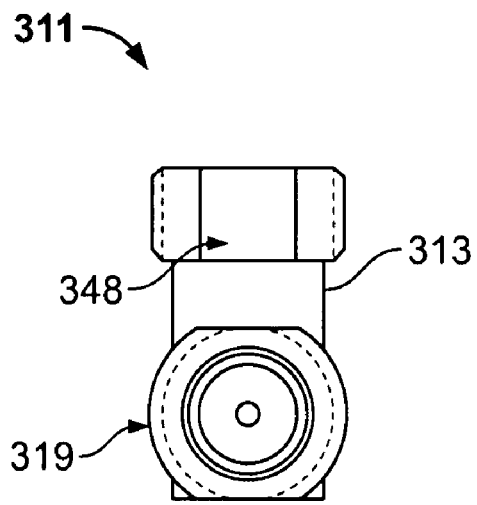
FIG. 27 is an end view of the second end of the valve body of the bypass valve of FIG. 24.
Figure 28:
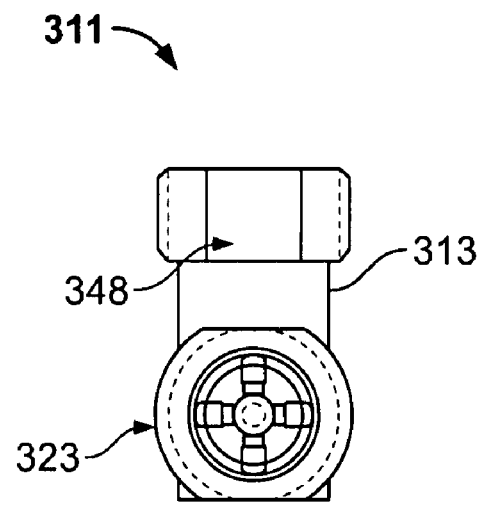
FIG. 28 is an end view of the first end of the valve body of the bypass valve of FIG. 24.

For ease of installation of the bypass valve 311 by the user, each of the four ports (319, 321, 323 and 325) on valve body 313 have one-half inch straight pipe threads for use with the swivel nuts that are commonly found on standard connection hoses that fit the typical residential faucet. As illustrated in FIGS. 27 and 28, the threads on all four ports are molded with flats or axial slots 348 interrupting the threads to prevent a user from attempting to mount valve body 313 directly to "hard" plumbing with female taper pipe threads. The swivel nuts on the connection hoses seal with hose washers against the ends of the four ports, as opposed to common pipe fittings that seal at the tapered threads. These four ports can be marked "hot in", "hot out", "cold in", and "cold out" as appropriate to provide visual indicators for the do-it-yourself installer so as to avoid confusion. In the preferred installation of bypass valve 311, inlet port 319 connects to the hot water angle stop at the wall and the discharge port 321 connects to the hot water faucet. Inlet port 323 connects to the cold water angle stop and discharge port 325 connects to the cold water faucet. In actuality, the two hot hoses can be interchanged on the two hot ports (ports 319 and 321), as can the two cold hoses on the cold ports (ports 323 and 325).

Figure 29:
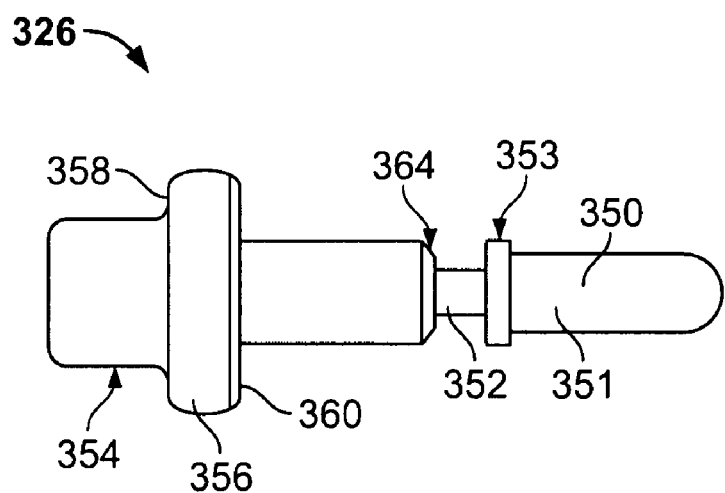
FIG. 29 is a side view of the thermally sensitive actuating element for use in the bypass valve of FIG. 24.

Thermally sensitive actuating element 326 is preferably of the wax filled cartridge type, also referred to as wax motors, having an integral piston/poppet rod member 350, as best shown in FIG. 29. The actuating element 326 may be substantially similar to the actuating element 54 illustrated above in FIG. 4. Rod member 350 comprises poppet 351 attached to piston 352 with an intermediate flange 353 thereon. The end of poppet 351 seats against valve seat 342 to close passage 337. The body 354 of actuating element 326 has a section 356 of increased diameter to seat against shoulder 340 in valve body 313. As shown in FIG. 25, over-travel spring 330 abuts against first side 358 of actuator body 354 and second side 360 of actuator body abuts against shoulder 340. Piston 352 of rod member 350 interconnects poppet 351 with actuator body 354. Actuating element 326 operates in a conventional and well known manner. Briefly, actuating element 326 comprises a wax or a mixture of wax and metal powder (i.e., copper powder) enclosed in actuator body 354 by means of a membrane made of elastomer or the like. Upon heating the wax or wax with copper powder mixture slowly expands, thereby pushing piston 352 and poppet 351 of rod member 350 in an outward direction. Upon cooling, the wax or wax/copper powder mixture contracts and rod member 350 is pushed inward by bias spring 328 until flange 353 contacts actuator body 354 at actuator seat 364. Although other types of thermal actuators, such as bimetallic springs and memory alloys (i.e., Nitinol and the like) can be utilized, the wax filled cartridge type is preferred because the wax can be formulated to change from the solid to the liquid state at a particular desired temperature. The rate of expansion with respect to temperature at this change of state is many times higher, resulting in almost snap action of the wax actuating element 326. The temperature set point is equal to the preset value, such as 397 degrees Fahrenheit, desired for the hot water. This is a "sudden" large physical motion over a small temperature change. As stated above, this movement is reacted by bias spring 328, which returns rod member 350 as the temperature falls.

Although not entirely demonstrated in early tests, it is believed that beneficial "toggle" action can be achieved with a bypass valve 311 of very simple mechanical design. If the motion of the thermal actuator 326 is made to lag behind the temperature change of the water surrounding it by placing suitable insulation around the actuator 326 or by partially isolating it from the water, then instead of slowly closing only to reach equilibrium at a low flow without reaching shutoff, the water temperature will rise above the extending temperature of the insulated actuator 326 as the valve approaches shutoff, and the piston 350 will then continue to extend as the internal temperature of the actuator 326 catches up to its higher surrounding temperature, closing the valve 311 completely. It is also believed that an insulated actuator 326 will be slow opening, its motion lagging behind the temperature of the surrounding cooling-off water from which it is insulated. When actuating element 326 finally begins to open the valve 311 and allow flow, the resulting rising temperature of the surrounding water will again, due to the insulation, not immediately affect it, allowing the bypass valve 311 to stay open longer for a complete cycle of temperature rise. Such an "insulated" effect may also be accomplished by use of a wax mix that is inherently slower, such as one with less powdered copper or other thermally conductive filler. An actuator 326 to be installed with insulation can be manufactured with a somewhat lower set point temperature to make up for the lag, allowing whatever valve 311 closing temperature desired.

Also inside valve body 313 is an over-travel spring 330, disposed between the first side 358 of the actuator body 354 and a stop located inside valve body 313 to prevent damage to a fully restrained actuator 326 heated above the bypass valve's 311 maximum operating temperature and to hold the actuator 326 in place during operation without concern for normal tolerance. Over-travel spring 330 allows movement of the actuator body 354 away from the seated poppet 351 in the event that temperature rises substantially after the poppet 351 contacts seat 342. Without this relief, the expanding wax would distort its copper can, destroying the calibrated set point. The over-travel spring 330 also holds the bias spring 328, rod member 350 and actuator body 354 in place without the need to adjust for the stack-up of axial tolerances. Alternatively, actuator 326 can be fixedly placed inside valve body 313 by various mechanisms known in the art, including adhesives and the like. Over-travel spring can be held in place by various internal configurations commonly known in the art, such as a molded seat. In the preferred embodiment, however, over-travel spring 330 abuts against screen 332, which is held in place by cantilevered retention pin 334. Screen 332 can be a small wire fabric, mesh-type screen that is shaped and configured to fit within the first end 315 of valve body 313. Screen 332 is utilized to keep hard water lime particles and other detritus out of bypass valve 311 and to act as a seat for the over-travel spring (as explained above). Screen 332 is positioned inside valve body 313, as shown in FIG. 25, at the intersection of first inlet port 319 and first discharge port 321 so as to have its surface swept clean each time the hot water faucet is turned on. The retention pin 334 is to hold screen 332, as well as the other components, in place inside valve body 313. Retention pin 334 is installed in valve body 313 through first discharge port 321 so as to abut screen 332, thereby eliminating the need for an extra external seal.

In an alternative embodiment, a snap-in cartridge check valve 336 is located in the second end 309 of valve body 313, as shown in FIG. 25, to prevent siphoning of cold water through the bypass valve 311 when only the hot water faucet is on, and at a high flow rate, prior to the hot water temperature rising. The preferred embodiment does not use the check valve because at very low flow rates the check valve will tend to chatter, which is a common problem with check valves.

Figure 30:
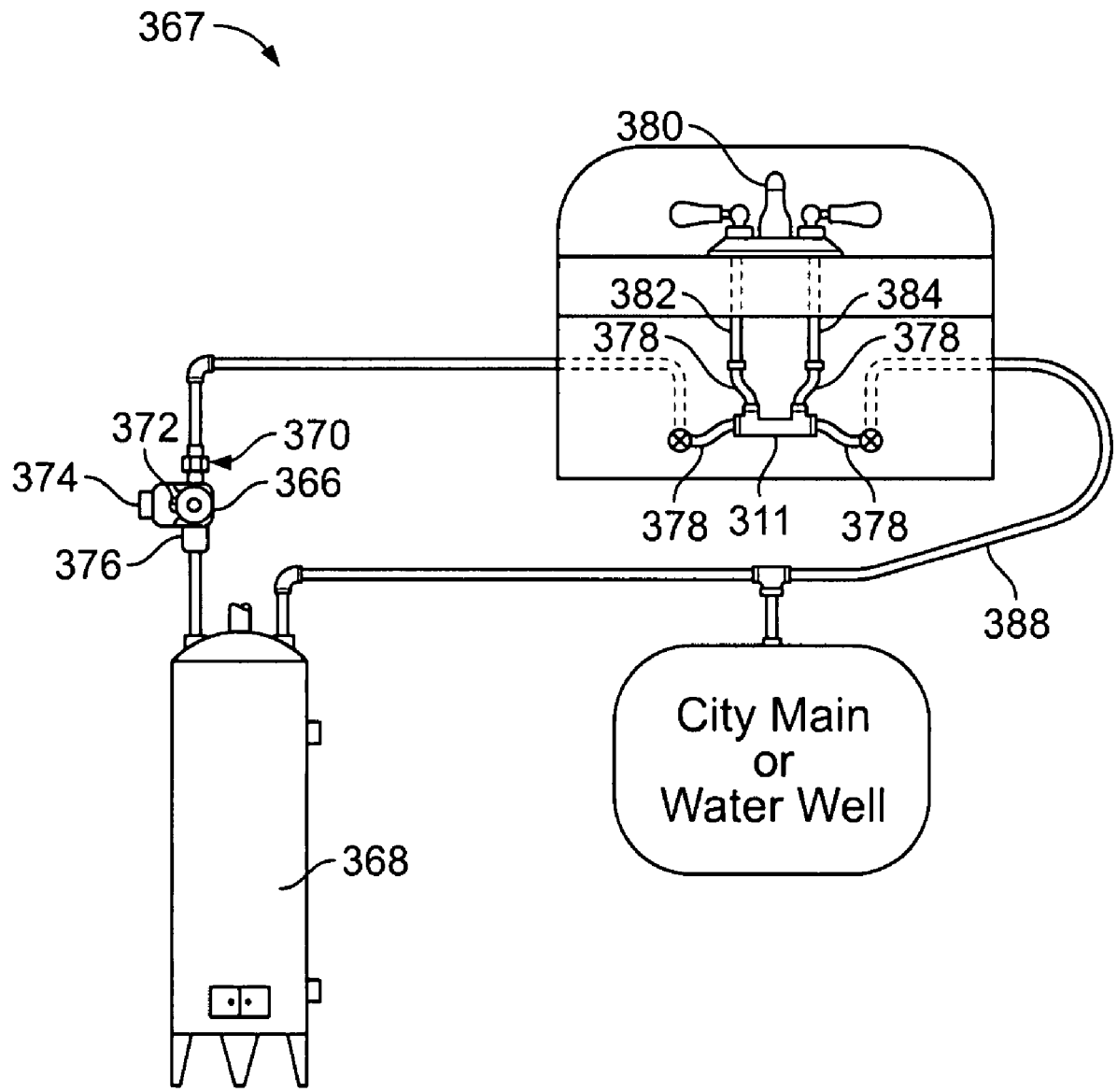
FIG. 30 is a side elevation view showing a water distribution system and fixture utilizing the bypass valve of FIG. 24.

In order to achieve the desired circulation flow, a single circulating pump 366 is utilized as part of a water circulating system 367, as shown in FIG. 30. Pump 366 can be a single, small pump of the type used in residential hot water space heating. In fact, a very low flow/low head pump is desirable, as a larger (i.e., higher head/higher flow) pump mounted at the typical domestic water heater 368 tends to be noisy. This annoying noise is often transmitted by the water pipes throughout the house. In addition, if the shower (as an example) is already in use when pump 366 turns on, whether the first start or a later cyclic turn-on, the sudden pressure boost in the hot water line from a larger pump can result in an uncomfortable and possibly near-scalding temperature rise in the water at the shower head or other fixture in use. The smaller boost of a "small" pump (i.e., one with a very steep flow-head curve) will result in only a very small and less noticeable increase in shower temperature. In the preferred embodiment, the single, small pump 366 needs to provide only a flow of approximately 0.3 gpm at 1.0 psi pressure. In accordance with pump affinity laws, such a "small" pump requires a very small impeller or low shaft speed. The inventors have found that use of a very small impeller or low shaft speed also precludes formation of an air bubble in the eye of the impeller, which bubble may be a major cause of noise. Such a small steep curve pump will, however, constitute a significant pressure drop in the hot water line when several fixture taps are opened simultaneously (such as a bathtub and the kitchen sink). To avoid reduced flow, a check valve 370 can be plumbed in parallel with pump 366 or incorporated within the pump housing, to pass a flow rate exceeding the pump's capacity around pump 366. When pump 366 is powered and flow demand is low, check valve 370 prevents the boosted flow from re-circulating back to its own inlet. With check valve 370 plumbed around pump 366, it is advantageous to place an orifice 372 in the pump discharge to provide a simple manner to achieve the desired very steep flow-head curve from available stock pump designs. A single pump 366 located at or near the water heater 368 in its discharge piping will boost the pressure in the hot water pipes somewhat above that in the cold water pipes (i.e., perhaps one to three feet of boost). With this arrangement only one pump 366 per plumbing system (i.e., per water heater) is required with any reasonable number of remote faucet sets (i.e., the typical number used in residences) equipped with bypass valves 311. This is in contrast to those systems that require multiple pumps, such as a pump at each fixture where bypassing is desired.

If desired, pump 366 can operate twenty-four hours a day, with most of the time in the no flow mode. However, this is unnecessary and wasteful of electricity. Alternatively, pump 366 can have a timer 374 to turn on the pump 366 daily at one or more times during the day just before those occasions when hot water is usually needed the most (for instance for morning showers, evening cooking, etc.) and be set to operate continuously for the period during which hot water is usually desired. This still could be unnecessary and wasteful of electricity. Another alternative is to have the timer 374 cycle pump 366 on and off regularly during the period when hot water is in most demand. The "on" cycles should be of sufficient duration to bring hot water to all remote fixtures that are equipped with a bypass valve 311, and the "off" period would be set to approximate the usual time it takes the water in the lines to cool-down to minimum acceptable temperature. Yet another alternative is to equip pump 366 with a normally closed flow switch 376 sized to detect significant flows only (i.e., those flows that are much larger than the bypass valve 311 flows), such as a shower flowing. For safety purposes, the use of such a switch 376 is basically required if a cyclic timer 374 is used. The switch can be wired in series with the pump motor. If the switch indicates an existing flow at the moment the timer calls for pump on, the open flow switch will prevent the motor from starting, thereby avoiding a sudden increase in water temperature at the fixture (i.e., a shower) being utilized. The use of such a switch accomplishes several useful objectives, including reducing electrical power usage and extending pump life if hot water is already flowing and there is no need for the pump to operate, avoiding a sudden temperature rise and the likelihood of scalding that could result from the pump boost if water is being drawn from a "mixing" valve (such as a shower or single handle faucet) and allowing use of a "large" pump (now that the danger of scalding is eliminated) with its desirable low pressure drop at high faucet flows, thereby eliminating the need for the parallel check valve 370 required with a "small" pump.

By using a time-of-day control timer 374, pump 366 operates to maintain "instant hot water" only during periods of the day when it is commonly desired. During the off-cycle times, the plumbing system operates just as if the bypass valves 311 and pump 366 were not in place. This saves electrical power usage from pump operation and, more importantly, avoids the periodic introduction of hot water into relatively uninsulated pipes during the off-hours, thereby saving the cost of repeatedly reheating this water. The time-of-day control also avoids considerable wear and tear on pump 366 and the bypass valves 311. Considerable additional benefits are gained by using a cyclic timer 374, with or without the time-of-day control. In addition to saving more electricity, if a leaky bypass valve or one not having toggle action is used, there will be no circulating leakage while the pump is cycled off, even if the valve fails to shut off completely. Therefore, a simple (i.e., one not necessarily leak tight) valve may suffice in less demanding applications. Having the leakage reduced to just intermittent leakage will result in reduced warming of the cold water line and less reheating of "leaking" recirculated water. In addition, shut-off of a toggle action valve upon attainment of the desired temperature is enhanced by the differential pressure an operating pump provides. If pump 366 continues to run as the water at the bypass valve 311 cools down, the pump-produced differential pressure works against re-opening the valve. If pump 366 operates cyclically, powered only a little longer than necessary to get hot water to bypass valve 311, it will be "off" before the valve 311 cools down. When the minimum temperature is reached, the thermal actuator 326 will retract, allowing the bias spring 328 to open the valve 311 without having to fight a pump-produced differential pressure. Bypass flow will begin with the next pump "on" cycle. An additional benefit to the use of either a time-of-day or cyclic timer 374 is that it improves the operating life of thermal actuator 326. Because use of either timer 374 causes cyclic temperature changes in valve 311 (as opposed to maintaining an equilibrium setting wherein temperature is constant and the actuator barely moves), there is frequent, substantial motion of the piston 350 in thermal actuator 326. This exercising of actuator 326 tends to prevent the build-up of hard water deposits and corrosion on the actuator piston 350 and poppet face, which deposits would render the valve 311 inoperable.

In the preferred embodiment, bypass valve 311 is manufactured from a one-piece molded valve body 313 that is configured as described above with fin guides 338, internal shoulder 340, passage 337, retaining pin hole 344 and retaining slot 346 for ease of manufacture and reduced manufacturing costs. The bias spring 328, wax cartridge actuating element 326 with its piston/poppet rod member 350, the over-travel spring 330 and screen 332 are placed into the "hot" axial port (the first inlet port 319) in that order. Screen 332 is pushed against the over-travel spring 330 compressing it, thereby making room for insertion of the retaining pin 334 through the retaining pin hole 344 at the "hot" radial port (the first discharge port 321). The cartridge check valve 336, if utilized, is inserted into the "cold" axial port (the second inlet port 323) and snaps into place in retaining slot 346.

Installation of the bypass valve 311 is also made easy by manufacturing the valve 311 in the configuration as set forth above. As discussed, valve body 313 is molded with four ports (designated as 319, 321, 323 and 325).to allow installation with commonly used under-sink (as an example) vinyl hoses or flexible metal pipe, shown as 378 in FIG. 30, having swivel ends and faucet washers. The inlet ports 319 and 323 on valve body 313 are formed with one-half inch straight pipe threads to allow the installer to remove the end of the wall shut off-to-faucet hoses (hot and cold) at the faucet 380 and connect those ends, which are commonly one-half inch straight pipe threads, to valve inlets 319 and 323. The valve discharge ports 321 and 325 are likewise molded with one-half inch straight pipe threads to allow connection from them to the hot 382 and cold 384 inlets at faucet 380. The threads on all four ports will seal only with hose washers and swivel nuts. Because the use of a plastic valve body 313 is envisioned, the inability to mount valve body 313 directly to "hard" plumbing with taper pipe threads insures that the body 313 will be connected only with flexible lines 378, thereby precluding any plumbing loads that might overstress the non-metallic body. Because all current American faucets 380 are equipped with one-half inch straight pipe threads, the recommended procedure is to remove the pair of existing connection hoses 378 from the faucet 380 and connect these loose ends to the appropriate inlet ports 319 and 323 of valve body 313. The angle stop valves at the wall may have any of several possible thread size connections, or may have permanently connected hoses or tubes. As a result, it is best not to disturb these wall connections, but instead use hoses 378 to connect from the angle stop to bypass valve 311. A new set of hoses 378 with one-half inch straight pipe thread swivel nuts at both ends can then be connected from discharge ports 321 and 325 of valve body 313 to the appropriate hot 382 and cold 384 water connections on faucet 380.

Figure 31:
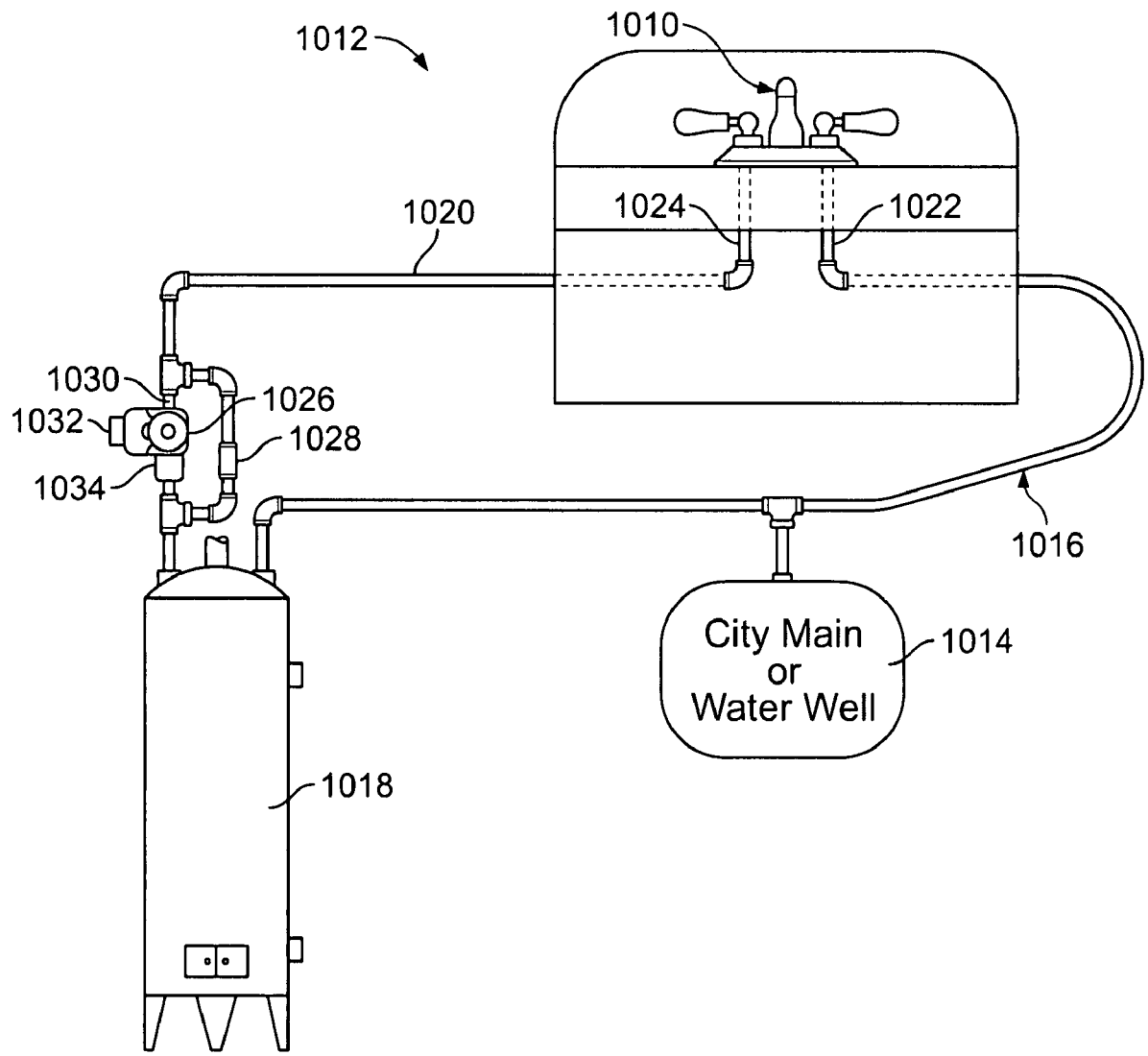
FIG. 31 shows an exemplary water distribution system that utilizes a water control fixture (faucet) having a thermostatically controlled bypass valve.

FIG. 31 illustrates another exemplary water distribution system 1012 utilizing a water control fixture 1010. The water control fixture is illustrated as being a faucet, however, other water control fixtures may be adaptable to the thermal bypass valve features described herein (i.e., solenoid valve used on home laundry washing machines). The water distribution system 1012 typically comprises a supply of cold water 1014, such as from a city main or water well, that supplies cold water directly to faucet 1010 through cold water line 1016 and water to hot water heater 1018 so that it may heat the water and supply hot water to faucet 1010 through hot water line 1020. Cold water line 1016 connects to faucet 1010 through cold water inlet 1022 and hot water line 1020 connects to faucet 1010 through hot water inlet 1024, as explained in more detail below.

An exemplary system 1012 utilizes a small circulating pump 1026 of the type used in residential hot water space heating. A very low flow and low head pump is desirable because a larger (i.e., higher head/higher flow) pump mounted at the typical domestic water heater 1018 tends to be noisy. This annoying noise is often transmitted by the water pipes throughout the house. In addition, if the shower (as an example) is already in use when pump 1026 turns on, whether the first start or a later cyclic turn-on, the sudden pressure boost in the hot water line 1020 from a larger pump can result in an uncomfortable and possibly near scalding temperature rise in the water at the shower head or other fixture in use. The smaller boost of a "small" pump (i.e., one with a very steep flow-head curve) will result in only a very small and less noticeable increase in shower temperature. In the preferred embodiment, the single, small pump 1026 needs to provide only a flow of approximately 0.3 gpm at 1.0 psi pressure. In accordance with pump affinity laws, such a "small" pump requires a very small impeller or low shaft speed. The inventors have found that use of a very small impeller or low shaft speed also precludes formation of an air bubble in the eye of the impeller, which bubble may be a major cause of noise. Such a small steep curve pump may, however, constitute a significant pressure drop in the hot water line 1020 when several fixture taps are opened simultaneously (such as a bathtub and the kitchen sink). To avoid reduced flow in those installations having a relatively low volume pump, a check valve 1028 can be plumbed in parallel with pump 1026 or incorporated within the pump housing, to pass a flow rate exceeding the pump's capacity around pump 1026. When pump 1026 is powered and flow demand is low, check valve 1028 prevents the boosted flow from re-circulating back to its own inlet. With check valve 1028 plumbed around pump 1026, it is advantageous to place an orifice 1030 in the pump discharge to provide a simple manner to achieve the desired very steep flow-head curve from available stock pump designs. A single pump 1026 located at or near the water heater 1018 in its discharge piping will boost the pressure in the hot water pipes somewhat above that in the cold water pipes (i.e., perhaps one to three feet of boost). With this arrangement only one pump 1026 per plumbing system (i.e., per water heater 1018) is required with any reasonable number of remote faucets 1010 (i.e., the typical number used in residences) equipped with bypass valves. This is in contrast to those systems that require multiple pumps, such as a pump at each fixture where bypassing is desired.

If desired, pump 1026 can operate twenty-four hours a day, with most of the time in the no flow mode. However, this is unnecessary and wasteful of electricity. Alternatively, pump 1026 can have a timer 1032 to turn on the pump 1026 daily at one or more times during the day just before those occasions when hot water is usually needed the most (for instance for morning showers, evening cooking, etc.) and be set to operate continuously for the period during which hot water is usually desired. This still could be unnecessary and wasteful of electricity. Another alternative is to have the timer 1032 cycle pump 1026 on and off regularly during the period when hot water is in most demand. The "on" cycles should be of sufficient duration to bring hot water to all remote fixtures 1010 that are equipped with a bypass valve, and the "off" period would be set to approximate the usual time it takes the water in the lines to cool-down to minimum acceptable temperature. Yet another alternative is to equip pump 1026 with a normally closed flow switch 1034 sized to detect significant flows only (i.e., those flows that are much larger than the bypass valve flows), such as a shower flowing. For safety purposes, the use of such a switch 1034 is basically required if a cyclic timer 1032 is used. The switch 1034 can be wired in series with the motor in pump 1026. If the switch 1034 indicates an existing flow at the moment the timer calls for pump 1026 to be on, the open flow switch 1034 will prevent the motor from starting, thereby avoiding a sudden increase in water temperature at the fixture 1010 (i.e., particularly if it is a shower) being utilized. The use of such switch 1034 accomplishes several useful objectives, including reducing electrical power usage and extending pump life if hot water is already flowing and there is no need for the pump to operate, avoiding a sudden temperature rise and the likelihood of scalding that could result from the pump boost if water is being drawn from a "mixing" valve (such as a shower or single handle faucet) and allowing use of a "large" pump (now that the danger of scalding is eliminated) with its desirable low pressure drop at high faucet flows, thereby eliminating the need for the parallel check valve 1028 required with a "small" pump.

By using a time-of-day control timer 1032, pump 1026 operates to maintain "instant hot water" only during periods of the day when it is commonly desired. During the off-cycle times, the plumbing system 1012 operates just as if the faucet 1010 having bypass valves and pump 1026 were not in place. This saves electrical power usage from pump operation and, more importantly, avoids the periodic introduction of hot water into relatively un-insulated pipes during the off-hours, thereby saving the cost of repeatedly reheating this water. The time-of-day control also avoids considerable wear and tear on pump 1026 and the bypass valve in faucet 1010. Considerable additional benefits are gained by using a cyclic timer 1032, with or without the time-of-day control. In addition to saving more electricity, if a leaky bypass valve or one not having toggle action is used, there will be no circulating leakage while the pump 1026 is cycled off, even if the valve fails to shut off completely. Therefore, a simple (i.e., one not necessarily leak tight) valve may suffice in less demanding applications. Having the leakage reduced to just intermittent leakage will result in reduced warming of the cold water line 1016 and less reheating of "leaking" re-circulated water.

Figure 32:
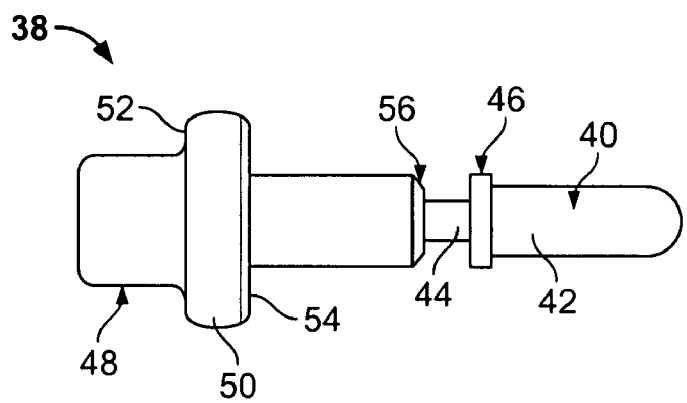
FIG. 32 is a side view of an exemplary thermally sensitive actuating element, shown in its unmodified condition, for use in the bypass valve shown in FIG. 31.

The bypass valve assemblies 1036 have a thermally sensitive actuating element 1038, an example of which is shown in FIG. 32, for thermostatically controlling bypass valve 1036. Actuating element 1038 is preferably of the wax filled cartridge type, also referred to as wax motors, having an integral poppet rod member 1040, as best shown in FIG. 32. Rod member 1040 comprises poppet 1042 attached to piston 1044 with an intermediate flange 1046 thereon. The end of poppet 1042 is configured to seat directly against a valve seat or move a shuttle (i.e., spool or sleeve valves) so as to close a passage. These thermostatic control elements 1038 are well known in the art and are commercially available from several suppliers, such as Caltherm of Bloomfield Hills, Mich. The body 1048 of actuating element 1038 has a section 1050 of increased diameter, having a first side 1052 and second side 1054, to seat against a shoulder or like element in a valve body. Piston 1044 of rod member 1040 interconnects poppet 1042 with actuator body 1048. Actuating element 1038 operates in a conventional and well known manner. Briefly, actuating element 1038 comprises a blend of waxes or a mixture of wax (es) and metal powder (such as copper powder) enclosed in actuator body 1048 by means of a membrane made of elastomer or the like. Upon heating the wax or wax with copper powder mixture expands, thereby pushing piston 1044 and poppet 1042 of rod member 1040 in an outward direction. Upon cooling, the wax or wax/copper powder mixture contracts and rod member 1040 is pushed inward by a bias spring until flange 1046 contacts actuator body 1048 at actuator seat. Although other types of thermal actuators, such as bimetallic springs and memory alloys (i.e., Nitinol and the like) can be utilized, the wax filled cartridge type is preferred because the wax can be formulated to change from the solidus to the liquid state at a particular desired temperature. The rate of expansion with respect to temperature at this change of state is many times higher, resulting in almost snap action of the wax actuating element 1038. The temperature set point is equal to the preset value, such as 97 degrees Fahrenheit, desired for the hot water. This is a "sudden" large physical motion over a small temperature change. As stated above, this movement is reacted by a bias spring that returns rod member 1040 as the temperature falls.

Because the bypass valve 1036 has little or no independent "toggle action," after a few cycles of opening and closing, the valve tends to reach an equilibrium with the plumbing system, whereby the bypass valve 1036 stays slightly cracked open, passing just enough hot water to maintain the temperature constantly at its setting. In particular plumbing systems and at certain ambient conditions, this flow is just under that required to maintain a spring loaded check valve cracked continuously open. In such a situation, the check valve chatters with an annoying buzzing sound. To avoid this occurrence, the spring may be removed from the check valve, leaving the poppet free floating. In the event that the hot water is turned full on at a time when the bypass valve 1036 is open, thereby lowering the pressure in the hot water line 1020, and so inducing flow from the cold water line 1016 through the open bypass valve 1036 to the hot side, the free floating poppet will quickly close. There is no necessity for a spring to keep this check valve closed prior to the reversal in pressures.

Although not entirely demonstrated in early tests, it is believed that beneficial "toggle" action can be achieved with a bypass valve 1036 of very simple mechanical design. If the motion of the thermal actuator 1038 is made to lag behind the temperature change of the water surrounding it by placing suitable insulation around the actuator 1038 or by partially isolating it from the water, then instead of slowly closing only to reach equilibrium at a low flow without reaching shutoff, the water temperature will rise above the extending temperature of the insulated actuator 1038 as the valve approaches shutoff, and the piston 1044 will then continue to extend as the internal temperature of the actuator 1038 catches up to its higher surrounding temperature, closing the valve 1036 completely. It is also believed that an insulated actuator 1038 will be slow opening, its motion lagging behind the temperature of the surrounding cooling-off water from which it is insulated. When actuating element 1038 finally begins to open the valve 1036 and allow flow, the resulting rising temperature of the surrounding water will again, due to the insulation, not immediately affect it, allowing the bypass valve 1036 to stay open longer for a complete cycle of temperature rise. Such an "insulated" effect may also be accomplished by use of a wax mix that is inherently slower, such as one with less powdered copper or other thermally conductive filler. An actuator 1038 to be installed with insulation can be manufactured with a somewhat lower set point temperature to make up for the lag, allowing whatever valve 1036 closing temperature desired.

An additional benefit of utilizing pump 1026 in system 1012 is that shut-off of a toggle action valve upon attainment of the desired temperature is enhanced by the differential pressure an operating pump 1026 provides. If pump 1026 continues to run as the water at the faucet 1010 cools down, the pump-produced differential pressure works against re-opening a poppet type bypass valve 1036 in faucet 1010. If pump 1026 operates cyclically, powered only a little longer than necessary to get hot water to faucet 1010, it will be "off" before the water at valve 1036 cools down. When the minimum temperature is reached, the thermal actuator 1038 will retract, allowing the bias spring to open valve 1036 without having to fight a pump-produced differential pressure. Bypass flow will begin with the next pump "on" cycle. An additional benefit to the use of either a time-of-day or cyclic timer 1032 is that it improves the operating life of thermal actuator 1038. Because use of either timer 1032 causes cyclic temperature changes in valve 1036 (as opposed to maintaining an equilibrium setting wherein temperature is constant and the actuator 1038 barely moves), there is frequent, substantial motion of the piston 1044 in thermal actuator 1038. This exercising of actuator 1038 tends to prevent the build-up of hard water deposits and corrosion on the cylindrical surface of actuator piston 1044 and face of poppet 1042, which deposits could render the valve 1036 inoperable.

Also inside valve 1036 can be an over-travel spring (not shown) disposed between the first side 1052 of the actuator body 1048 and a stop located inside valve 1036 to prevent damage to a fully restrained actuator 1038 if it were heated above the bypass valve's maximum operating temperature and to hold the actuator 1038 in place during operation without concern for normal tolerance. Use of an over-travel spring, which is not necessary for spool-type valves, allows movement of the actuator body 1048 away from the seated poppet 1042 in the event that temperature rises substantially after the poppet 1042 contacts its seat. Without this relief, the expanding wax could distort its copper can, destroying the calibrated set point. The over-travel spring also holds the bias spring, rod member 1040 and actuator body 1048 in place without the need to adjust for the stack-up of axial tolerances. Alternatively, actuator 1038 can be fixedly placed inside valve 1036 by various mechanisms known in the art, including adhesives and the like. Over-travel spring, if used, can be held in place by various internal configurations commonly known in the art, such as a molded seat.

As there are a great many configurations and brands of faucets 1010, there are several different preferred designs of bypass valve 1036 placement and arrangement to accommodate these many faucet configurations. Various specific examples are set forth below. The following examples are representative of the types of uses to which the integral or in-faucet bypass valve 1036 is suitable. The examples are for illustrative purposes only and are not intended to restrict the components to particular uses, sizes or materials used in the examples.

For instance, there are several basic types of faucet assemblies, including those that have a single handle faucet assembly that mixes the hot and cold water and delivers a flow of water out the single spout based on the user's movement of the faucet's valve assembly. Another common type of faucet assembly is the dual handle, single spout faucet assembly that has separate handles for the hot and cold water. As with the single handle assembly, the hot and cold water are mixed prior to the spout based on the user's selection of the amount of flow of hot and/or cold water. A third, older arrangement is the use of completely separate faucets for hot and cold water. Although the different manufacturers of faucets may utilize different arrangements of valving components, different valving mechanisms and/or different valves to water supply line connections, the bypass valve system is adaptable to all such known configurations. As set forth below, the primary selection in the use of the bypass faucet assembly is whether to place the bypass valve in a stationary portion of the faucet, such as the hot water piping leading to the faucet or in a housing or block portion of the faucet, or to place the bypass valve in the moveable valving of the faucet. Selection of which location to place the bypass valve assembly will often be dictated by economics, preferences, limitations on the amount of space available, the current design of the faucet and/or the willingness to change.

EXAMPLE 1

Single Handle Faucets w/Bypass Valve in Stationary Block

As is well known, single handle faucets, an example of which is shown as fixture body 1060, faucet 1010 without its decorative covering, in FIGS. 33 and 34, have both hot 1024 and cold 1022 water inlets connected to a housing or block 1062. Various internal valving means, such as pivoting and rotating ball 1064, selectively and adjustably control the volume and temperature of the flow of water by connecting the hot 1020 and cold 1016 lines, through hot and cold conduits 1066 and 1068 respectively (as shown in FIGS. 35 and 37), to a single outlet spout 1070 through spout outlet 1072. In such designs, the thermal bypass valve 1036 is preferably assembled into an easily replaceable cartridge 1074, shown best in FIGS. 38, 39 and 40, that can be located within the hot water conduit 1066 of fixture body 1060 (if the design provides such access) or in an added cavity 1076 placed between and connected to the hot 1024 and cold 1022 inlets, as shown in FIG. 37. In either case, the bypass valve 1036 senses and is controlled by the temperature of the "hot" water in the fixture body 1060. When the "hot" water is cooled off due to long disuse, the bypass valve 1036 will open, providing a conduit between the hot 1024 and cold 1022 inlets. If the hot water line pump 1026 is then turned on, the boosted pressure in the hot water line 1020 will produce flow through the open bypass valve 1036, bringing "hot" water to the fixture body 1060. In the above-mentioned arrangements, the flow of water from both hot 1020 and cold 1016 lines remains unimpeded due to the previously mentioned internal valving arrangement of the fixture body 1060. The flow from the hot line 1020 through the bypass valve cartridge 1074 to the cold line 1016 is provided through molded or cast passages or cross-drilled holes, discussed below.

The single handle faucet body 1060 with spherical ball valving means 1064, shown in FIGS. 33 and 34, is a good example of a faucet design that can be easily and economically re-designed to include a bypass valve cartridge 1074 in the stationary housing 1062. Use of this approach requires al new fixture body 1060 to be installed, with a top-accessible, suitably sized cavity 1076 to hold the bypass cartridge 1074 and connect conduits 1066 and 1068 built into the fixture body 1060 to accommodate the bypassed flow from the hot 1020 to the cold 1016 lines. FIGS. 35 through 37 show a modified and lengthened version of a Delta housing 1062 that is used with the standard Delta faucet outer housing. The portion 1078 above line AA (i.e., to the left of AA in FIG. 36) it is essentially an original Delta housing, with the addition of bore 1076. Below AA (i.e., to the right of AA in FIG. 36) is extension 1080. In an exemplary use, these sections 1078 and 1080 would be made in a single, integral housing 1062. Cavity 1076 and the drilled and plugged cross passages 1082 and 1084 are added, and the top bore 1086 is extended inward if and as much as is needed to accommodate any necessary devices, such as a ring or washer to hold cartridge assembly 1074 in place in cavity 1076. Drilled passage 1082 connects the cold water supply to cavity 1076 near its top and drilled passage 1084 connects the hot water line 1020 to cavity 1076 near its bottom.

Figure 38:
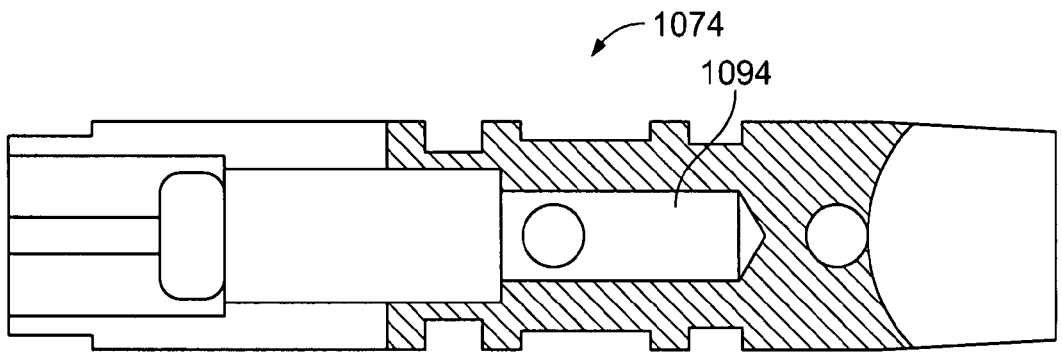
FIG. 38 is a sectional view of a bypass valve cartridge body for use with the bypass valve of FIG. 31.
Figure 39:
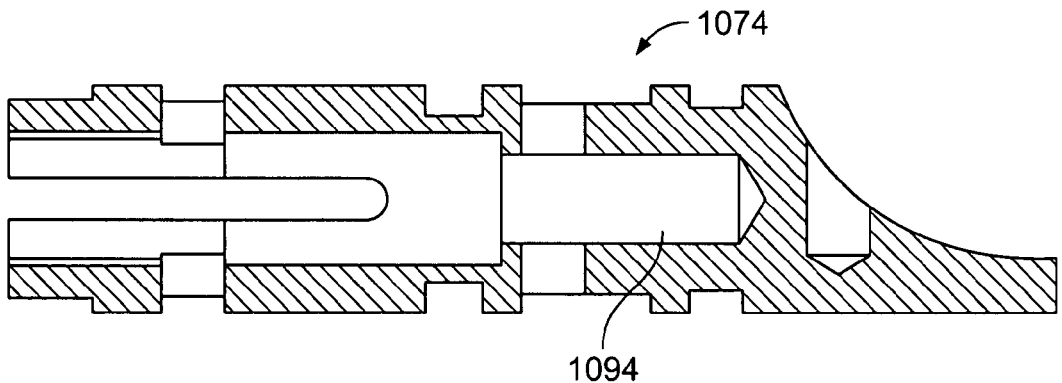
FIG. 39 is a sectional view of the bypass valve cartridge body taken at 90 degrees to FIG. 38.
Figure 40:
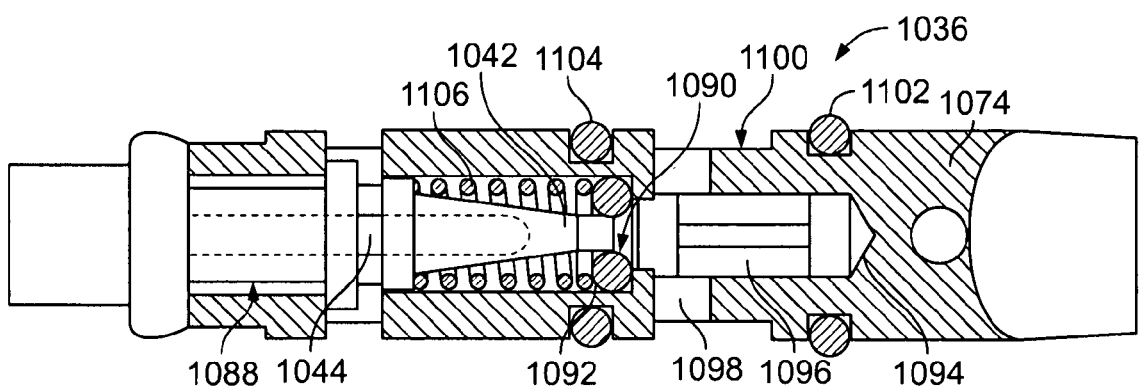
FIG. 40 is a sectional view of the bypass valve cartridge body of FIG. 38 with a bypass valve and other components place therein.

FIGS. 38 and 39 show the bypass valve cartridge 1074, without its internal components, that is designed and configured to fit in cavity 1076. FIG. 40 shows the components, including thermal actuator 1088, assembled together as they would fit into cavity 1076. The thermal actuator 1088 is a modified version of the actuator 1038 shown in FIG. 32. Water from hot water line 1020 is carried through drilled hole 1084 to the lower end of cavity 1076 and flows up around and through the cartridge 1074 to and through the open valve seat 1090 (poppet 1042 is shown closed into against O-ring 1092 forming seat 1090 in FIG. 40) into the check valve chamber 1094 housing check valve 1096 and out through the cross drilled hole 1098 into an annulus 1100 on the cartridge 1074. From annulus 1100, between O-rings 1102 and 1104, the water flows through drilled passage 1082 to the cold water supply. When sufficient water has flowed through the bypass valve 1036 to exhaust the cooled-off water in the hot water supply line 1020 and bring hot water to the bypass valve 1036, the thermal actuator 1088 will cause piston 1044 to extend, forcing poppet 1042 into seat 1090 to close off the flow. The seat O-ring 1092 is held in place by spring 1106, which doubles as the bias or poppet return spring. In the preferred embodiment, thermal actuator 1088 is held in place by a snap fit into the split cartridge 1074, which is designed to be easily moldable. The check valve 1096 is included to prevent flow of cold water into the hot side when the hot water is turned full on in the system, or the equivalent usage of hot water, resulting in a lowered pressure on the hot side. The cartridge 1074 can be held down in cavity 1076 by a brass ring, or the like, which is in turn held down by the screw-on bonnet, which also captures the existing ball valving assembly 1064.

Figure 41:
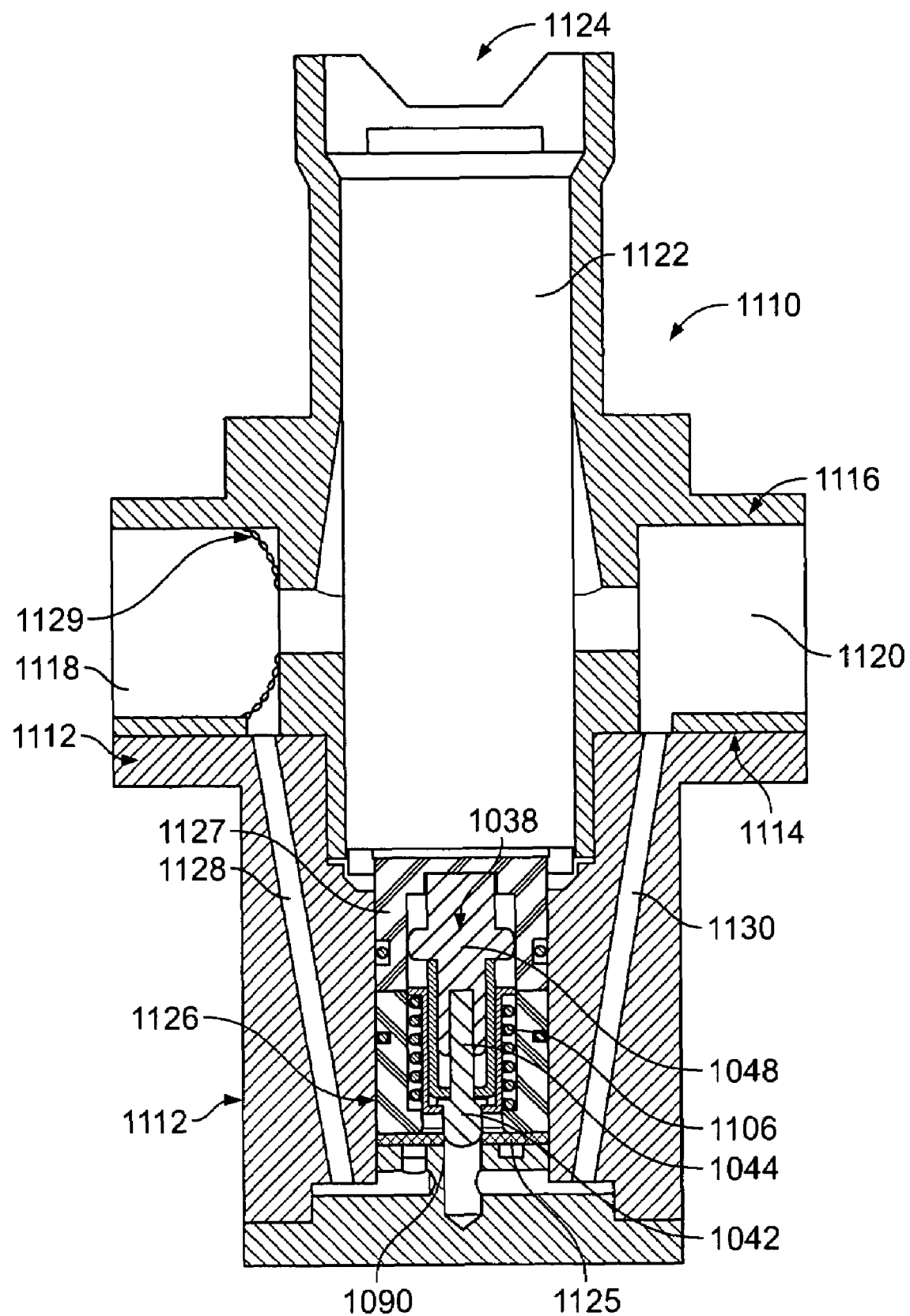
FIG. 41 is a cross-sectional view of the side of an exemplary shower faucet that utilizes a cartridge insert (not shown) for controlling the flow of water through the faucet showing the placement of a bypass valve therein.

Another example of a single handle water control fixture is shown as 1110 in FIG. 41. This fixture 1110 is a modified Moen shower valve that comprises a rear housing 1112 attached to the rear 1114 of Moen housing 1116. Housing 1116 has a hot water inlet port 1118 and a cold water inlet port 1120 for receiving hot and cold water, respectively, from the hot 1020 and cold 1016 water lines and a valve cavity 1122 for receiving the operating valve (not shown) through valve opening 1124. The operating valve controls the flow of hot and cold water out of the spout associated with valve 1110. Rear housing 1112 has a cavity 1126 configured to hold cartridge 1127 and hot 1128 and cold 1130 water channels to allow passage of water around valve cavity 1126 until the hot water reaches the desired temperature to cause actuator 1038 to push piston 1044 rearward until poppet 1042 engages valve seat 1090 to shut-off hot water flow through hot water channel 1128, thereby ending the diversion of "hot" water to the cold water channel 1130. Elastomeric washer shaped diaphragm 1125 acts as a check valve to prevent back flow of cold to hot when hot water line pressure is reduced. Conical washer shaped screens 1129 filers detritus and other trash from passing water. Screens 1129 are self-cleaning due to the high water velocities encountered when the shower valve is running hot water.

EXAMPLE 2

Single Handle Faucets w/Bypass Valve in Moveable Valving

This family of valves may utilize either a moveable perforated hollow spherical ball 1064, as shown in FIGS. 33 and 34, or an internally moveable valve cartridge, that have a common internal flow area to selectively and adjustably connect the hot 1020 and cold 1016 lines to the discharge spout 1070. It is possible to place the same thermal valve system 1036 (in a more compact form) inside of a replacement one inch diameter ball 1134 for the moveable ball type or inside the replaceable faucet cartridges with internally moveable valving parts.

Figure 42:
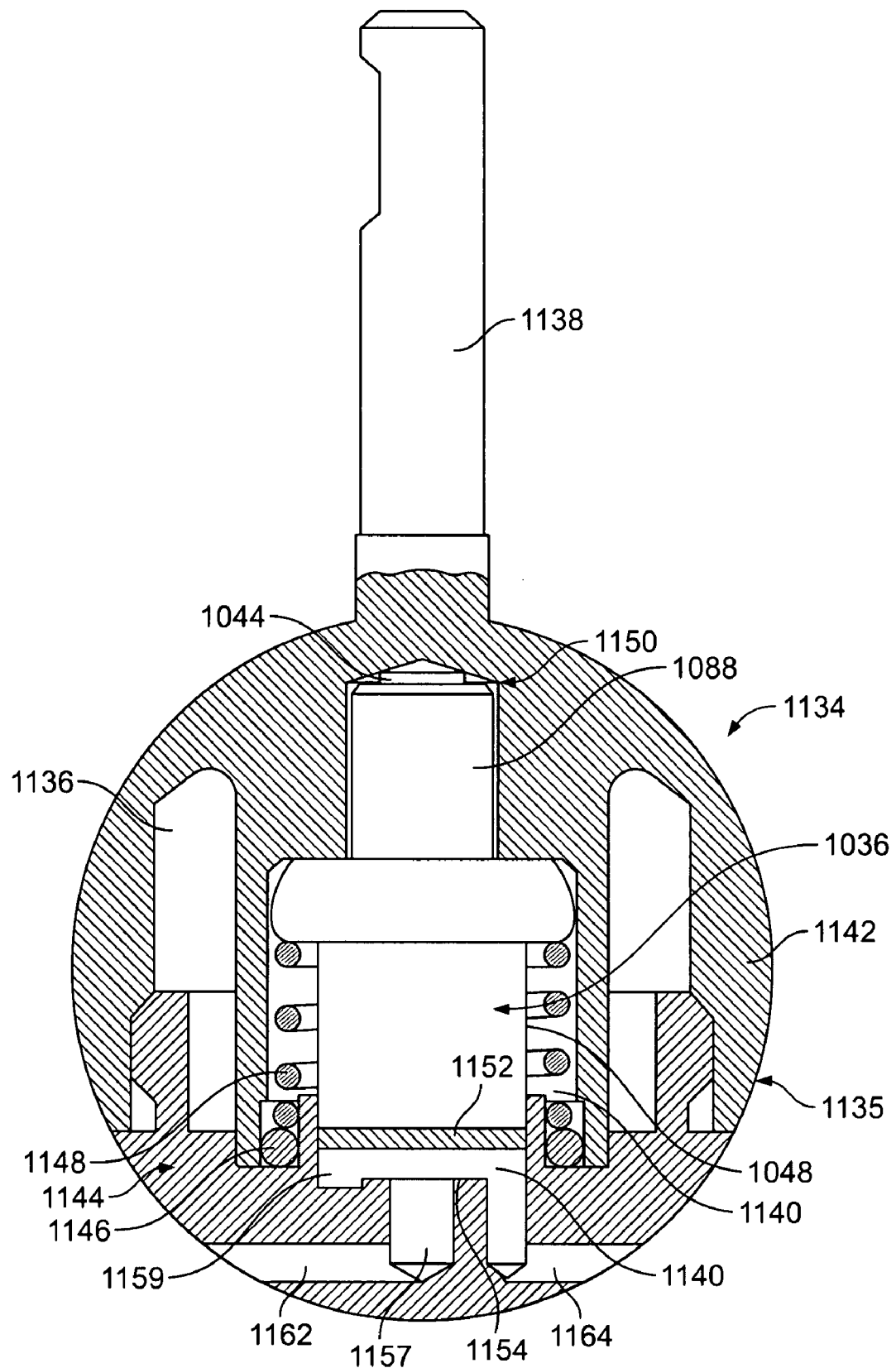
FIG. 42 is a cross-sectional view of the side of an exemplary modified ball control mechanism for use in single handle faucets.

The previous simple hollow sphere, now 1134 (shown in FIGS. 42, 43 and 44), is structurally divided into two separate compartments inside ball body 1135, an outer annular compartment 1136, coaxial with the centerline of the actuating stem 1138, and a cylindrical inner compartment 1140, also coaxial with the centerline of the actuating stem 1138. Passage 1162, connected to annulus 1159, and passage 1164, connected to central bore 1157, are separated by the valving action of the bypass valve 1036 installed in compartment 1140. Ball 1134 is made in two parts, an upper half 1142 and a lower half 1144 (relative to the stem 1138 which normally extends upward), which screw together for convenience in development work. The thermal actuator 1088 is enclosed in the inner compartment 1140 is the same as the actuator discussed above, but with a shortened guide length and a cut-off piston 1044 with no poppet. The radially squeezed O-ring 1146 seals the two halves 1142 and 1144 of ball 1134, and is held in place by the spring 1148, which also functions as the bias or return spring. The piston 1044 is cut off short to conserve space, and bears on the upper end of drilled hole 1150. Unlike the above-mentioned actuators, this piston 1044 remains stationary and it's the thermal actuator body 1048 that moves against spring 1148 to push the elastomer poppet disc 1152, which doubles as a check valve, against the stationary seat 1154 as the valve 1134 heats up.

The two inlet ports on ball body 1135, shown as 1156 for the hot water inlet port and 1158 for the cold water inlet port on FIGS. 43 and 44, selectively and adjustably communicate with the hot 1020 and cold 1016 lines. The ball discharge port 1160 communicates in all ball positions with the faucet spout to discharge water from faucet 1010. Ports 1156, 1158 and 1160 are located in exactly the same locations on the ball body 1135 as the prior art ball 1064 previously. However all three ports are connected within the ball to annular compartment 1136 instead of to the entire inner volume of the hollow prior art ball 1064. In the shut-off mode, the hot and cold inlet ball ports 1156 and 1158, respectively, of ball 1134 are shifted away from the hot 1020 and cold 1016 lines, as with prior art ball 1064. However, ball 1134 includes two added small ports 1162 and 1164 to the unperforated spherical surface that previously blocked off the hot 1020 and cold 1016 lines. Ports 1162 and 1164 connect the hot 1020 and cold 1016 lines to the central bore 1157 and annulus 1159, which are valved by action of poppet disc 1152. When the ball 1134 is cold due to a cooled-off hot water line 1020, the bypass valve 1036 opens, allowing communication between the annulus 1159 and central bore 1157. With the faucet 1010 in the shut-off position, the two added ports 1162 and 1164 thus allow communication between a cooled-off "hot" line 1020 and the cold line 1016, and consequently a flow of water from the boosted "hot" line 1020 to the cold line 1016. Positioning slot 1165 in ball 1134, also in ball 1064, is used to position ball 1134 in the faucet. The bypass action described above is accomplished without change to any part of the faucet 1010 except the replaceable valving ball 1134. It is thus very easy to retrofit an existing faucet to the bypass function by simply replacing the existing "standard" design hollow ball 1064 with the new ball 1134, as described.

There are several major advantages to this arrangement. These advantages include: (1) the complete ball 1134 is easily replaced to fix a malfunctioning bypass valve 1036; (2) for retrofit, the original ball 1064 can be removed and replaced with the new valve-in-ball 1134. No other changes need be made to the existing faucet 1010 (however, a booster pump 1026 located near the hot water heater 18 in the hot water line 1020 does of course need to be installed). This is particularly advantageous where it would be very difficult or impractical to replace an existing complete faucet valve, such as a shower valve installed behind a tiled wall.

While the hollow ball 1064 of the Delta faucet (and other clone faucets) provides an adequate space in a convenient location for installation of the bypass valve 1036, a miniaturized version of the bypass valve 1036 can also be fitted into the replaceable cylindrical valving cartridges of other brands of single handle faucets with an action characterized by oscillating movement about a vertical centerline to adjust water temperature. Such a valving action to control mixing is commonly used in Price-Pfister, Sterling, American Standard, Moen, and Kohler faucets, among others. These faucets use a push-pull or tipping lever action to operate the on-off function within the same (usually) cylindrical cartridge. On some configurations, it is likely that space would have to be made by lengthening these cylindrical faucet cartridges, which would in turn call for a compensating change to the faucet central housing.

FIG. 45 shows a modification of a widely used Moen designed faucet 1200 as an example of a fixture that utilizes a replaceable cylindrical valving cartridge 1202. The modifications to the faucet 1200 include adding a hot water bypass valve 1036 within the moving valving spool 1204 of the Moen design. This valve design is of the type wherein on/off and metering adjustment is accomplished by axial motion of the center spool 1204 (off is all the way inward). Hot/cold mixing adjustment is by angular positioning of the center spool 1204 when it is; wholly or partially pulled out to the on position. The faucet 1200 typically has a brass housing 1206 connected to the cold water inlet 1208 and hot water inlet 1210. A spout connection 1212 allows water to exit the fixture 1200. FIG. 45 shows the spool 1204 in its outward or "full on" position (slot 1214 axially aligns with spout port 1212 and slot 1216 axially aligns with cold 1208 and hot 1210 inlet ports) and angularly rotated so that the hot port 1210 is open to slot 1216 but cold port 1208 is blocked off.

In the position shown in FIG. 45, hot water from port 1210 can enter through slot 1216 to the interior of tubular spool 1204 and proceed through hollow shuttle 1218 to slot 1214 and exit out spout port 1212. Arrows 1220 indicate the length of travel of the spool 1204. Tubular member 1222 is a stationary (preexisting) sleeve incorporated within the housing 1206 to allow placement and retention of the three elastomer seals 1224 to bear against and dynamically seal with spool 1204. It also provides a vent path around its exterior for the space at the "bottom" of the valve 1200 to allow axial (piston) motion of spool 1204 without encountering hydraulic lock. Spool 1204 is shown in a simplified one-piece configuration for clarity.

The bypass valve 1036 components (consisting of bias spring 1226, shuttle 1218, actuator piston 1228 and actuator 1230) are enclosed within the tubular portion of spool 1204. Shuttle 1218 is located (floats) between bias spring 1226 and actuator 1230. Shuttle 1218 has a central cruciform shaped member with an integral elastomer sleeve 1232 attached to the four legs of the cruciform. Four axial passages within the sleeve 1232 and around the cruciform are thus provided. This elastomer sleeve 1232 is in contact with and seals against the inner surface of tubular spool 1204. When thermal actuator 1230 is heated to its actuation temperature, it "suddenly" extends piston 1228 outward, moving shuttle 1218 (to the left in FIG. 45) against bias spring 1226.

Two bleed holes 1234 and 1236 are so located through the wall of tubular spool 1204 as to line up with hot water inlet 1210 and cold water inlet 1208, respectively, when the manually operated spool 1204 is pushed all the way into housing 1206 (the off position). Further, bleed hole 1236 is axially located slightly closer to the bias spring end of spool 1204. O-rings 1238 seal spool 1204 and retaining clip 1240 holds sleeve 1222 within housing 1206.

In FIG. 45, the bypass valve 1036 components are shown in their "cold" positions. Hot bleed hole 1234 is covered by the end of the elastomer sleeve 1232 on shuttle 1218, but cold bleed hole 1236 is uncovered. With spool 1204 pushed all the way in (off position) bleed hole 1234 communicates with hot water inlet 1210 and boosted hot water pressure communicates through hot bleed hole 1234, this pressure deflects elastomer sleeve 1232 inward locally to allow flow from the boosted hot water line 1020 (presumably cooled off from a period of disuse) into the interior of tubular spool 1204 and out through uncovered cold bleed hole 1236, which by virtue of the spool 1204 being in the off position is in communication with cold water inlet 1208. A bypass of cooled off water from the hot water line 1020 to the cold water line 1016 is thus accomplished.

When sufficient cooled off water has passed through the valve 1200 to bring "hot" water to and through the valve 1200, actuator 1230 will be warmed to its actuation temperature and will expand, forcing shuttle 1218 against bias spring 1226. This axial movement will result in elastomer sleeve 1232 covering cold bleed hole 1236. Boosted hot water pressure internal to sleeve 1232 will hold sleeve 1232 outward against the inner wall of tubular spool 1204, effectively sealing bleed hole 1236, and stopping the bypass flow until the valve cools down, causing bias spring 1226 to force shuttle 1218 back against piston 1010 into contracting actuator 1230, again opening cold bleed hole 1236.

The elastomer sleeve 1232 has a second function, that of acting as a check valve. When any faucet in the plumbing system is opened, the resulting flow may induce a substantial pressure drop in the associated plumbing line (either hot 1020 or cold 1016, depending on which faucet was opened). If a bypass valve 1036 is open at such a time, such a pressure difference may cause sufficient water may leak through as to constitute a nuisance. If the lowered pressure is on the hot water line 1020, no "leak" will occur as the higher pressure of the cold water inside the sleeve 1232 will hold it against the inner wall of tubular spool 1204 in the vicinity of hot bleed hole 1234, effecting a seal. If the lowered pressure is on the cold side, the valve 1200 will allow cooled off water from the hot water line 1020 to bypass into the cold water line until warm water arrives at the valve 1200, at which time the shuttle 1218 will shift and cut off the bypass.

EXAMPLE 3

Dual Handle, Single Spout Faucets

Although two handle, single spout faucets might have been expected to fade out of demand in favor of the more convenient single handle faucets, the two handle faucets (shown as 1010 in FIG. 31) seem more amenable to elegant cosmetic design than their single handle cousins, which have an inherently more utilitarian look. Apparently for this reason, most double handle faucets on display are for lavatory use. The same requirements for ease of maintenance by allowing access to the bypass valve 1036 from the top apply to this faucet type. It is convenient that the prior art faucet design utilizing a rotating threaded stem with a faucet washer and a hard seat has become a thing of the past, as the newer designs with replaceable cartridges are more adaptable to this modification.

Figure 46:
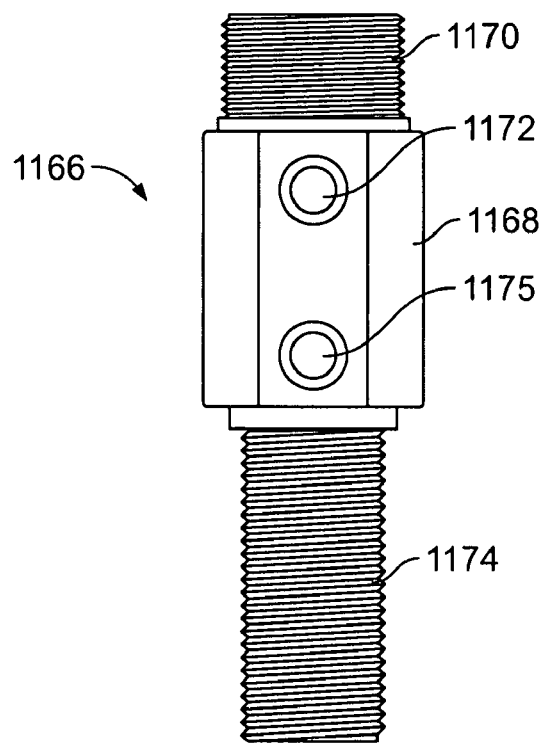
FIG. 46 is a side view of an exemplary valve member used with dual handle, single spout faucets.

Most modern two handle faucets utilize a cartridge design in a pair of valve member 1166, shown in FIG. 46, wherein the valving function is accomplished within the cartridge that is positioned inside the housing section 1168 of valve member 1166. This allows complete re-conditioning of the faucet by simply replacing a single assembly on each side. These cartridges are accessible in the housing section 1168 from the top by removing the faucet handles and bonnets that attach to the upper threaded portion 1170. The cartridge assembly then simply lifts out, exposing its open cavity inside housing section 1168, with a side port 1172 leading to confluence with the like port from the other side of the faucet, which confluence flows on through the single spout of such faucets. Below the mentioned cavity for the faucet valving cartridge there is an open one-half inch (typically) threaded pipe 1174 for the hot or cold conduit into the faucet. This externally threaded pipe is substantially longer than needed for valving or connection purposes to allow for overly thick lavatory counters and to get the lower end of these threaded pipes far enough down behind the sink for reasonable access by the installer. This "extra" space on the hot water side is a top accessible, hydraulically appropriate place to locate a thermal valve cartridge similar to the type described for inclusion in or adjacent to the hot water conduit in the central housing 1062 of a single handle faucet. Side port 1175 is added to housing section 1168 and a line is run to a like port on the other, opposing faucet. Addition of a thermal bypass valve 1036 requires additional machining and the addition of a bypass line connecting the hot and cold lines. An existing two handle single spout valve thus could not be retrofitted, but modifications to the design are relatively minor and the existing replaceable valve cartridge would fit the new design.

The major difference of concern in this matter between single handle single spout and two handle single spout faucet designs is that in the single handle central block, it is possible to create the connecting passages (bypass) by simply drilling cross holes, as discussed above. With two separate hot and cold faucet valves located four inches apart, some kind of cross conduit for the bypass must be added. There seem to be two approaches to directing the water from the hot and cold faucets to a confluence and out to the single spout. American-Standard, Oasis, La Bella and some Price-Pfisters use a large brass casting that includes the spout, both hot and cold faucet housings, and a cored cast passage connecting all of this together. Adding a thermal bypass valve 1036 to such a two handle faucet set would require the addition of an additional cored cast passage to accomplish the bypass function between hot and cold lines. Delta, Moen, Kohler, and some Price Pfister two handle single spout valves use brazed-in copper tube manifolds instead of cored cast passages. These would require the addition of a tubular cross passage brazed in. The Delta two handle single spout valve has a somewhat different valving action which makes it much more difficult to fit in a thermal valve cartridge. This new passage (cored or brazed tubular) needs to connect to the vertical hot and cold "pipe" members below their existing side port to the spout. These faucet sets generally do not have sufficient vertical space under the polished bezel to accommodate the extra passage. This will require addition of some vertical length to the skirt of the valve bezel.

Figure 47:
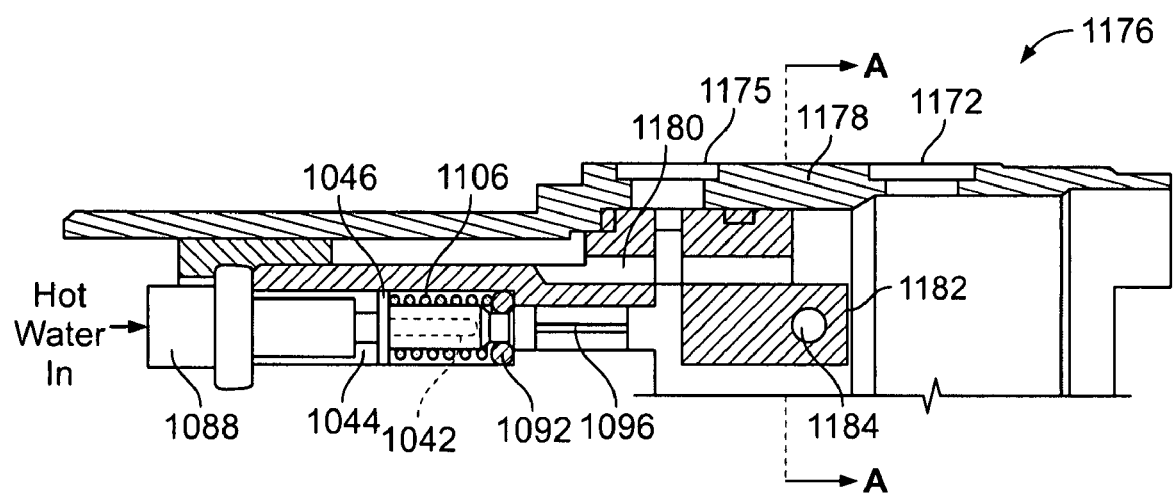
FIG. 47 is side cross-sectional view of the upper half of a cartridge placed in the valve member of FIG. 46.

FIG. 47 shows a modified "hot" side of a Kohler two handle faucet 1176, with the housing shown as 1178. The housing 1178 is identical to the standard existing Kohler housing 1178 above (to the right of) line M. The housing 1178 must be bored out in several steps to accommodate the new thermal valve cartridge 1180, which can be a molded plastic cartridge identical in function to that already described for the center block of the Delta single handle valve. It varies from the previously described cartridge in the configuration of the passage to bring the hot water past the thermal valve 1036 to the faucet, and the configuration of the snap fit for the thermal actuator 1088. It also has an upper extension 1182 with a through hole 1184. The extension 1182 fits into a recess in the bottom of the existing Kohler faucet cartridge and the through hole 1184 is for engagement of a hook to allow removal of the thermal valve cartridge 1180 for replacement of the thermal bypass valve 1036.

The operation of the bypass valve 1036 inside of faucet 1010 is summarized on the chart shown as FIG. 22 which indicates the results of the twenty combinations of conditions (pump on/pump off; hot water line hot/hot water line cooled off; hot faucet on, or off, or between; cold faucet on or off, or between) that are applicable to the operation of valve 1036. The operating modes IVB, IVC, IVD, IIIB, & IIID are summarized detailed in the immediately following text. The operation of the remaining fifteen modes are relatively more obvious, and may be understood from the abbreviated indications in the outline summarizing FIG. 22. Starting with the set "off" hours (normal sleeping time, and daytime when no one is usually at home) pump 1026 will not be powered. Everything will be just as if there were no pump 1026 and no bypass valve 1036 installed in faucet 1010 (i.e., both the cold and hot water lines will be at the same city water pressure). The hot water line 1020 and bypass valve 1036 will have cooled off during the long interim since the last use of hot water. The reduced temperature in the valve results in "retraction" of rod member 1040 of the thermally sensitive actuator 1088. The force of bias spring 1106 pushing against flange 1046 on rod member 1040 will push it back away from valve seat 1090, opening valve 1036 for recirculation. Although the thermal actuating element 1088 is open, with pump 1026 not running, no circulation flow results, as the hot 1020 and cold 1016 water piping systems are at the same pressure. This is the mode indicated as IVB in the outline on FIG. 22. If the cold water valve at faucet 1010 is opened with the thermal element 1088 open as in mode IVB above, pressure in the line 1016 to the cold water side of faucet 1010 will drop below the pressure in the hot water line 1020. This differential pressure will siphon tepid water away from the hot side to the cold side, which is the mode indicated as IVD in the outline on FIG. 22. The recirculation of the "hot" water will end when the tepid water is exhausted from the hot water line 1020 and the rising temperature of the incoming "hot" water causes the thermal element 1088 to close.

If the hot water valve is turned on with the thermal element 1088 open as in mode IVB above, pressure in the line 1020 to the hot water side of faucet 1010 will drop below the pressure in the cold water line 1016. This differential pressure, higher on the cold side, will load check valve 1096 in the "closed" direction allowing no cross flow. This is mode IVC in the outline on FIG. 22. In this mode, with the hot water line 1020 cooled and the pump off, a good deal of cooled-off water will have to be run oust as if valve 1036 were not installed), to get hot water, at which time the thermal element 1088 will close without effect, and without notice by the user. With the thermal element 1088 open and the hot water line 1020 cooled-off as in mode IVB above, at the preset time of day (or when the cyclic timer trips the next "on" cycle) the pump 1026 turns on, pressurizing the water in the hot side of faucet 1010. Pump pressure on the hot side of faucet 1010 results in flow through the open thermal element 1088, thereby pressurizing and deflecting the check valve 1096 poppet away from its seat to an open position. Cooled-off water at the boosted pressure will thus circulate from the hot line 1020 through the thermal element 1088 and check valve 1096 to the lower pressure cold line 1016 and back to water heater 1018. This is the primary "working mode" of the bypass valve 1036 and is the mode indicated as IIIB in the outline on FIG. 22. If the cold water valve is turned on during the conditions indicated in mode IIIB above (i.e., pump 1026 operating, hot line 1020 cooled off, the hot valve at faucet 1010 off) and while the desired recirculation is occurring, mode IIID will occur. A pressure drop in the cold water line 1016 due to cold water flow creates a pressure differential across valve 1036 in addition to the differential created by pump 1026. This allows tepid water to more rapidly bypass to the cold water inlet 1022 at faucet 1010. When the tepid water is exhausted from the hot water line 1020, thermal element 1088 will close, ending recirculation.

Figure 48:
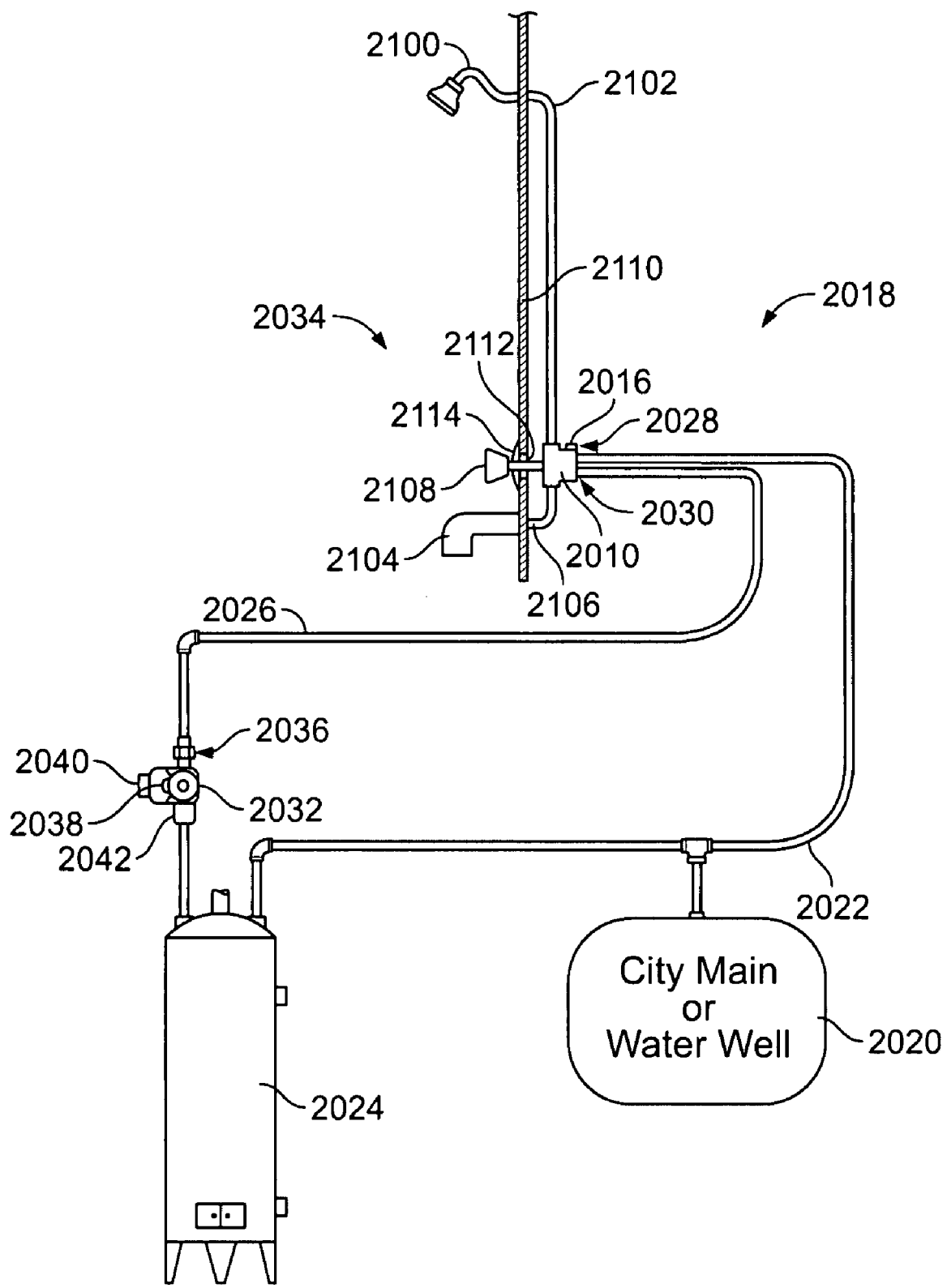
FIG. 48 shows another exemplary water distribution system utilizing a water control valve having a bypass valve in a shower/tub assembly.

FIG. 48 illustrates another exemplary water distribution system 2018 utilizing a water control valve, which is illustrated in FIG. 48 as a tub/shower valve 2010, separate service valves 2012 and a combined service valve 2014. However, other water control valves may be adaptable to a bypass valve 2016, including a thermostatically controlled bypass valve, as described herein (i.e., valves used on washing machines, dishwashers and other fixtures). The bypass valve 2016 that is attached to or included with the water control valves can be one of many different types of available bypass valves, including thermostatically controlled bypass valves, electric solenoid controlled bypass valves, needle-type bypass valves as described in the above-referenced Blumenauer patent or mechanical push button bypass valves such as sold by Laing and others. The water control valves are adaptable for use with the various types of bypass valves by being attached, adjacent or included with the water control valve, as described in more detail below.

A typical water distribution system 2018 utilizing a tub/shower water control valve 2010. The water distribution system 2018 typically includes a supply of cold water 2020, such as from a city main or water well, that supplies cold water directly to water control valve 2010 through cold water line 2022 and water to hot water heater 2024 so that it may heat the water and supply hot water to water control valve 2010 through hot water line 2026. Cold water line 2022 connects to water control valve 2010 at cold water inlet 2028 and hot water line 2026 connects to water control valve 2010 at hot water inlet 2030, as explained in more detail below. In an exemplary embodiment, the system 2018 utilizes a small circulating pump 2032 of the type used in residential hot water space heating. A very low flow and low head pump 2032 is desirable because a larger (i.e., higher head/higher flow) pump mounted at the typical domestic water heater 2024 tends to be noisy. This annoying noise is often transmitted by the water pipes throughout the house. In addition, if the shower system 2034 (as an example) is already in use when pump 2032 turns on, whether the first start or a later cyclic turn-on, the sudden pressure boost in the hot water line 2026 from a larger pump can result in an uncomfortable and possibly near-scalding temperature rise in the water at the shower head or other fixture in use. The smaller boost of a "small" pump (i.e., one with a very steep flow-head curve) will result in only a very small and less noticeable increase in shower temperature.

In the preferred embodiment, the single, small pump 2032 needs to provide only a flow of approximately 0.3 gpm at 1.0 psi pressure. In accordance with pump affinity laws, such a "small" pump requires a very small impeller or low shaft speed. The inventors have found that use of a very small impeller or low shaft speed also precludes formation of an air bubble in the eye of the impeller, which bubble may be a major cause of noise. Such a small steep curve pump may, however, constitute a significant pressure drop in the hot water line 2026 when several fixture taps are opened simultaneously (such as a bathtub and the kitchen sink). To avoid reduced flow in those installations having a relatively low volume pump, a check valve 2036 can be plumbed in parallel with pump 2032 or incorporated within the pump housing, to pass a flow rate exceeding the pump's capacity around pump 2032. When pump 2032 is powered and flow demand is low, check valve 2036 prevents the boosted flow from re-circulating back to its own inlet. With check valve 2036 plumbed around pump 2032, it is advantageous to place an orifice 2038 in the pump discharge to provide a simple manner to achieve the desired very steep flow-head curve from available stock pump designs. A single pump 2032 located at or near water heater 2024 in its discharge piping will boost the pressure in the hot water pipes somewhat above that in the cold water pipes (i.e., perhaps one to three feet of boost). With this arrangement only one pump 2032 per plumbing system (i.e., per water heater 2024) is required with any reasonable number, such as the typical number used in residences, of remote water control valves (i.e., tub/shower valve 2010 or service valves 2012 and 2014), equipped with bypass valves. This is in contrast to those systems that require multiple pumps 2032, such as a pump 2032 at each fixture where bypassing is desired.

If desired, pump 2032 can operate twenty-four hours a day, with most of the time in the no flow mode. However, this is unnecessary and wasteful of electricity. Alternatively, and preferably, pump 2032 can have a timer 2040 to turn pump 2032 on daily at one or more times during the day just before those times when hot water is usually needed the most (for instance for morning showers, evening cooking, etc.) and be set to operate continuously for the period during which hot water is usually desired. This still could be unnecessary and wasteful of electricity. Another alternative is to have the timer 2040 cycle pump 2032 on and off regularly during the period when hot water is in most demand. The "on" cycles should be of sufficient duration to bring hot water to all remote fixtures that have water control valves (such as valves 2010, 2012 and 2014) equipped with a bypass valve, and the "off" period would be set to approximate the usual time it takes the water in the lines to cool-down to minimum acceptable temperature. Yet another alternative is to equip pump 2032 with a normally closed flow switch 2042 sized to detect significant flows only (i.e., those flows that are much larger than the bypass flows), such as water flow during use of shower system 2034. For safety purposes, the use of such flow switch 2042 is basically required if a cyclic timer 2040 is used. The switch 2042 can be wired in series with the motor in pump 2032. If switch 2042 indicates an existing flow at the moment timer 2040 calls for pump 2032 to be activated, open flow switch 2042 will prevent the motor from starting, thereby avoiding a sudden increase in water temperature at the fixture (i.e., particularly if it is shower system 2034) being utilized. The use of switch 2042 accomplishes several useful objectives, including reducing electrical power usage and extending pump 2032 life if hot water is already flowing and there is no need for pump 2032 to operate, avoiding a sudden temperature rise and the likelihood of scalding that could result from the pump boost if water is being drawn from a "mixing" valve (such as tub/shower valve 2010 shown in FIG. 48 or a single handle faucet) and allowing use of a "large" pump 2032 (now that the danger of scalding is eliminated) with its desirable low pressure drop at high flows, thereby eliminating the need for the parallel check valve 2036 required with a "small" pump 2032.

By using a time-of-day control timer 2040, pump 2032 operates to maintain "instant hot water" only during periods of the day when it is commonly desired. During the off-cycle times, the plumbing system 2018 operates just as if the fixture having bypass valve 2016 and pump 2032 were not in place. This saves electrical power usage from operation of pump 2032 and, more importantly, avoids the periodic introduction of hot water into relatively un-insulated pipes during the off-hours, thereby saving the cost of repeatedly reheating this water. The time-of-day control also avoids considerable wear and tear on pump 2032 and bypass valve 2016. Considerable additional benefits are gained by using a cyclic timer 2040, with or without the time-of-day control. In addition to saving more electricity, if a leaky bypass valve 2016 (i.e., leaks hot water to cold water line 2022) or one not having toggle action is used, there will be no circulating leakage while the pump 2032 is cycled off, even if bypass valve 2016 fails to shut off completely. Therefore, a simple (i.e., not necessarily leak tight) bypass valve 2016 may suffice in less demanding applications. Reducing leakage to intermittent leakage results in reduced warming of the water in cold water line 2022 and less reheating of "leaking" re-circulated water.

Figure 49:
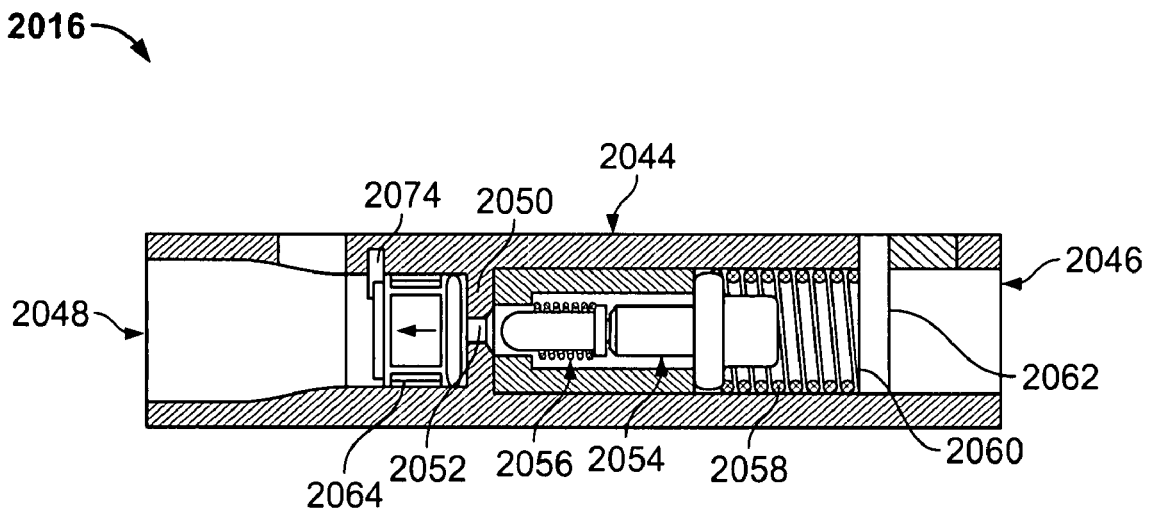
FIG. 49 is a cross-sectional side view of an exemplary bypass valve for use with the water control valves.

As described above, water control valves 2010, 2012 and 2014 can utilize various types of bypass valves 2016 to accomplish the objective of bypassing cold or tepid water around the fixture associated with water control valves 2010, 2012 and 2014 which are adaptable for use with bypass valve 2016. The preferred bypass valve 2016 is the thermostatically controlled type, an example of which is shown in FIG. 49 and described below, due to its ability to automatically sense and respond to the temperature of the water in hot water line 2026 at water control valve 2010, 2012 or 2014. Unlike the electrical solenoid type of bypass valve or the manually operated type of bypass valve, a thermostatically controlled bypass valve does not require any external operational input to activate in order to bypass cold or tepid water in hot water line 2026 so as to maintain hot water at hot water inlet 2030 of water control valves 2010, 2012 or 2014.

Figure 50:
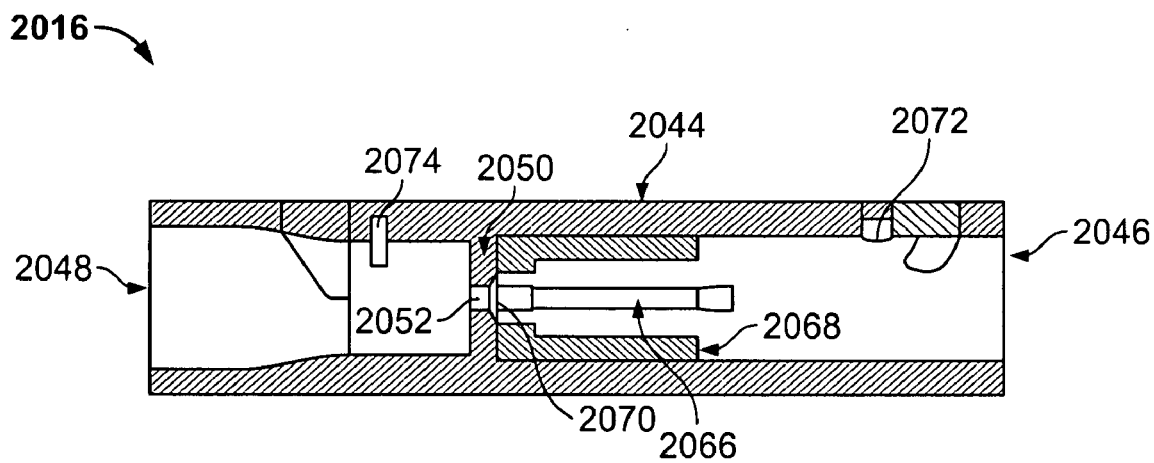
FIG. 50 is a cross-sectional side view of the valve body of the bypass valve shown in FIG. 49.
Figure 51:
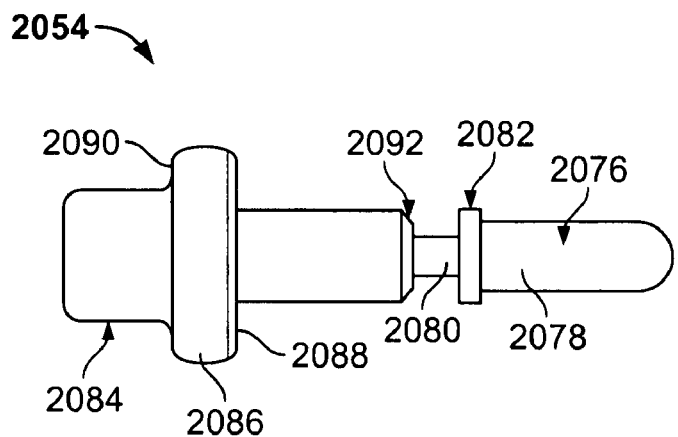
FIG. 51 is a side view of an exemplary thermally sensitive actuating element, shown in its unmodified condition, for use in the thermostatically controlled bypass valve shown in FIG. 49.

As best shown in FIGS. 49 through 51, the preferred bypass valve 2016 is thermostatically controlled bypass valve 2016 configured for use with water control valves 2010, 2012 and 2014 including a generally tubular valve body 2044 having bypass valve inlet 2046, bypass valve outlet 2048 and a separating wall 2050 disposed therebetween. As described in more detail below, bypass inlet 2046 connects to hot water inlet 2030 and bypass outlet 2048 connects to cold water inlet 2028 of water control valves 2010, 2012 and 2014, either directly or indirectly. Bypass valve passageway 2052 in separating wall 2050 interconnects inlet 2046 and outlet 2048 to allow fluid to flow therethrough when bypass valve 2016 is bypassing cold or tepid water. As best shown in FIG. 49 and discussed in more detail below, valve body 2044 houses a thermally sensitive actuating element 2054, bias spring 2056, an over-travel spring 2058, retaining mechanism 2062 (such as a retaining ring, clip, pin or other like device) and check valve 2064. Valve body 2044 can most economically and effectively be manufactured out of a molded plastic material, such as Ryton®, a polyphenylene sulphide resin available from Phillips Chemical, or a variety of composites. In general, molded plastic materials are preferred due to their relatively high strength and chemical/corrosion resistant characteristics while providing the ability to manufacture the valve body 2044 utilizing injection molding processes with the design based on the configuration described herein without the need for expensive casting or machining. Alternatively, valve body 2044 can be manufactured from various plastics, reinforced plastics or metals that are suitable for "soft" plumbing loads and resistant to hot chlorinated water under pressure. As shown in FIG. 50, inlet 2046 of valve body 2044 can be molded with a set of axially oriented fin guides 2066 having ends that form an internal shoulder 2068 inside valve body 2044 for fixedly receiving and positioning one end of thermal actuating element 2054 and bias spring 2056, and retainer interruption 2072 for receiving retaining mechanism 2062. Preferably, retaining mechanism 2062 is a retaining ring and retainer interruption 2072 is configured such that when retaining mechanism 2062 is inserted into valve body 2044 it will be engagedly received by retainer interruption 2072. Bypass valve outlet 2048 can be molded with retaining slot 2074 for engagement with the snap-in check valve 2064. In the preferred embodiment, valve body 2044 is designed so the components can fit through inlet 2046 and outlet 2048, which will typically be one-half inch diameter. In this manner, a one piece bypass valve 2016 results with no intermediate or additional joints required for installation.

For ease of installation of the bypass valve 2016 by the user, both inlet 2046 and outlet 2048 on valve body 2044 can have one-half inch straight pipe threads for use with the swivel nuts that are commonly found on standard connection hoses that fit the typical residential fixture. The swivel nuts on the connection hoses seal with hose washers against the ends of inlet 2046 and outlet 2048, as opposed to common pipe fittings that seal at the tapered threads. Inlet 2046 and outlet 2048 can be marked "hot" and "cold", respectively, to provide visual indicators for the do-it-yourself installer so as to avoid undue confusion. Alternatively, as explained below, bypass valve 2016 can be made with integral connections at inlet 2046 and outlet 2048 for connection to water control valve 2010, 2012 or 2014, thereby avoiding the need for extra connections.

An example of a thermally sensitive actuating element 2054 for use with the preferred thermostatically controlled bypass valve 2016 is shown in FIG. 51. Actuating element 2054 is preferably of the wax filled cartridge type, also referred to as wax motors, having an integral poppet rod member 2076 comprising poppet 2078 attached to piston 2080 with an intermediate flange 2082 thereon. The end of poppet 2078 is configured to seat directly against valve seat 2070 or move a shuttle (i.e., spool or sleeve valves) so as to close passage 2052. These thermostatic control actuating elements 2054 are well known in the art and are commercially available from several suppliers, such as Caltherm of Bloomfield Hills, Mich. The body 2084 of actuating element 2054 has a section 2086 of increased diameter, having a first side 2088 and second side 2090, to seat against shoulder 2068 or like element in valve body 2044. Piston 2080 of rod member 2076 interconnects poppet 2078 with actuator body 2084.

Actuating element 2054 operates in a conventional and well known manner. Briefly, actuating element 2054 comprises a blend of waxes or a mixture of wax(es) and metal powder (such as copper powder) enclosed in actuator body 2084 by means of a membrane made of elastomer or the like. Upon heating the wax or wax with copper powder mixture expands, thereby pushing piston 2080 and poppet 2078 of rod member 2076 in an outward direction. Upon cooling, the wax or wax/copper powder mixture contracts and rod member 2076 is pushed inward by bias spring 2056 until flange 2082 contacts actuator body 2054 at actuator seat 2092. Although other types of thermal actuators, such as bimetallic springs and memory alloys (i.e., Nitinol and the like) can be utilized, the wax filled cartridge type is preferred because the wax can be formulated to change from the solid to the liquid state at a particular desired temperature. The rate of expansion with respect to temperature at this change of state is many times higher, resulting in almost snap action of the wax actuating element 2054. The temperature set point is equal to the preset value, such as 97 degrees Fahrenheit, desired for the hot water. This is a "sudden" large physical motion over a small temperature change. As stated above, this movement is reacted by bias spring 2056 that returns rod member 2076 as the temperature falls.

Because bypass valve 2016 has little or no independent "toggle action," after a few cycles of opening and closing, bypass valve 2016 tends to reach an equilibrium with the plumbing system, whereby bypass valve 2016 stays slightly cracked open, passing just enough hot water to maintain the temperature constantly at its setting. In particular plumbing systems and at certain ambient conditions, this flow is just under that required to maintain a spring loaded check valve cracked continuously open (i.e., check valve 2036). In such a situation, check valve 2036 chatters with an annoying buzzing sound. To avoid this occurrence, the spring may be removed from check valve 2036, leaving the check valve poppet free floating. In the event that the hot water is turned full on at a time when bypass valve 2016 is open, thereby lowering the pressure in hot water line 2026 and inducing flow from cold water line 2022 through the open bypass valve 2016 to the hot side, the free floating poppet will quickly close. There is no necessity for a spring to keep check valve 2036 closed prior to the reversal in pressures.

Although not entirely demonstrated in early tests, it is believed that beneficial "toggle" action can be achieved with the thermostatically controlled bypass valve 2016 discussed above. If the motion of actuating element 2054 is made to lag behind the temperature change of the water surrounding it by placing suitable insulation around actuating element 2054 or by partially isolating it from the water, then instead of slowly closing only to reach equilibrium at a low flow without reaching shutoff, the water temperature will rise above the extending temperature of the insulated actuating element 2054 as bypass valve 2016 approaches shutoff, and piston 2080 will then continue to extend as the internal temperature of actuating element 2054 catches up to its higher surrounding temperature, closing bypass valve 2016 completely. It is also believed that an insulated actuating element 2054 will be slow opening, its motion lagging behind the temperature of the surrounding cooling-off water from which it is insulated. When actuating element 2054 finally begins to open the bypass valve 2016 and allow flow, the resulting rising temperature of the surrounding water will again, due to the insulation, not immediately affect it, allowing bypass valve 2016 to stay open longer for a complete cycle of temperature rise. Such an "insulated" effect may also be accomplished by use of a wax mix that is inherently slower, such as one with less powdered copper or other thermally conductive filler. An actuating element 2054 to be installed with insulation can be manufactured with a somewhat lower set point temperature to make up for the lag, allowing whatever bypass valve 2016 closing temperature desired.

An additional benefit of utilizing pump 2032 in system 2018 is that shut-off of a toggle action valve upon attainment of the desired temperature is enhanced by the differential pressure an operating pump 2032 provides. If pump 2032 continues to run as the water at water control valve 2010, 2012 or 2014 cools down, the pump-produced differential pressure works against re-opening a poppet type bypass valve 2016. If pump 2032 operates cyclically, powered only a little longer than necessary to get hot water to water control valve 2010, 2012 or 2014, it will be "off" before the water at bypass valve 2016 cools down. When the minimum temperature is reached, actuating element 2054 will retract, allowing bias spring 2056 to open bypass valve 2016 without having to fight a pump-produced differential pressure. Bypass flow will begin with the next pump "on" cycle. An additional benefit to the use of either a time-of-day or cyclic timer 2040 is that it improves the operating life of actuating element 2054. Because use of either timer 2040 causes cyclic temperature changes in bypass valve 2016 (as opposed to maintaining an equilibrium setting wherein temperature is constant and actuating element 2054 barely moves), there is frequent, substantial motion of the piston 2080 in actuating element 2054. This exercising of actuating element 2054 tends to prevent the build-up of hard water deposits and corrosion on the cylindrical surface of actuator piston 2080 and face of poppet 2078, which deposits could render bypass valve 2016 inoperable.

Also inside bypass valve 2016 can be an over-travel spring 2058 disposed between the second side 2090 of the actuator body 2084 and a stop, such as retaining mechanism 2062 shown in FIG. 49, located inside bypass valve 2016 to prevent damage to a fully restrained actuating element 2054 if it were heated above the maximum operating temperature of bypass valve 2016 and to hold actuating element 2054 in place during operation without concern for normal tolerance. Use of over-travel spring 2058, which is not necessary for spool-type valves, allows movement of actuator body 2084 away from the seated poppet 2078 in the event that temperature rises substantially after poppet 2078 contacts valve seat 2070. Without this relief, the expanding wax could distort its copper can, destroying the calibrated set point. Over-travel spring 2058 also holds bias spring 2056, rod member 2076 and actuator body 2084 in place without the need to adjust for the stack-up of axial tolerances. Alternatively, actuating element 2054 can be fixedly placed inside bypass valve 2016 by various mechanisms known in the art, including adhesives and the like. Over-travel spring 2058, if used, can be held in place by various internal configurations commonly known in the art, such as a molded seat (not shown).

Although there are a great many configurations and brands of water control valves 2010, 2012 and 2014, it is believed that there are several generic forms of such valves, such as those described below. The water control valves adaptable for use with bypass valves 2016, including but not limited to thermostatically controlled bypass valves, include a combination shower/tub valve 2010, a separate service control valve 2012 and a combination service control valve 2014. As such, these generic forms of water control valves 2010, 2012 and 2014 are utilized below to illustrate several different designs that are adaptable for the use of bypass valve 2016 therewith. The following examples are only representative of the types of water control valves which bypass valve 2016 can be used.

As is well known in the art, the individual manufacturers have various models of water control valves to incorporate desired features and preferences. The examples are for illustrative purposes only and are not intended to restrict the valves to particular uses, sizes or materials used in the examples.

EXAMPLE 4

Shower/Tub Control Valve with Attached Bypass Valve

As is well known, many homes have a combination shower and tub assembly whereby the same water control valve 2010 is used to control the flow and temperature to the shower and the tub. A selector valve (not shown) is used to select the flow between the shower and the tub. An example shower/tub system is shown as 2034 in FIG. 48. A similar water control valve to that shown as 2010, is used for systems comprising only a shower or a tub, with the exception that such valve only has one discharge port (connected to either the shower or the tub). In the shower/tub system 2034, water distribution valve 2010 with associated bypass valve assembly 2098, having bypass valve 2016 as described below, distributes water to the shower head assembly 2100 through shower line 2102 and to tub faucet 2104 through tub line 2106, as shown in FIG. 48. A flow control valve 2108 is used to control the flow and temperature of water to the shower head assembly 2100 or tub faucet 2104. Although a single flow control valve 2108 is shown in FIG. 48, it is understood that some shower, tub and shower/tub flow control valves utilize separate valves for the hot and cold water control (i.e., similar in general configuration to the service control valves discussed below). One of the primary distinguishing characteristics of virtually all shower/tub water control valves, such as 2010, and single shower or tub water control valves is that they are generally positioned at least partially behind support wall 2110 that forms part of the shower and/or tub enclosure and which is used to support shower head assembly 2100 and tub faucet 2104. Because access to water control valve 2010 is important for maintenance, repair or replacement of water control valve 2010, even if positioned entirely behind support wall 2110, water control valve 2010 is generally placed behind an opening 2112 in support wall 2110 specifically configured for accessing water control valve 2010. Typically a removable plate 2114, commonly referred to as an escutcheon plate, is used to cover opening 2112. To access water control valve 2010 and bypass valve assembly 2098, plate 2114 is removed and valve 2010 is maintained, repaired or removed through opening 2112 in support wall 2110 and then plate 2114 is reinstalled.

Figure 52:
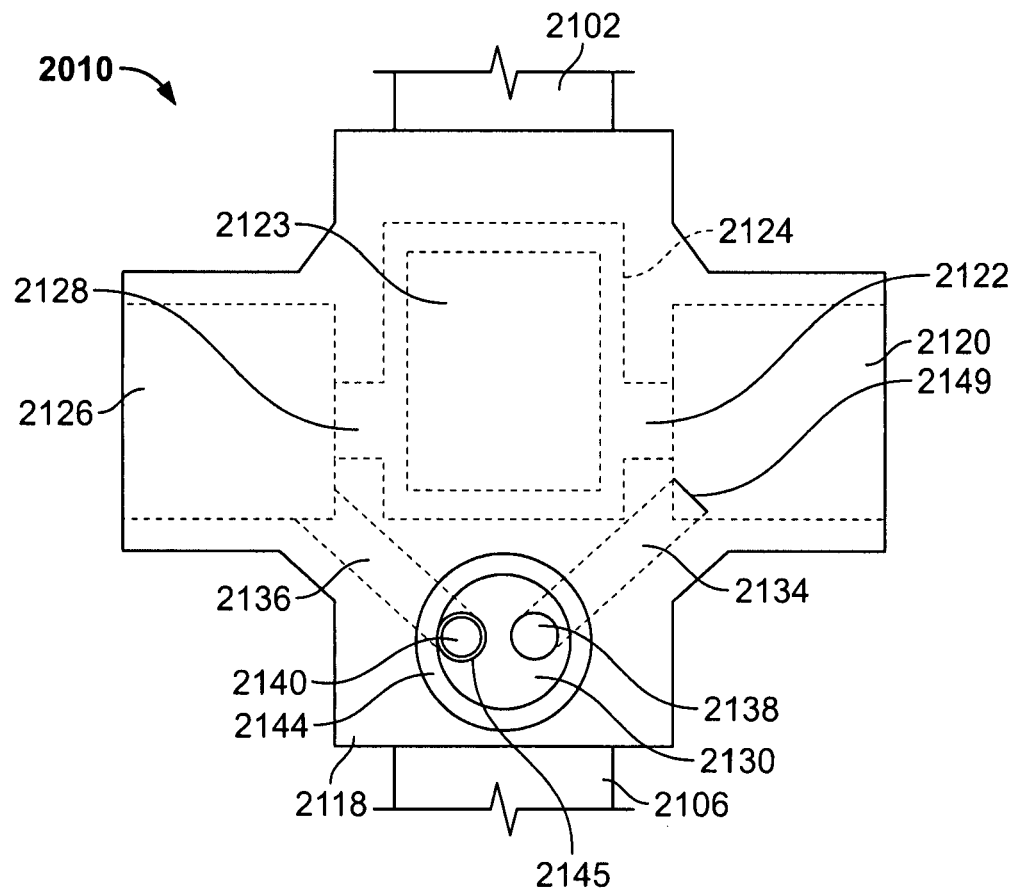
FIG. 52 is a front view of the shower/tub water control valve without the bypass valve mounted thereon as seen through the opening in the support wall for a shower system.
Figure 53:
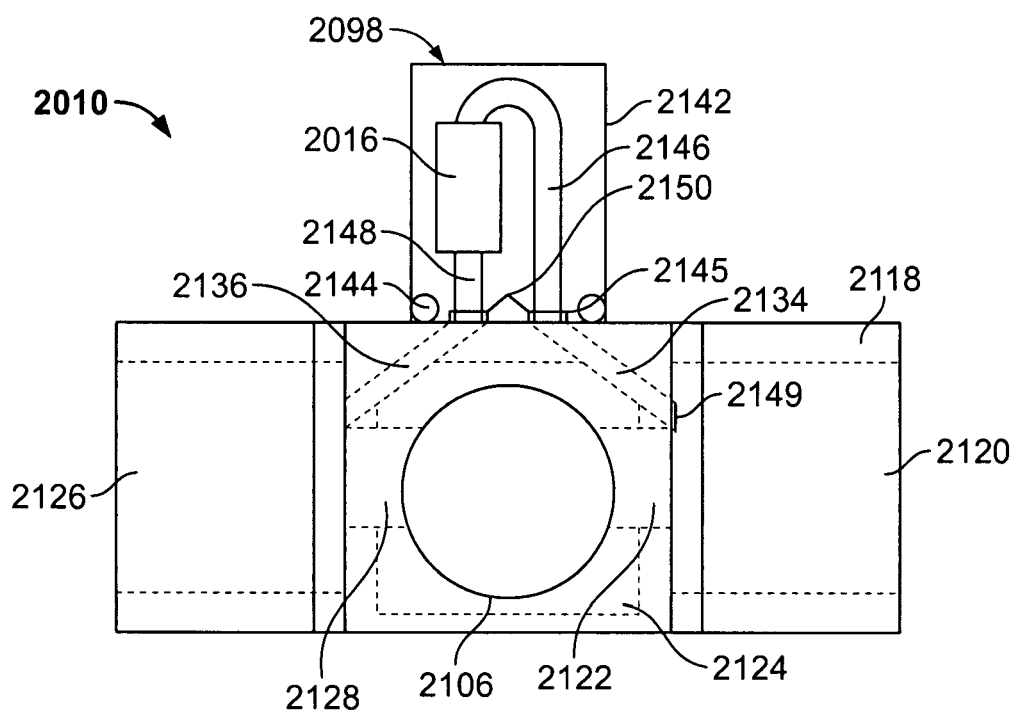
FIG. 53 is a side view of the water control valve of FIG. 52 showing the interior components of a bypass valve mounted thereon.

Shower/tub water control valve 2010, shown in more detail in FIGS. 52 and 53, is used to illustrate various configurations for providing valve 2010 that is adaptable for use with bypass valve 2016. The typical water control valve 2010 consists of a valve manifold 2118 having a hot water inlet 2120 that connects to hot water line 2026 to allow hot water to flow through control valve hot passageway 2122 to the inner valve workings, which generally comprise a removable valve cartridge 2123, inside cartridge cavity or valve interface 2124 of valve manifold 2118. The typical valve interface 2124 is configured as a cylindrical cavity sized to frictionally receive valve cartridge 2123 therein and to have ports for the inflow of hot and cold water and the discharge of mixed water to shower line 2102 and/or tub line 2106. Cold water inlet 2126 of valve 2010 connects to cold water line 2022 to allow cold water to flow through control valve cold passageway 2128 to valve cartridge 2123 inside valve interface 2124. Inside valve interface 2124, valve cartridge 2123 selectively distributes hot and cold water to shower head assembly 2100 or tub faucet 2104 through shower line 2102 or tub line 2106, respectively. Water control valve 2010 is modified to be adaptable for use with bypass valve 2016 by adding a single external port 2130 on valve manifold 2118, an internal hot water bypass passageway 2134, an internal cold water bypass passageway 2136 and separate hot water bypass port 2138 and cold water bypass port 2140. In the preferred embodiment, water control valve 2010 has valve manifold 2118 manufactured to include external port 2130, internal bypass passageways 2134 and 2136 and bypass ports 2138 and 2140. Although an existing water control valve 2010 can be modified to include these components, it is believed to be much easier and cost effective to include them in the initial manufacturing process than to add them to an existing valve 2010. Although the bypass valve assembly 2098 is shown affixed to the top of water control valve 2010 in FIG. 48 and in front of water control valve 2010 in FIG. 53, bypass valve assembly 2098 can be affixed to water control valve 2010 at any place on valve manifold 2118 which is convenient, practical or cost effective. An important aspect of attachment of bypass valve assembly 2098 for use with water control valve 2010 is the ability to access bypass valve assembly 2098 through opening 2112 in support wall 2110 for purposes of maintenance, repair or replacement of bypass valve 2016.

In the preferred embodiment of water control valve 2010 having external port 2130, as shown in FIGS. 52 and 53, bypass valve assembly 2098 comprises a bypass housing 2142 enclosing bypass valve 2016 and water control valve 2010 has a sealing element, such as O-ring 2144, to seal the connection between bypass housing 2142 and valve manifold 2118 at external port 2130. To prevent cross-flow between bypass ports 2138 and 2140, and therefore bypassing of bypass valve 2016, at least one of these ports should have a sealing member, such as an O-ring or other sealing member (not shown). Bypass valve input line 2146 connects hot water bypass passageway 2134 with bypass valve inlet 2046 and bypass valve output line 2148 connects bypass valve outlet 2048 to cold water bypass passageway 2136. Connecting elements 2150 of the type known by those in the industry, such as clips, unions, bolts, threaded connections and the like, are used to connect bypass valve input line 2146 with hot water bypass passageway 2134 and bypass valve output line 2148 with cold water bypass passageway 2136. Also in the preferred embodiment, control valve 2010 includes screen 2149 positioned at or near the entrance to hot water bypass passageway 2134. Screen 2149 should be installed in a manner that allows it to be self-cleaning. As is known in the art, this can be accomplished by placing screen 2149 in water control valve 2010 such that the main flow of hot water from hot water inlet 2120 will flow across the face of screen 2149 when "hot" water is flowing through water control valve 2010 to discharge through shower line 2102 or tub line 2106. When water is being bypassed, screen 2149 will filter out any debris that could otherwise plug or damage bypass valve 2016. The materials collected on screen 2149 will then be washed away through water control valve 2010 when hot water flows through water control valve 2010 to shower line 2102 or tub line 2106 (i.e., the discharge from water control valve 2010).

When installed with water control valve 2010, as shown in FIG. 53, bypass valve assembly 2098 is sealably and rigidly connected to and supported by valve manifold 2118 in shower system 2034. When the water in hot water line 2026 is no longer at the desired temperature (i.e., the temperature lowers to be tepid or cool), bypass valve 2016 opens to bypass the non-hot water around water control valve 2010 by diverting water flow from hot water line 2026 through hot water bypass passageway 2134 and hot water bypass port 2138 into bypass valve input line 2146 through bypass valve 2016 to bypass output line 2148, cold water bypass port 2140, cold water bypass passageway 2136 and then to cold water line 2022. In the preferred embodiment, pump 2032 provides the pressure in hot water line 2026 for the necessary bypassing. The bypassing of this cool or cold water in hot water line 2026 will continue until the temperature in hot water line 2026 is at the desired temperature. At that time, bypass valve 2016 will close and hot water (as desired) will be at the water control valve 2010 ready for selection by flow control valve 2108 and distribution to shower head assembly 2100 or tub faucet 2104.

As discussed above, bypass valve 2016 inside of bypass valve assembly 2098 can be of the thermostatically controlled, electric solenoid, manually operated or other type of bypass valve. The preferred embodiment utilizes a thermostatically controlled bypass valve, such as that described above with the wax motor as the thermal actuating element 54, due to its ability to automatically bypass cold or tepid water until the temperature of the water in hot water line 2026 at control valve 2010 is at the desired temperature. Water control valve 2010 can be provided with bypass assembly 2098 already connected to valve manifold 2118 or water control valve 2010 can be sold as an optional unit having a removable cap element (not shown) closing external port 2130 to seal against sealing element 2144 and sealing member 2145 for when bypass assembly 2098 is not in use with water control valve 2010. In yet another configuration, bypass assembly 2098 is fixedly attached to or manufactured with valve manifold 2118 such that water control valve 2010 and bypass assembly 2098 are a single unit. This configuration would eliminate the need for sealing element 2144 and sealing member 2145, such as the O-rings shown in FIGS. 52 and 53. While the embodiment of the single bypass assembly 2098 and water control valve 2010 as a single unit has the advantage of eliminating a seal and, as a result, a potential leak source, utilizing bypass assembly 2098 as a separate unit has the advantage of allowing the same water control valve 2010 to be sold with or without bypass valve 2016 and allowing the user to maintain, repair or replace bypass valve 2016 separate from water control valve 2010. As stated above, whether the bypass assembly 2098 is sold integral with water control valve 2010 or as single unit requiring sealing element 2144, it should be configured to be accessible to the user through opening 2112 in support wall 2110.

Figure 54:
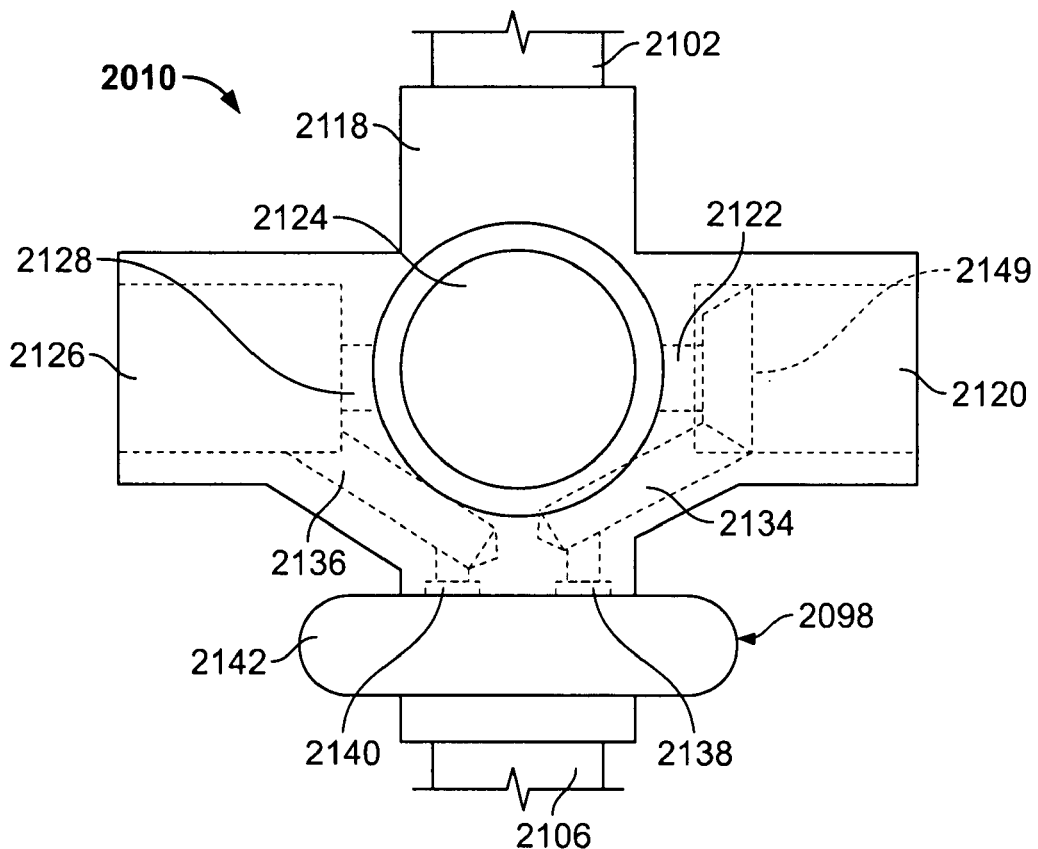
FIG. 54 is a front view of a shower/tub water control valve having a bypass valve assembly mounted thereon.
Figure 55:
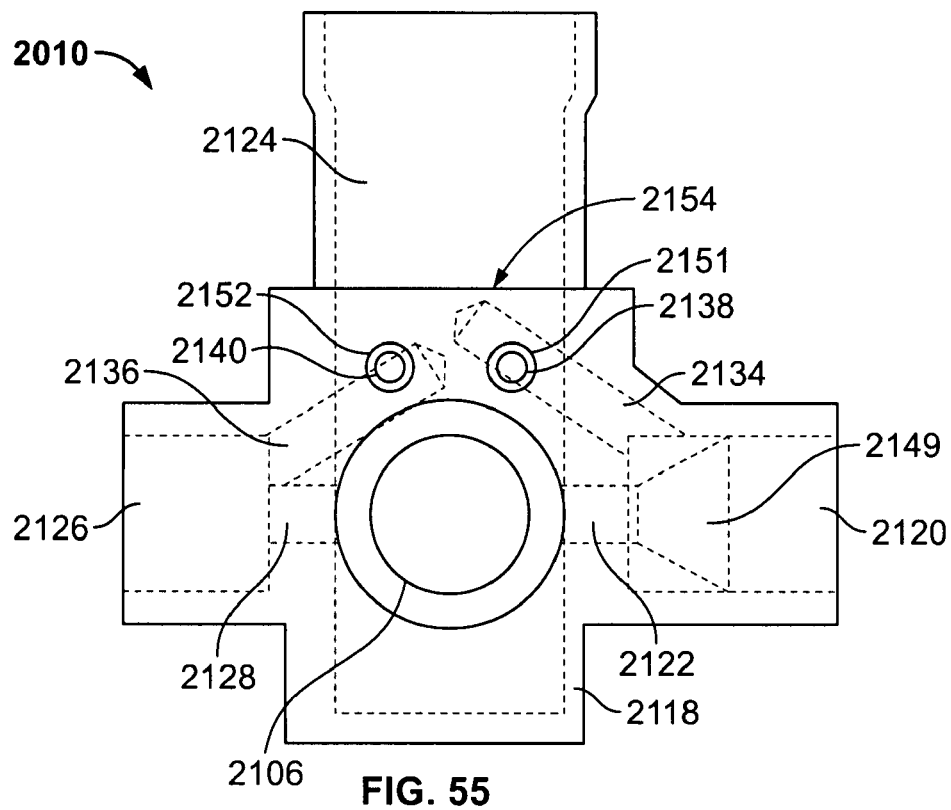
FIG. 55 is a side view of the shower/tub water control valve of FIG. 54 without the bypass assembly mounted thereon showing the hot and cold water bypass ports for connection to the bypass valve.
Figure 56:
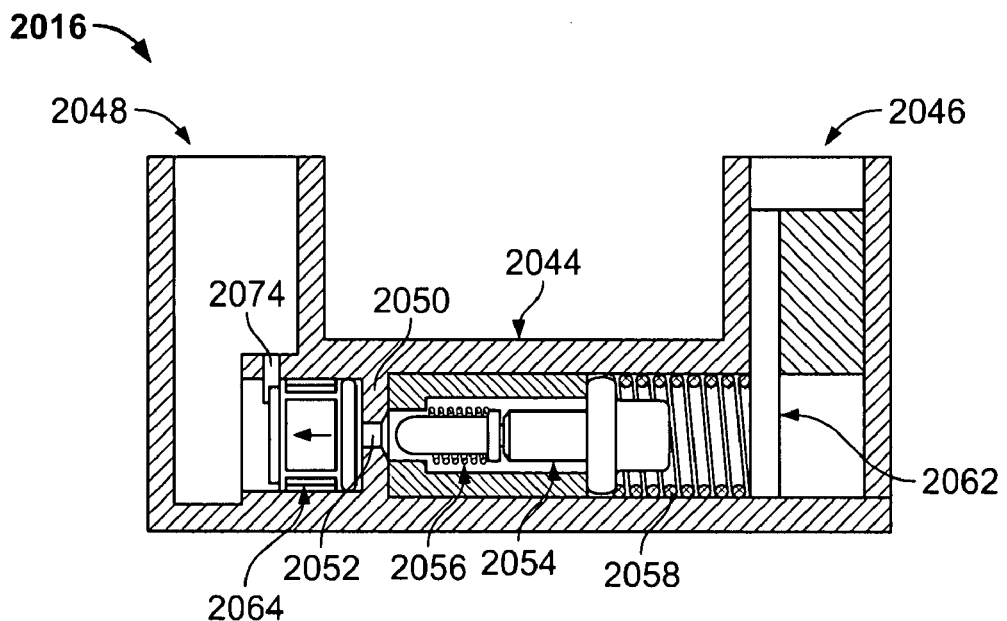
FIG. 56 is a cross-sectional side view of an exemplary modified bypass valve for use with the water control valves.

Another configuration for a water control valve 2010 having a rigidly attached bypass valve 2016 is shown in FIGS. 54 and 55 and an alternative bypass valve 2016 particularly configured for use with such a water control valve 2010 is shown in FIG. 56. In this configuration, instead of the single external port 2130 utilizing one atmospheric sealing element 2144, the hot 2138 and cold 2140 water bypass ports connect directly to the respective input 2146 and output 2148 lines of bypass valve 2016 with atmospheric seals at each such connection. As with the above water control valve 2010, valve manifold 2118 of this configuration is also manufactured to have or modified to have hot water bypass passageway 2134 interconnecting hot water inlet 2120 and hot water bypass port 2138 and cold water bypass passageway 2136 interconnecting cold water inlet 2126 and cold water bypass port 2140. As shown in FIG. 54, bypass assembly 2098, configured generally as shown in FIG. 53, connects to directly to the hot 2138 and cold 2140 water input ports with the bypass valve 2016 disposed inside bypass housing 2142 to bypass water around water control valve 2010. As shown in FIG. 55, hot water bypass port 2138 has sealing element, such as O-ring 2151, to sealably connect port 2138 with the input line 2146 to bypass valve 2016 and cold water bypass port 2140 has sealing element, such as O-ring 2152, to sealably connect port 2140 with the output line 2148 from bypass valve 2016. As also shown in FIG. 55, valve manifold 2118 can include enlarged portion 2154 for mounting bypass assembly 2098 or bypass valve 2016 against valve manifold 2118. As shown in FIG. 54 and explained above, screen 2149 can be placed at or near the entrance to hot water bypass passageway to filter debris and be self-cleaning.

As with the previous embodiment of water control valve 2010, bypass valve 2016 can be of the thermostatically controlled, electric solenoid, manually operated or other type of bypass valve. Instead of utilizing bypass assembly 2098, as shown in FIG. 54, valve body 2044 of bypass valve 2016 can be modified to mount directly to hot 2138 and cold 2140 bypass ports. One embodiment of such a bypass valve 2016 is shown in FIG. 56. This embodiment comprises a generally U-shaped bypass valve body 2044 with valve inlet 2046 and valve outlet 2048 configured to sealably mount to hot water bypass port 2138 and cold water bypass port 2140, respectively. This embodiment, which utilizes the thermostatically controlled components discussed in detail above, requires bypass valve inlet 2046 and bypass valve outlet 2048 to be spaced in corresponding relationship to hot water bypass port 2138 and cold water bypass port 2140.

When installed, bypass valve assembly 2098 or bypass valve 2016 is sealably and rigidly connected to and supported by valve manifold 2118 in shower system 2034. When the water in hot water line 2026 is no longer at the desired temperature (i.e., the temperature lowers to be tepid or cool), bypass valve 2016 opens to bypass the non-hot water around water control valve 2010 by diverting water flow from hot water line 2026 at hot water inlet 2120 through hot water bypass passageway 2134 and hot water bypass port 2138 into bypass valve inlet 2046 then through bypass valve 2016 to bypass valve output 2048, cold water bypass port 2140, cold water bypass passageway 2136 and then to cold water line 2022 at cold water inlet 2126. In the preferred embodiment, pump 2032 provides the pressure in hot water line 2026 for the necessary bypassing. The bypassing of this cool or cold water in hot water line 2026 will continue until the temperature in hot water line 2026 is at the desired temperature. At that time, bypass valve 2016 will close and hot water (as desired) will be at the water control valve 2010 ready for selection by flow control valve 2108 and distribution to shower head assembly 2100 or tub faucet 2104.

As with the previous embodiment, water control valve 2010 can be provided with bypass assembly 2098 or bypass valve 2016 already connected to valve manifold 2118 or water control valve 2010 can be sold with removable cap elements (not shown) that sealably close hot 2138 and cold 2140 bypass ports so that bypass assembly 2098 or bypass valve 2016 can be provided as an optional unit. In yet another alternative configuration, bypass assembly 2098 or bypass valve 2016 is fixedly attached to or manufactured with valve manifold 2118 such that water control valve 2010 and bypass assembly 2098 or bypass valve 2016 are a single, integral unit. This configuration eliminates the need for sealing elements 2150 and 2152. As stated above, whether the bypass assembly 2098 or bypass valve 2016 is sold integral with water control valve 2010 or as separate units requiring sealing elements 2150 and 2152, it should be configured to be accessible to the user through opening 2112 in support wall 2110.

Figure 57:
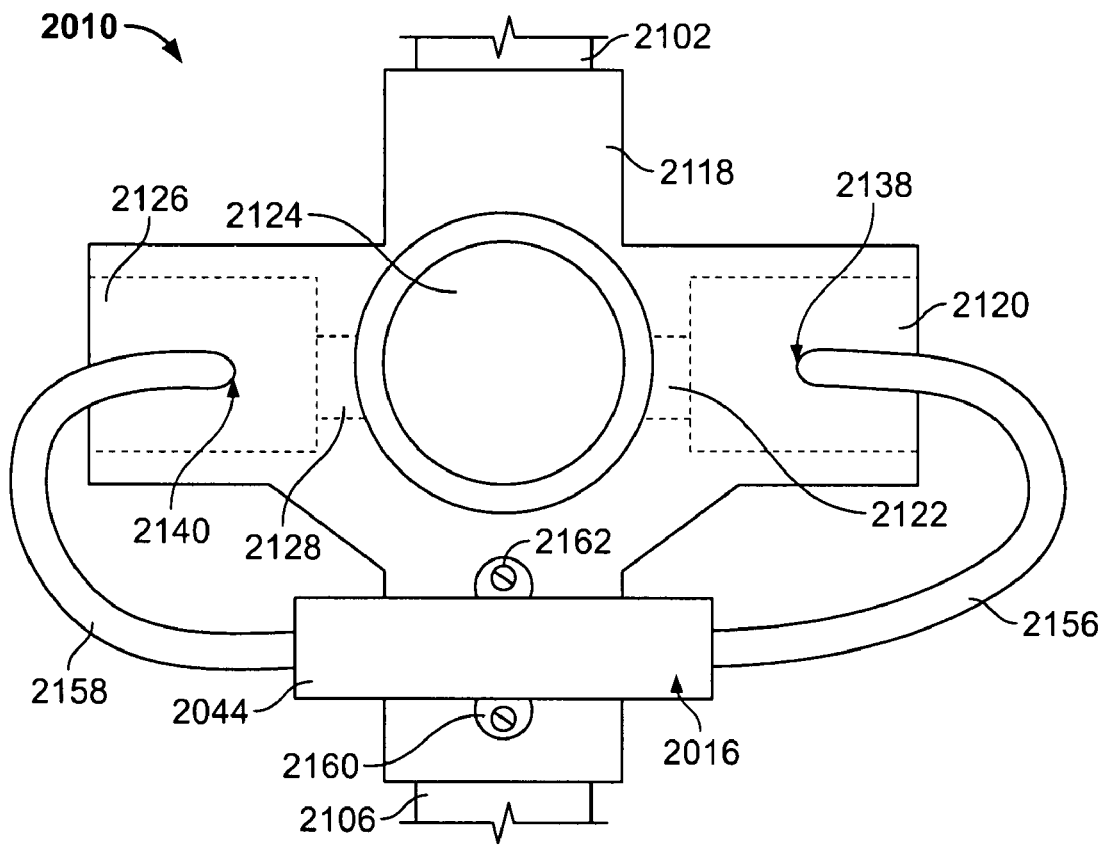
FIG. 57 is a front view of a shower/tub water control valve having a bypass valve attached to the water control valve and tubular lines interconnecting the bypass ports on the water control valve and the bypass valve.

Another embodiment of a water control valve 2010 having an attached bypass valve 2016 is shown in FIG. 57. In this embodiment, bypass valve inlet 2046 is connected to hot water bypass port 2138 by first tubular line 2156 and bypass valve outlet 2048 is connected to cold water bypass port 2140 by second tubular line 2158. As shown in FIG. 57, hot 2138 and cold 2140 bypass ports can connect to hot water inlet 2120 and cold water inlet 2126, respectively, through bypass passageways 2134 and 2136 (shown in other figures) that extend through the wall of valve manifold 2118 at hot 2120 and cold 2126 water inlets. Alternatively, hot 2138 and cold 2140 bypass ports can be positioned at other places on valve manifold 2118, such as shown in FIGS. 54 and 55, with hot 2134 and cold 2136 bypass passageways interconnecting bypass ports 2138 and 2140 with inlets 2120 and 2126. In the preferred embodiment, first 2156 and second 2158 tubular lines are flexible tubular members such as the flexible hose commonly utilized in plumbing facilities. Alternatively, first 2156 and second 2158 tubular lines can be semi-rigid or rigid tubing, such as that made out of copper, stainless steel, fiberglass or various composite materials. As known by those skilled in the art, connections between hot water bypass port 2138 and first tubular line 2156 and between first tubular line 2156 and bypass valve inlet 2046, as well as those on the cold water side of control valve 2010, should be sealed to prevent leakage of water.

In the attached configuration of this embodiment, bypass valve 2016 is affixed to valve manifold 2118 by one or more connecting elements 2160 each having one or more attachment mechanisms 2162, such as a screw, bolt, rivet or etc. Connecting elements 2160 can be an integral part of bypass valve body 2044, as shown in FIG. 57, or they can be separate elements used to attach one piece onto another piece, such as a U-shaped strap. In this manner, bypass valve 2016 is affixed to water control valve 2010 and accessible with it through opening 2112 in support wall 2110. As above, although the preferred bypass valve 2016 is the thermostatically controlled bypass valve previously described, bypass valve 2016 can be the needle valve, electric solenoid or manually operated type of bypass valves. In addition, bypass valve 2016 can be sold integral with tubular lines 2156 and 2158 or the control valve 2010 and bypass valve 2016 can be sold as a single integral unit to eliminate the necessary sealing elements between the various connections. In addition, as previously described, control valve 2010 can be sold with one or more cap elements (not shown) to seal ports 2138 and 2140 so that bypass valve 2016 and associated tubular lines 2156 and 2158 can be sold separately.

When installed, bypass valve 2016 is sealably and rigidly connected to and supported by valve manifold 2118 in shower system 2034 by use of connecting element 2160 and attachment mechanisms 2162. When the water in hot water line 2026 is no longer at the desired temperature (i.e., the temperature lowers to be tepid or cool), bypass valve 2016 opens to bypass the non-hot water around water control valve 2010 by diverting water flow from hot water line 2026 at hot water inlet 2120 through hot water bypass passageway 2134, hot water bypass port 2138 and first tubular line 2156 into bypass valve inlet 2046 through bypass valve 2016 to bypass valve output 2048, second tubular line 2158, cold water bypass port 2140, cold water bypass passageway 2136 and then to cold water line 2022 at cold water inlet 2126. In the preferred embodiment, pump 2032 provides the pressure in hot water line 2026 for the necessary bypassing. The bypassing of this cool or cold water in hot water line 2026 will continue until the temperature in hot water line 2026 is at the desired temperature. At that time, bypass valve 2016 will close and hot water (as desired) will be at the water control valve 2010 ready for selection by flow control valve 2108 and distribution to shower head assembly 2100 or tub faucet 2104.

Figure 58:
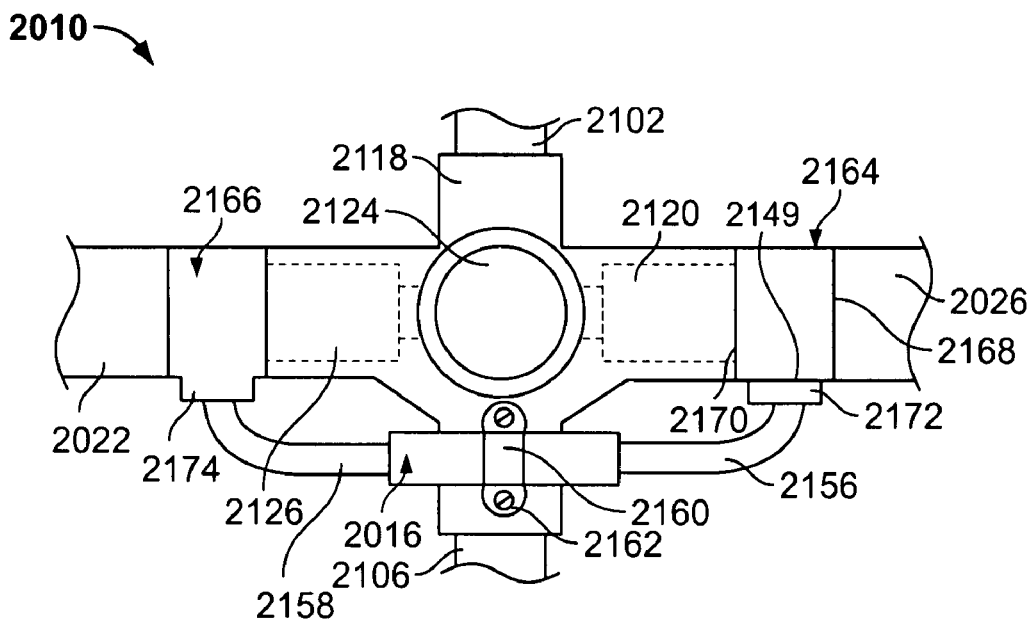
FIG. 58 is a front view of a shower/tub water control valve connected to a pair of bypass connectors that connect to a bypass valve attached to the water control valve.

Yet another embodiment of a water control valve 2010 having an attached bypass valve 2016 is shown in FIG. 58. In this embodiment, a standard water control valve 2010 is utilized with a first bypass connector 2164 and second bypass connector 2166 that connect to bypass valve 2016. As shown in FIG. 58, bypass connector 2164 is disposed between hot water line 2026 and hot water inlet 2120 and bypass connector 2166 is disposed between cold water line 2022 and cold water inlet 2126. Bypass connectors 2164 and 2166 can be of the standard tee (as shown) or three-way elbow type of connector having an inlet 2168 and control valve outlet 2170 to connect to control valve 2010. Bypass connector 2164 has bypass outlet 2172 and bypass connector 2166 has bypass inlet 2174, configured as shown in FIG. 58, to connect to bypass valve 2016. As with the previous embodiment, the connection between first bypass connector 2164 and hot water inlet 2120 and between second bypass connector 2166 and cold water inlet 2126 can be by flexible or rigid tubular lines 2156 and 2158, respectively. The connections between first 2164 and second 2166 bypass connectors and control valve 2010 and bypass valve 2016 should be by sealable connectors so as to prevent leakage at such connections. As discussed in more detail above, bypass connectors 2164 and 2166, tubular lines 2156 and 2158 and bypass valve 2016 can be provided as a single, integral unit and bypass connectors 2164 and 2166 can be provided with cap elements (not shown) to close off bypass outlet 2172 when bypass valve 2016 is not used or removed from service through opening 2112 in support wall 2110 for maintenance, repair or replacement. As also discussed above, water control valve 2010 can be provided with screen 2149 to filter debris before it gets to bypass valve 2016. Placing screen 2149 at or near the entrance to bypass outlet 2172, as shown, will allow screen 2149 to be self-cleaning by washing the face of screen 2149 when hot water is flowing through water control valve 2010. As with the embodiment shown in FIG. 57, bypass valve 2016 is affixed to valve manifold 2118 so that it is supported from valve manifold 2118. FIG. 58 shows the use of a U-shaped strap as the connecting element 2160 held in place against valve manifold 2118 by a pair of attachment mechanisms 2162. With the water control valve 2010 in the closed position, any cold or tepid water in hot water line 2026 will be diverted around water control valve 2010 through first bypass connector 2164 and first tubular line 2156 to bypass valve 2016 and then to second tubular line 2158 and second bypass connector 2166 to cold water line 2022. As soon as the water being bypassed reaches the desired temperature, bypass valve 2016 will close so that hot water, at the desired temperature, will be at control valve 2010 for use at shower head assembly 2100 or tub faucet 2104.

EXAMPLE 5

Shower/Tub Control Valve with Adjacent Bypass Valve

Figure 59:
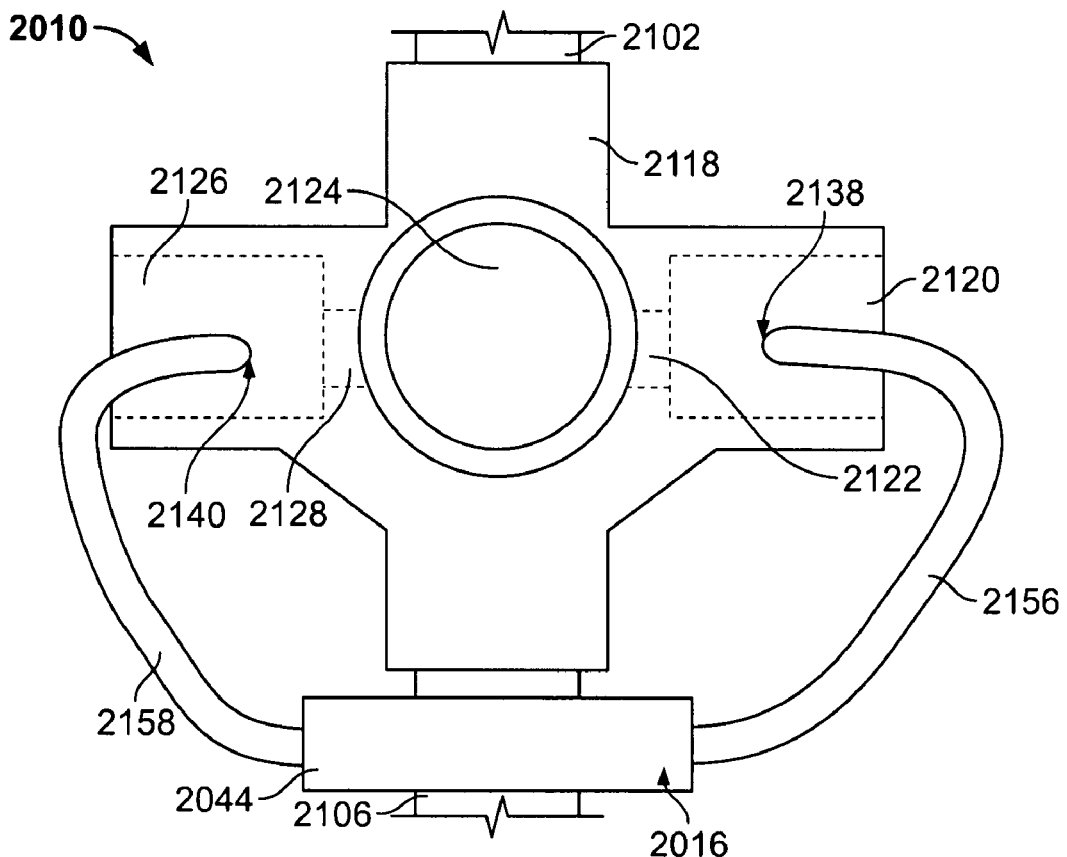
FIG. 59 is a front view of a shower/tub water control valve having a bypass valve adjacent to the water control valve and connected to bypass ports on the water control valve.
Figure 60:
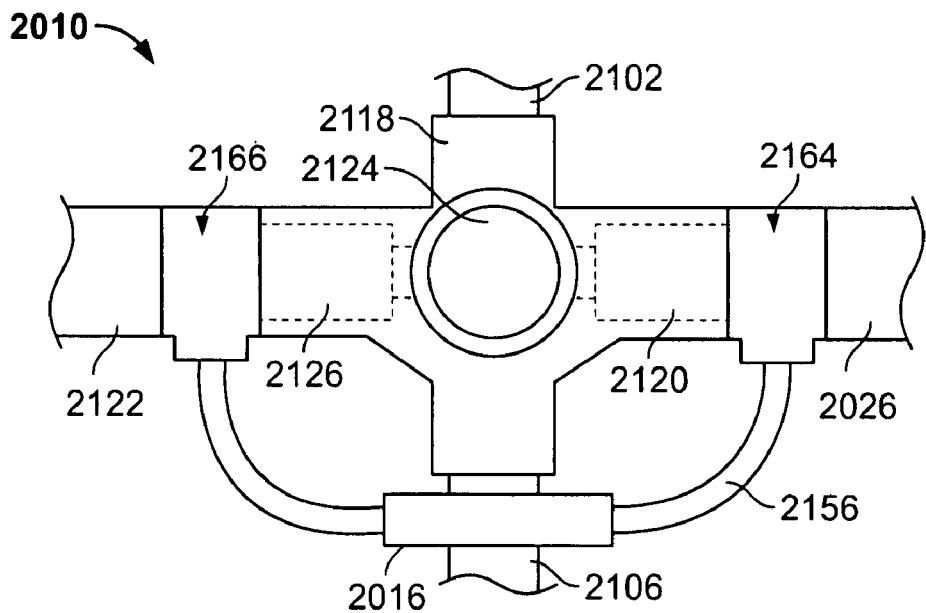
FIG. 60 is a front view of a shower/tub water control valve connected to a pair of bypass connectors that connect to a bypass valve positioned adjacent to the water control valve.

In an exemplary embodiment, where bypass valve 2016 is adjacent to (i.e., but not physically attached to or supported by) water control valve 2010, shown in FIGS. 59 and 60, bypass valve 2016 is directly supported by first tubular line 2156 and second tubular line 2158. FIG. 59 illustrates a configuration similar to that shown in FIG. 57 and discussed above except for there is no connecting element 2160 or attachment mechanism 2162 to affix bypass valve 2016 to valve manifold 2118. Likewise, FIG. 60 illustrates a configuration similar to that shown in FIG. 58 and discussed above except there is no connecting element 2160 or attachment mechanism 2162 for affixing bypass valve 2016 to valve manifold 2118. Depending on the flexibility of first tubular line 2156 and second tubular line 2158, bypass valve 2016 hangs freely from their connection to ports 2138 and 2140 on water control valve 2010 or from first 2164 and second 2166 bypass connectors. The principal benefit of the adjacent configuration is that there is no need for connecting element 2160 and any mechanism to attach it to valve manifold 2118 and it may be easier to retrofit existing water control valve 2010 installations by the necessary components. This is particularly true with regard to the embodiment shown in FIG. 60 that only requires the addition of first 2164 and second 2166 bypass connectors between an existing water control valve 2010 and the existing hot water line 2026 and cold water line 2022. As discussed above, these embodiments can also include self-cleaning screen 2149. Instead of utilizing water control valve 2016, the various embodiments set forth herein, including those discussed above, can utilize bypass valve assembly 2098 having bypass valve 2016 disposed therein.

Figure 61:
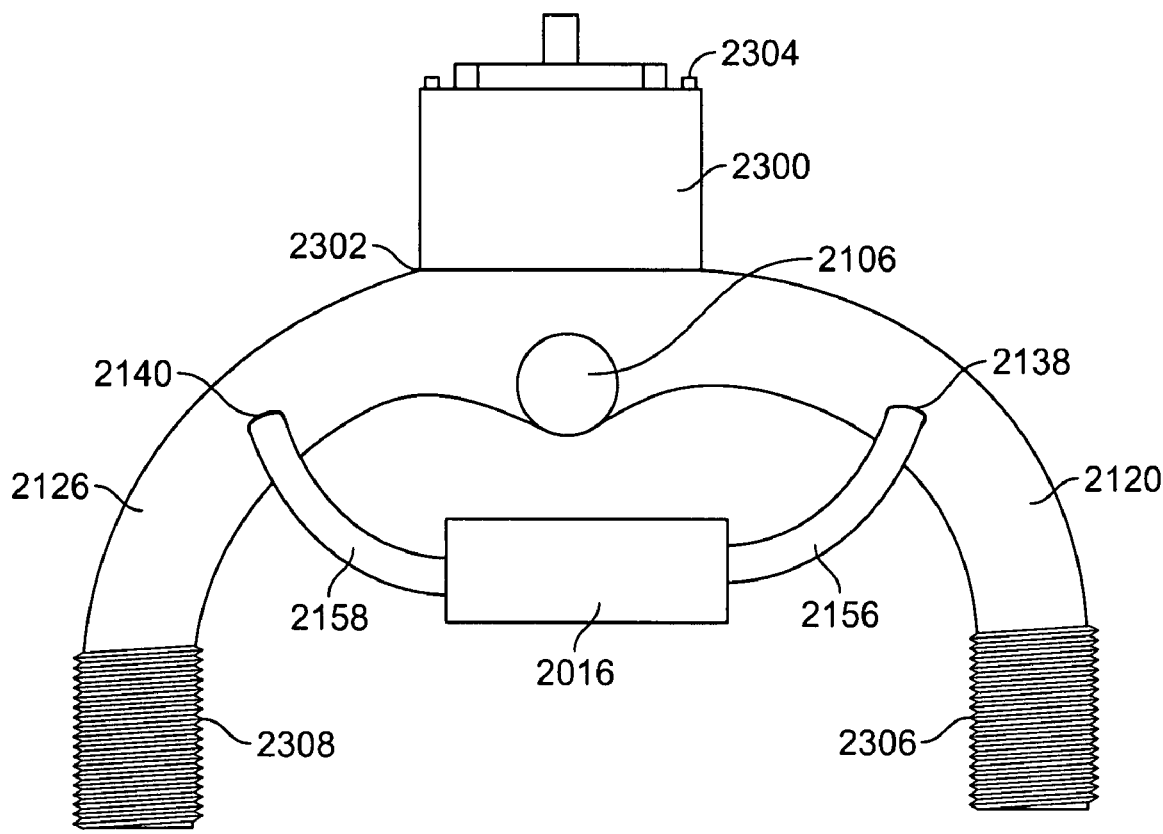
FIG. 61 is a front view of a tub water control valve having an alternative configuration for the valve manifold with the bypass valve adjacent to the water control valve and connected to bypass ports on the water control valve.

In the embodiment of water control valve 2010 shown in FIG. 61, valve manifold 2118 is configured to have an external valve cartridge 2300 that is attached to valve manifold 2118 at manifold interface 2302. The primary difference between the embodiment shown in FIG. 61 and those previously described is that valve interface 2124 is configured in the form of a generally cylindrical cavity adaptable for receiving valve cartridge 2123 therein. Instead of utilizing valve cartridge 2123 of the previous embodiments, which interfaces with the cylindrical cartridge cavity (i.e., valve interface 2124) inside of valve manifold 2118, the embodiment of FIG. 61 utilizes valve cartridge 2300 that removably abuts flat interface 2302, which is configured to have ports for the flow of hot and cold water to valve cartridge 2300 and the discharge of mixed water to shower line 2102 and/or tub line 2106. Generally, valve cartridge 2300 attaches to valve interface 2302 by way of one or more attachment mechanisms, such as screws 2304. With regard to the use of bypass valve 2016, the embodiment shown in FIG. 61 is similar in concept to that shown in FIG. 60 and described above. Typically, valve manifold 2118 of this configuration has hot water threaded end 2306 and cold water threaded end 2308 for connection to the supply of hot water and cold water, respectively. As with the previous embodiment, first tubular line 2156 interconnects hot water bypass port 2138 on hot water inlet 2120 to bypass valve inlet 2046 on bypass valve 2016 and second tubular line 2158 interconnects bypass valve outlet 2048 to cold water bypass port 2140 on cold water inlet 2126. As discussed above, appropriate sealing members need to be utilized to prevent leakage and self-cleaning screen 2149 can be used to prevent debris and other matter from entering bypass valve 2016. Although the embodiment shown in FIG. 61 is similar to that of FIG. 61, it is known and understood that the various embodiments can also be adapted for use with the valve manifold 2118 and cartridge 2300 combination of FIG. 61.

EXAMPLE 6

Service Control Valve

In the embodiment wherein bypass valve 2016 is included with the water control valve, shown as water control valves 2012 and 2014 in FIGS. 61 through 64, bypass valve 2016 is integrated with or appended to a pair of individual water control valves 2012, also known as angle stops, or incorporated with a combination water control valve 2014. These types of valves are commonly referred to as service valves or non-working valves because they are not operated so as to be frequently moved from the opened to closed positions. Service valves are primarily utilized to connect to washing machines, sinks or faucets on sinks, dishwashing machines and the like apparatuses. Normally, service valves are left in the open position, only being closed to repair or replace the apparatus. In the open position, water is allowed to flow freely to the apparatus, with the apparatus itself having a control valve such as an electrically controlled solenoid valve incorporated therein to control the amount of cold or hot water allowed into the apparatus. Unfortunately, no provision is generally made for the fact that hot water may not actually be at the service valve, due to the cooling effect discussed above, when the apparatus's control valve opens to allow in "hot" water to the apparatus. As such, undesirably cold or tepid water may be utilized in the apparatus to clean clothes or dishes or perform other operations best done in hot water.

Figure 62:
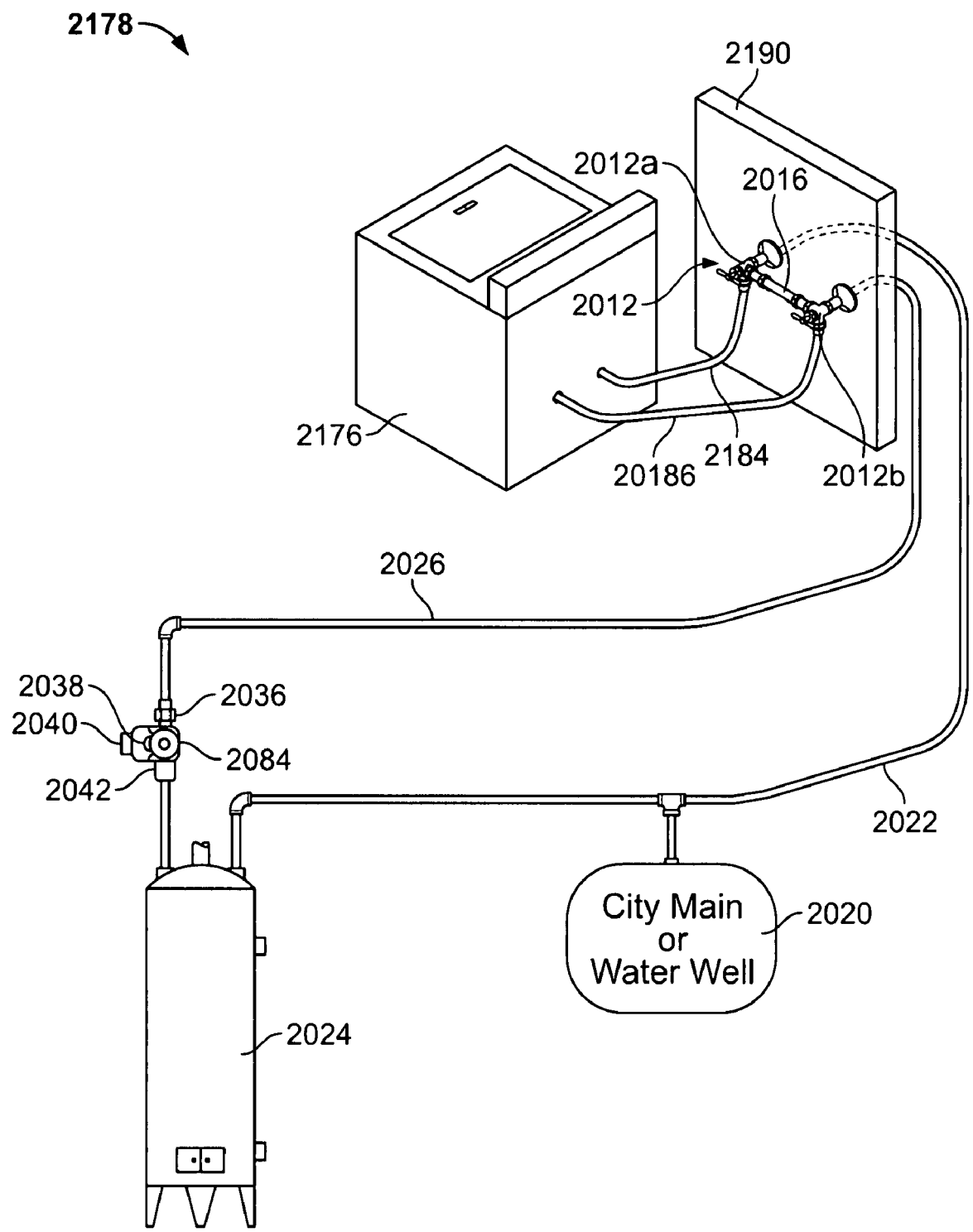
FIG. 62 is another alternative water distribution system utilizing an exemplary water control valve as a service valve for a water utilizing apparatus.
Figure 63:
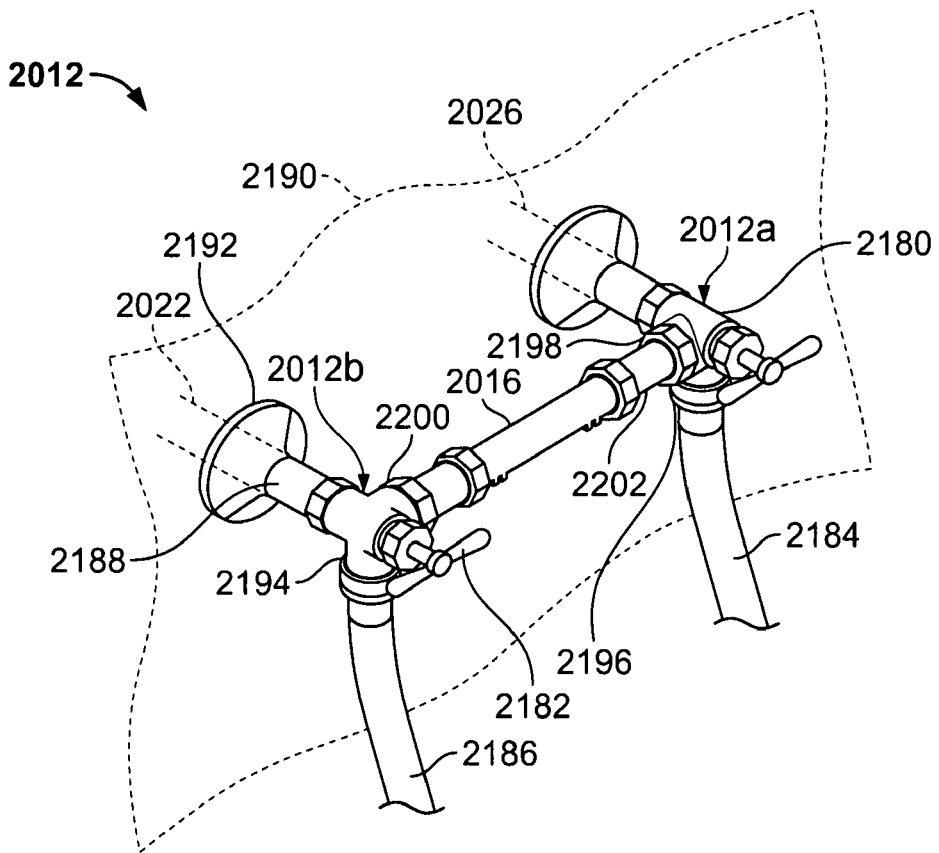
FIG. 63 is a perspective view of a pair of water control valves modified for use with an interconnecting bypass valve.

As shown in FIGS. 62 and 63, in use water control valve 2012 comprises a pair of independent water control valves, hot water valve 2012a and cold water 2012b to supply hot or cold water to the apparatus 2176 (shown as a washing machine in FIG. 62 illustrating a system 2178 utilizing water control valve 2012). Generally, other than the water that flows through them, water control valves 2012a and 2012b are the same and, when referenced herein collectively as water control valve 2012, is meant to refer to both hot water valve 2012a and cold water valve 2012b. Water control valve 2012 has valve manifold 2180 enclosing the inner workings (not shown) of water control valve 2012 that are operated by an operating mechanism, such as handle 2182, to open or close valve 2012 to independently allow water, hot or cold depending on which water valve 2012a or 2012b is operated, to flow to apparatus 2176 through hot water hose 2184 or cold water hose 2186, respectively. Generally, water control valve 2012 has an inlet 2188 with a connection suitable to connect to an end of either hot water line 2026 or cold water line 2022, depending on which valve 2012a or 2012b is referenced, extending through wall 2190 and past cover plate 2192. Water control valve 2012 also has a first valve outlet 2194, generally configured with a male connection suitable for connecting to female coupling 2196 on the end of hose 2184 or 2186.

Each of water control valves 2012a and 2012b are modified to include a hot water second outlet 2198 and cold water second outlet 200, respectively, to connect to bypass valve 2016 for bypassing cold or tepid water around valves 2012a and 2012b so as to maintain hot water at water control valve 2012a ready for use by apparatus 2176. Although the preferred bypass valve 2016 is a thermostatically controlled bypass valve, as described above, bypass valve 2016 can be the needle, electric solenoid, manually operated or other type of bypass valve. As also discussed above, screen 2149 can be utilized to screen debris before it gets to bypass valve 2016 and be positioned at or near the entrance to hot water second outlet 2198 to be self-cleaning when hot water is not flowing to apparatus 2176. Depending on the distance between water valves 2012a and 2012b, one or more tubular extension members 2202 will be necessary to connect hot water second outlet 2198 to bypass valve inlet 2046 and/or to connect bypass outlet 2048 to cold water second outlet 2200. Alternatively, bypass valve 2016 can have valve inlet 2046 and valve outlet 2048 which extend to interconnect water control valves 2012a and 2012b to eliminate the additional connections necessary for extension members 2202, although this could limit flexibility with regard to the distance between valves 2012a and 2012b. Use of one or more extension members 2202, such as the two shown in FIG. 63, provide increased flexibility with regard to the spacing of valves 2012a and 2012b. In yet another alternative, water control valves 2012a and 2012b could be manufactured integral with bypass valve 2016, thereby completely eliminating the need for separate tubular extension members 2202 and any connections to second valve outlets 2198 and 2200. When installed, bypass valve 2016 is sealably and rigidly connected and supported adjacent to water control valves 2012a and 2012b in system 2178. When the water in hot water line 2026 is no longer at the desired temperature (i.e., the temperature lowers to be tepid or cool), bypass valve 2016 opens to bypass the non-hot water around water control valves 2012a by diverting water flow from hot water line 2026 at hot water second outlet 2198 through extension member 2202, if used, into bypass valve inlet 2046 then through bypass valve 2016 to bypass valve output 2048 and then to cold water line 2022 at cold water second outlet 2200. In the preferred embodiment, pump 2032 provides the pressure in hot water line 2026 for the necessary bypassing. The bypassing of this cool or cold water in hot water line 2026 will continue until the temperature in hot water line 2026 is at the desired temperature. At that time, bypass valve 2016 will close and hot water (as desired) will be at the water control valve 2012b ready for selection by the flow control valve at or inside apparatus 2176.

Figure 64:
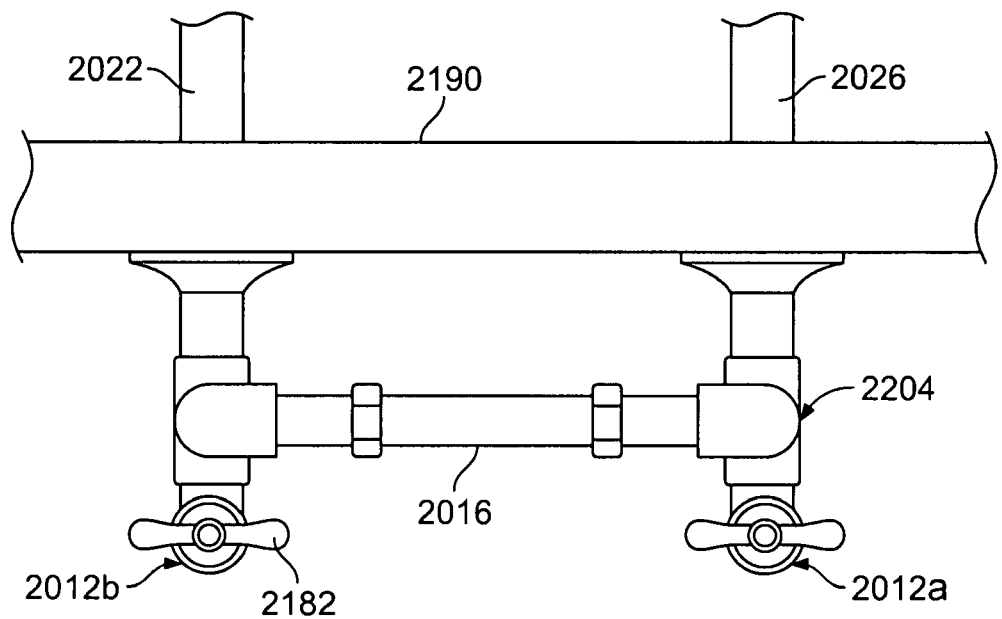
FIG. 64 is a top view of a pair of water control valves utilizing a pair of saddle valves to interconnect with a bypass valve.
Figure 65:
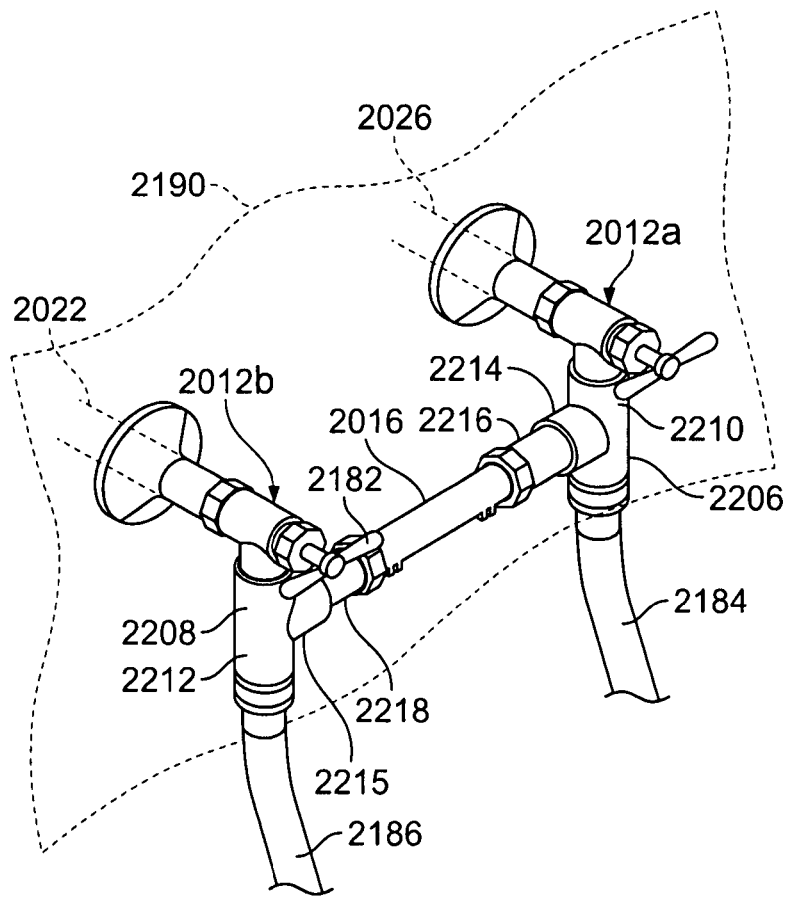
FIG. 65 is a perspective view of a pair of water control valves utilizing a pair of bypass connectors to interconnect with a bypass valve.

As an alternative, system 2178 can be modified to utilize a pair of saddle valves 2204, such self tapping variety, to establish a connection between water control valves 2012a and 2012b for connection to bypass valve 2016, as shown in FIG. 64. Saddle valves 204 can be located in front of wall 2190, as shown, for ease of access for repair, maintenance or replacement of bypass valve 2016 or they can be located behind wall 2190. Alternatively, not shown, saddle valves 2204 can attach to and interconnect hot water hose 2184 and cold water hose 2186 to bypass cold or tepid water through bypass valve 2016. In yet another configuration, shown in FIG. 65, system 2178 can utilize a first bypass connector 2206 connected to water control valve 2012a and second bypass connector 2208 connected to water control valve 2012b that connect to bypass valve 2016. As shown, bypass connector 2206 is disposed between outlet 2194 on valve 2012a and hose coupling 2196 on hot water hose 2184, and bypass connector 2208 is disposed between outlet 2194 on valve 2012b and hose coupling 2196 on cold water hose 2186 to bypass cold or tepid water from hot water line 2026 to cold water line 2022. Bypass connectors 2206 and 2208 can be of the standard tee type (as shown) or three-way elbow type of connector having an inlet 2210 and hose outlet 2212 to connect to control valves 2012a and 2012b and hoses 2184 and 2186. Bypass connector 2206 has bypass outlet 2214 and bypass connector 2208 has bypass inlet 2215, configured as shown in FIG. 65, to connect to bypass valve 2016. The connection between first bypass connector 2206 and bypass valve inlet 2046 on bypass valve 2016 and between second bypass connector 2208 and bypass valve outlet 2048 can be by flexible or rigid tubular lines 2216 and 2218, respectively. The connections between first 2206 and second 2208 bypass connectors and control valves 2012a and 2012b and bypass valve 2016 should be by sealable connectors so as to prevent leakage at such connections. As discussed in more detail above, bypass connectors 2206 and 2208, tubular lines 2216 and 2218 and bypass valve 2016 can be provided as a single, integral unit and bypass connectors 2206 and 2208 can be provided with cap elements (not shown) to close off bypass outlets 2214 when bypass valve 2016 is not used or removed from service for maintenance, repair or replacement.

Figure 66:
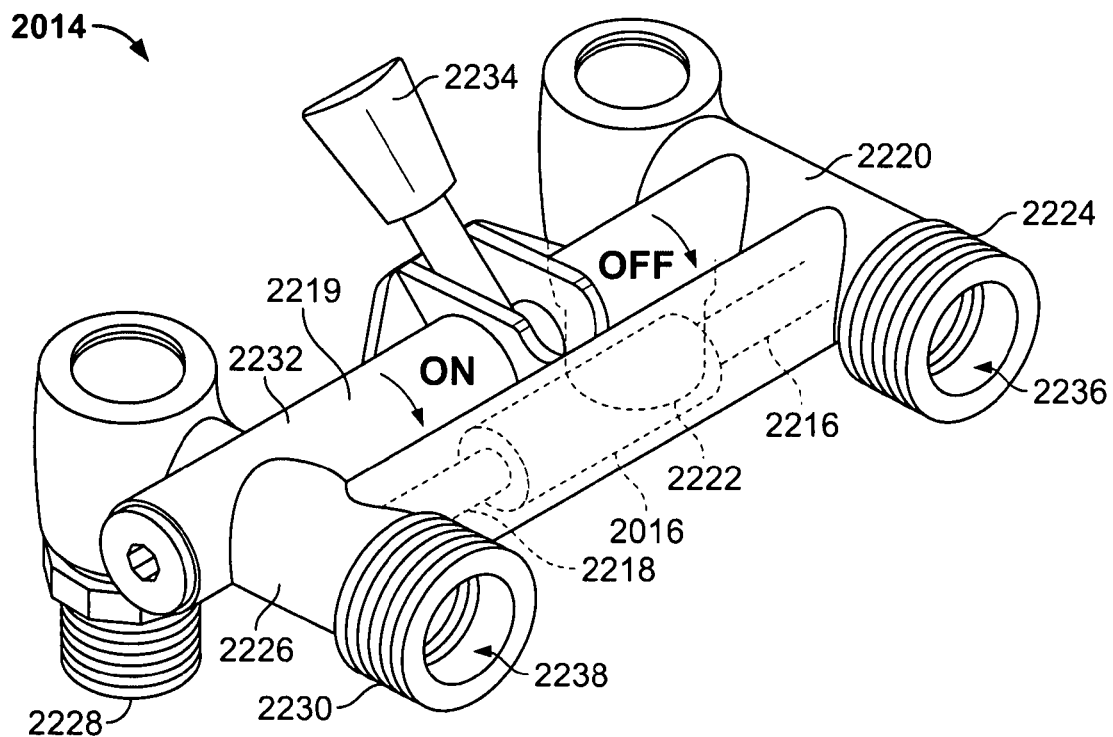
FIG. 66 is perspective view of a combination water control valve utilizing a bypass valve therein to interconnect the hot and cold components of the water control valve.

Another embodiment of a water control valve 2014 with an included bypass valve 2016 is shown in FIG. 66. In this embodiment, the hot and cold water service valves are joined together in a single unit having a valve manifold 2219 with a hot water component 2220 having a hot water inlet 2222 and hot water outlet 2224 and a cold water component 2226 having a cold water inlet 2228 and cold water outlet 2230. Hot water component 2220 and cold water component 2226 of water control valve 2014 are joined by a tubular section 2232 enclosing the inner workings (not shown) of control valve 2014 that are operated by an operating mechanism, such as lever 2234 (could be a handle, dial, switch or other like mechanisms). When lever 2234 is moved to the "on" position, the inner workings of valve 2014, which can be of the ball valve type, operate to open the connection between hot water inlet 2222 and hot water outlet 2224 to allow hot water to flow through hot water chamber 2236 to apparatus 2176 through a hose or other tubular member (such as hose 2184 with a female coupling 2196 thereon) connected to hot water outlet 2224. Concurrently therewith, the connection between cold water inlet 2228 and cold water outlet 2230 opens to allow cold water to flow through cold water chamber 2238 to apparatus 2176 through a hose or other tubular member connected to cold water outlet 2230. When lever 2234 is moved to the "off" position, valve 2014 closes to prevent hot and cold water from flowing to apparatus 2176. For water control valve 2014 adaptable for use to bypass cold or tepid water, bypass valve 2016 is incorporated within tubular section 2232 such that tubular line 2216 interconnects hot water chamber 2236 with bypass valve inlet 2046 and tubular line 2218 interconnects bypass valve outlet 2048 with cold water chamber 2238. Screen 2149 can be placed at or near the entrance to tubular section 2232 to filter debris from the bypassed water and be self-cleaning when water is not being bypassed. As above, the preferred bypass valve 2016 is a thermostatically controlled bypass valve, such as the thermostatically controlled bypass valve described above, bypass valve 2016 can be the needle, electric solenoid or manually operated type of bypass valve. With bypass valve 2016 installed and water control valve 2014 in the "on" or open position, any cold or tepid water in hot water line 2026 at hot water component 2220 will be bypassed through tubular section 2232 to cold water component 2226 and to cold water line 2022 so as to maintain hot water available at hot water component 2220.

With regard to the use of a thermostatically controlled bypass valve 2016 having the components shown in FIGS. 49 through 51 and described in the accompanying text, the operation of the bypass valve 2016 is summarized on the chart shown as FIG. 22. The chart of FIG. 22 summarizes the results of the twenty combinations of conditions (pump on/pump off; hot water line hot/hot water line cooled off; hot water valve fully open, closed or between; cold water valve fully open, closed or between) that are applicable to the operation of bypass valve 2016. The operating modes IVB, IVC, IVD, IIIB, & IIID are summarized detailed in the immediately following text. The operation of the remaining fifteen modes are relatively more obvious, and may be understood from the abbreviated indications in the outline summarizing FIG. 22. Starting with the set "off" hours (normal sleeping time, and daytime when no one is usually at home) pump 2032 will not be powered. Everything will be just as if there were no pump 2032 and no bypass valve 2016 in use with water control valves 2010, 2012 or 2014 (i.e., both the cold and hot water lines will be at the same city water pressure). The water in hot water line 2026 and at bypass valve 2016 will have cooled off during the long interim since the last use of hot water. The reduced water temperature at bypass valve 2016 results in "retraction" of rod member 2076 of the thermally sensitive actuating element 2054. The force of bias spring 2056 pushing against flange 2082 on rod member 2076 will push it back away from valve seat 2068, opening bypass valve 2016 for recirculation. Although the thermal actuating element 2054 is open, with pump 2032 not running, no circulation flow results, as the hot 2026 and cold 2022 water lines are at the same pressure. This is the mode indicated as IVB in the outline on FIG. 22. If the cold water valve at water control valve 2010, 2012 or 2014 is opened with thermal actuating element 2054 open as in mode IVB above, pressure in cold water line 2022 to the cold water side of water control valve 2010, 2012 or 2014 will drop below the pressure in hot water line 2026. This differential pressure will siphon tepid water away from the hot side to the cold side, which is the mode indicated as IVD in the outline on FIG. 22. The recirculation of the "hot" water will end when the tepid water is exhausted from the hot water line 2026 and the rising temperature of the incoming "hot" water causes actuating element 2054 to close.

If the hot water side of water control valve 2010, 2012 or 2014 is turned on with actuating element 2054 open as in mode IVB above, pressure in hot water line 2026 will drop below the pressure in cold water line 2022. This differential pressure, higher on the cold side, will load check valve 2064 in the "closed" direction allowing no cross flow. This is mode IVC in the outline on FIG. 22. In this mode, with hot water line 2026 cooled and pump 2032 off, a good deal of cooled-off water will have to be run just as if bypass valve 2016 were not installed), to get hot water, at which time actuating element 2054 will close without effect, and without notice by the user. With actuating element 2054 open and hot water line 2026 cooled-off as in mode IVB above, at the preset time of day (or when the cyclic timer trips the next "on" cycle) pump 2032 turns on, pressurizing the water in hot water line 2026. Pump pressure on the hot side of water control valves 2010, 2012 or 2014 results in flow through the open actuating element 2054, thereby pressurizing and deflecting check valve 2064 poppet away from its seat to an open position. Cooled-off water at the boosted pressure will thus circulate from the hot line 2026 through actuating element 2054 and check valve 2064 to the lower pressure cold water line 2022 and back to water heater 2024. This is the primary "working mode" of the bypass valve 2016 and is the mode indicated as IIIb in the outline on FIG. 22. If the cold water valve is turned on during the conditions indicated in mode IIIB above (i.e., pump 2032 operating, hot water line 2026 cooled off, and the hot water valve at water control valve 2010, 2012 or 2014 turned off) and while the desired recirculation is occurring, mode IIID will occur. A pressure drop in the cold water line 2022 due to cold water flow creates a pressure differential across valve 2016 in addition to the differential created by pump 2032. This allows tepid water to more rapidly bypass to cold water line 2022. When the tepid water is exhausted from hot water line 2026, actuating element 2054 will close, ending recirculation.

While there is shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use.

What is claimed is:

1. A water pump and bypass valve sub-system for use in a water circulating system, the sub-system comprising:

a thermostatically controlled bypass valve configured to be located proximate a fixture in the water circulating system, the valve comprising:
a housing having a hot water port and a cold water port, the hot water port being configured to communicate with a hot water supply line, the cold water port being configured to communicate with a cold water supply line, the housing having a fluid path permitting recirculating flow between the hot and cold water ports; and
a thermal actuator disposed within the housing, the thermal actuator changing state when heated and when cooled to block and permit recirculating flow based on a temperature of the thermal actuator; and
a water pump configured to be located in the water circulation system remote from the fixture, the pump being configured to pump water through the water circulating system to the bypass valve.

2. The sub-system of claim 1, further comprising a check valve connected in parallel with the pump, the check valve being configured to permit water to bypass the pump when a flow rate of the water circulating system exceeds a capacity of the pump.

3. The sub-system of claim 1, wherein the hot and cold water ports are threaded to facilitate direct connection to flexible hoses that form part of the hot and cold water supply lines, respectively.

4. The sub-system of claim 1, wherein the hot water port includes a hot inlet port and a hot discharge port located proximate to and integral with one another, the hot inlet port being configured to receive hot water, the hot discharge port being configured to discharge the hot water, the cold water port and the hot inlet and discharge ports being formed integral with one another as part of a one-piece body.

5. The sub-system of claim 1, wherein the cold water port includes a cold inlet port and a cold discharge port located proximate to one another, the cold inlet port being configured to receive cold water, the cold discharge port being configured to discharge the cold water, the hot water port and the cold inlet and discharge ports being formed integral with one another as part of a one-piece body.

6. The sub-system of claim 1, further comprising a screen positioned within the housing between the hot water port and the thermal actuator.

7. The sub-system of claim 1, wherein the bypass valve further comprises a bias spring disposed in the housing, the bias spring urging the thermal actuator to contract.

8. The sub-system of claim 1, further comprising an over-travel spring disposed within the housing, the over-travel spring allowing movement of thermal actuator.

9. The sub-system of claim 1, further comprising a control timer that turns the pump on and off, the control timer being adjustable by a user to direct the pump to operate for a period during which hot water is desired.

10. The sub-system of claim 1, wherein the thermal actuator constitutes one of a bimetallic member, a memory alloy member and a wax filled cartridge.

11. The sub-system of claim 1, wherein the thermal actuator changes between first and second states through a snap action.

12. The sub-system of claim 1, wherein the thermal actuator constitutes a bimetallic member.

13. The sub-system of claim 12, wherein the bimetallic member constitutes a bimetallic spring.

14. The sub-system of claim 1, further comprising a flow switch for detecting the flow of water in the hot water supply line, the flow switch operatively connected to the water pump and suitable for shutting off the water pump when the flow of water in the hot water supply line exceeds a flow rate capacity of the bypass valve.

15. The sub-system of claim 1, further comprising a normally closed flow switch that monitors a flow through the water circulating system, the flow switch preventing the pump from turning on when the flow is larger than a maximum flow permitted through the bypass valve.

16. The sub-system of claim 1, wherein the housing includes a chamber having an open end, the thermal actuator being loaded into the chamber through the open end and held in the chamber with a retention member.

17. The sub-system of claim 1, wherein the water pump is configured to be located remote from the fixture.

18. The sub-system of claim 1, wherein the bypass valve includes a body holding the thermal actuator, and the bypass valve including a rod member that is moved by the thermal actuator when the thermal actuator changes state.

19. A water pump and bypass valve sub-system for use in a water circulating system, the sub-system comprising:
- a bypass valve configured to be located proximate a fixture in the water circulating system, the bypass valve comprising:
  - a housing having a hot water port and a cold water port, the hot water port being configured to communicate with a hot water supply line, the cold water port being configured to communicate with a cold water supply line, the housing having a fluid path permitting recirculating flow between the hot and cold water ports;
  - a thermal actuator disposed within the housing, the thermal actuator changing state when heated and when cooled to block and permit recirculating flow based on a temperature of the thermal actuator; and
  - a screen positioned within the housing between the hot water port and the thermal actuator; and
- a water pump configured to be located in the water circulation system, the pump being configured to pump water through the water circulating system to the bypass valve.

20. The sub-system of claim 19, wherein the hot water port includes a hot inlet port and a hot discharge port, the hot inlet port being configured to receive hot water, the hot discharge port being configured to discharge the hot water, wherein the cold water port includes a cold inlet port and a cold discharge port, the cold inlet port being configured to receive cold water, the cold discharge port being configured to discharge the cold water, the cold inlet and discharge ports and the hot inlet and discharge ports being formed integral with one another as part of a one-piece body.

21. The sub-system of claim 19, wherein the thermal actuator constitutes one of a bimetallic member, a memory alloy member and a wax filled cartridge.

22. The sub-system of claim 19, wherein the thermal actuator changes between first and second states through a snap action.

23. The sub-system of claim 19, wherein the thermal actuator constitutes a bimetallic member.

24. The sub-system of claim 19, wherein the bimetallic member constitutes a bimetallic spring.

25. The sub-system of claim 19, further comprising a control timer that turns the pump on and off.

26. The sub-system of claim 19, wherein the housing includes a chamber having an open end, the thermal actuator being loaded into the chamber through the open end and held in the chamber with a retention member.

27. A water pump and bypass valve sub-system for use in a water circulating system, the sub-system comprising:
- a bypass valve configured to be located proximate a fixture in the water circulating system, the bypass valve comprising:
  - a housing having a hot water port and a cold water port, the hot water port being configured to communicate with a hot water supply line, the cold water port being configured to communicate with a cold water supply line, the housing having a fluid path permitting recirculating flow between the hot and cold water ports; and
  - a thermal actuator disposed within the housing, the thermal actuator changing state when heated and when cooled to block and permit recirculating flow based on a temperature of the thermal actuator;
- a water pump configured to be located in the water circulation system, the pump being configured to pump water through the water circulating system to the bypass valve; and
- a control timer that turns the pump on and off, the control timer being adjustable by a user.

28. The sub-system of claim 27, wherein the hot water port includes a hot inlet port and a hot discharge port, the hot inlet port being configured to receive hot water, the hot discharge port being configured to discharge the hot water, wherein the cold water port includes a cold inlet port and a cold discharge port, the cold inlet port being configured to receive cold water, the cold discharge port being configured to discharge the cold water, the cold inlet and discharge ports and the hot inlet and discharge ports being formed integral with one another as part of a one-piece body.

29. The sub-system of claim 27, wherein the thermal actuator constitutes one of a bimetallic member, a memory alloy member and a wax filled cartridge.

30. The sub-system of claim 27, wherein the thermal actuator changes between first and second states through a snap action.

31. The sub-system of claim 27, wherein the thermal actuator constitutes a bimetallic member.

32. The sub-system of claim 31, wherein the bimetallic member constitutes a bimetallic spring.

33. The sub-system of claim 27, wherein the housing includes a chamber having an open end, the thermal actuator being loaded into the chamber through the open end and held in the chamber with a retention member.

34. A water pump and bypass valve sub-system for use in a water circulating system, the sub-system comprising:
- a bypass valve configured to be located proximate a fixture in the water circulating system, the bypass valve comprising:
  - a housing having a hot water port and a cold water port, the hot water port being configured to communicate with a hot water supply line, the cold water port being configured to communicate with a cold water supply line, the housing having a fluid path permitting recirculating flow between the hot and cold water ports;
  - a thermal actuator disposed within the housing, the thermal actuator changing state when heated and when cooled to block and permit recirculating flow based on a temperature of the thermal actuator; and
  - a check valve arranged in the housing to block flow through the fluid path in a direction from the cold water port to the hot water port; and
- a water pump configured to be located in the water circulation system, the pump being configured to pump water through the water circulating system to the bypass valve.

35. The sub-system of claim 34, wherein the hot water port includes a hot inlet port and a hot discharge port, the hot inlet port being configured to receive hot water, the hot discharge port being configured to discharge the hot water, wherein the cold water port includes a cold inlet port and a cold discharge port, the cold inlet port being configured to receive cold water, the cold discharge port being configured to discharge the cold water, the cold inlet and discharge ports and the hot inlet and discharge ports being formed integral with one another as part of a one-piece body.

36. The sub-system of claim 34, wherein the thermal actuator constitutes one of a bimetallic member, a memory alloy member and a wax filled cartridge.

37. The sub-system of claim 34, wherein the thermal actuator changes between first and second states through a snap action.

38. The sub-system of claim 34, wherein the thermal actuator constitutes a bimetallic member.

39. The sub-system of claim 38, wherein the bimetallic member constitutes a bimetallic spring.

40. The sub-system of claim 39, further comprising a normally closed flow switch that monitors a flow through the water circulating system, the flow switch preventing the pump from turning on when the flow is larger than a maximum flow permitted through the bypass valve.

41. The sub-system of claim 39, wherein housing includes a chamber having an open end, the thermal actuator being loaded into the chamber through the open end and held in the chamber with a retention member.

42. The sub-system of claim 39, wherein the bypass valve further includes a screen positioned within the housing between the hot water port and the thermal actuator.

* * * * *